United States Patent [19]

Aprile

[11] Patent Number: 5,537,524
[45] Date of Patent: Jul. 16, 1996

[54] PROCESS FOR CONVERTING TWO DIMENSIONAL DATA INTO A MULTIDIMENSIONAL FLOW MODEL

[75] Inventor: Robert L. Aprile, Desoto, Tex.

[73] Assignee: Hypercubic Tunneling Industries, Inc., Vero Beach, Fla.

[21] Appl. No.: 232,761

[22] Filed: Apr. 25, 1994

[51] Int. Cl.$^6$ .................................................. G06F 15/00
[52] U.S. Cl. ............................................................ 395/140
[58] Field of Search ................................... 395/140, 155, 395/161; 345/115, 117, 118

[56] References Cited

U.S. PATENT DOCUMENTS 5,341,223  8/1994  Shigeeda et al. .................. 358/440
5,392,386  2/1995  Chalas ................................ 395/155

Primary Examiner—Phu K. Nguyen
Attorney, Agent, or Firm—Mark A. Oathout

[57] ABSTRACT

A system which takes information related to a project or process which can be generated in a textual format or a 2-dimensional flow model and graphically generates this invention as a multidimensional flow model. The flow model includes 3-dimensional polygons representing entities, an independent time line, information relating to functions placed in ellipses located on the polygons, arrows making logical connection between functions and stacking of entities including embedded sublevels of related models.

18 Claims, 65 Drawing Sheets

| \multicolumn{2}{c}{KEY DATES HISTORY AND DEVELOPMENT OF PERT, CPM, AND PDM PLANNING TECHNIQUES} |
|---|---|
| YEAR | COMMERCIAL - INDUSTRIAL EVENTS OR ACCOMPLISHMENTS |
| 1956 | E.I. DU PONT DE NEMOURS COMPANY STARTS R/D GROUP- NEW MANAGEMENT TECHNIQUES FOR PLANNING AND SCHEDULING. |
| 1957 | KELLY WALKER METHOD [BASIC CPM] UNIVAC APPLICATION RESEARCH CENTER - DR. JOHN W. MAUCHLY, JAMES E. KELLEY - REMINGTON RAND [UNIVAC], MORGAN WALKER - DU PONT. |
| DECEMBER 1957 | DU PONT IMPLEMENTS THE KELLY WALKER METHOD ON A 10 M CHEMICAL PLANT LOCATED IN LOUISVILLE KENTUCKY |
| 1960-1965 | PETROCHEMICAL INDUSTRY HEAVIEST USER, 3% NATIONAL CONTRACTORS UTILIZING CPM TECHNOLOGY, 20% NATIONS MAJOR CONSTRUCTION PROJECTS ON CPM<br><br>CRITICAL PATH METHOD CAPTION REPLACES KELLEY WALKER [MAIN CHAIN TECHNIQUE]<br><br>KELLEY WALKER DU PONT DEVELOPS RESOURCE ALLOCATION AND MANPOWER PLANNING SYSTEM [RAMPS] ENHANCING CPM COMPUTERIZATION |
| 1965-1970 | ACADEMICIANS, IN CIVIL ENGINEERING CURRICULAR INCORPORATE CPM INTO UNDERGRADUATE CURRICULUM<br><br>IBM, MCDONNEL AUTOMATION AND NASA COMBINE FORCES AND CREATE PROJECT MANAGEMENT SYSTEMS [PMS] - IBM 1130, IBM 360<br><br>CPM WAS RECAST INTO PRECEDENCE NETWORKS [PDM] J.FONDAHL STANFORD UNIVERSITY & H.B. ZACHERY COMPANY. |
| 1970-1980 | THIS DECADE SAW THE EVOLUTION OF CONSTRUCTION MANAGEMENT<br><br>INCREASE IN CONSTRUCTION LITIGATION CITING DELAY AS A CAUSE OF DAMAGES<br><br>CPM - PROJECT CONTROL SYSTEMS [PCS] IMPLEMENTED ON THE WORLDS FAIR - NEW YORK, EXPO 67 -MONTREAL, SAN FRANCISCO TRANSIT SYSTEM |
| 1980-1995 | CPM SOFTWARE DEVELOPMENT FOR PERSONAL COMPUTER SYSTEMS |

FIG. 1A

| KEY DATES HISTORY AND DEVELOPMENT OF PERT, CPM, AND PDM PLANNING TECHNIQUES ||
|---|---|
| YEAR | U.S. FEDERAL PROGRAM EVENTS OR ACCOMPLISHMENTS |
| 1957 | U.S. NAVY POLARIS PROGRAM DEVELOPMENT OF PERFORMANCE EVALUATION AND REVIEW TECHNIQUE [PERT] SPECIAL PROJECTS OFFICE ADMIRAL RABORN, PROGRAM EVALUATION BRANCH - WILLARD FAZAR |
| JANUARY 1958 | SPO INITIATED A COMPUTER IMPLEMENTATION TASK FORCE C.E. CLARK, D MALCOMB, J.H. ROSEBOOM, R.YOUNG, E. LENNEN W. FAZAR |
| FEBRUARY 1958 | RESEARCH MISSION STATEMENT PERT DEVELOPMENT PROGRAMMED AT NAVAL ORDNANCE RESEARCH CALCULATOR [NORC] NAVAL PROVING GROUNDS DALGREN VIRGINIA |
| FALL-1958 | PERT RESEARCH SYSTEM WAS OPERATIONAL |
| 1962 | SECRETARY OF DEFENSE MACNAMARA ISSUES EXECUTIVE REGULATION - REDUCING CONFUSION OF TWO SYSTEMS TO EXCLUSIVE USE OF PERT FOR ALL DEFENSE ORGANIZATIONS |
| 1962-1965 | PERT COST [INTEGRATED COST/SCHEDULE] APPLIED ON THE F-11 PROGRAM, ATLAS [E], ATLAS [F], TITAN I, TITAN II, AND MINUTEMAN PROGRAM |
| 1965 | NASA IMPLEMENTS NASA PERT ACTIVITY ON ARROW NETWORKING ON THE APOLLO PROGRAM |
| 1967 | POLICY GUIDANCE ON IMPLEMENTATION COST/SCHEDULE CONTROL SYSTEM CRITERIA [C/SCSC] - REPLACES PERT/COST |
| 1969 | FIRST CONTRACT C/SCSC VALIDATION OCCURRED |
| 1972 | TRI-SERVICE VALIDATIONS |

FIG. 1B

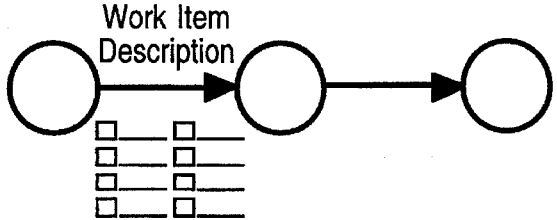
FIG. 2
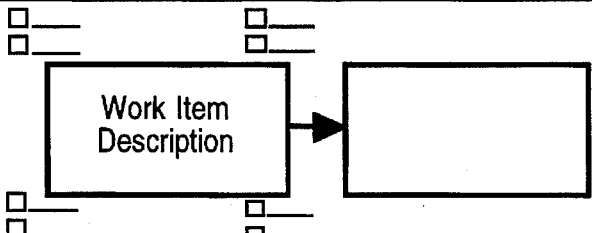
FIG. 2A
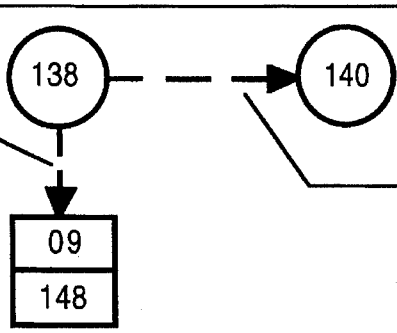
FIG. 3
FIG. 4

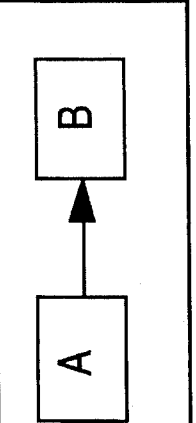
FIG. 7D
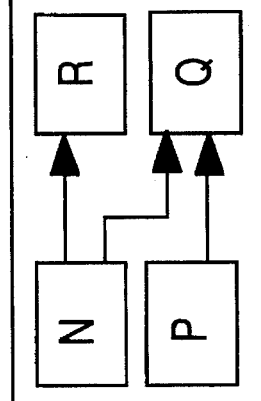
FIG. 7E
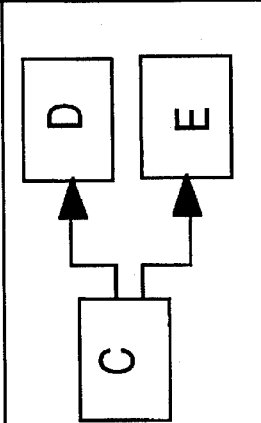
FIG. 7A
FIG. 7B
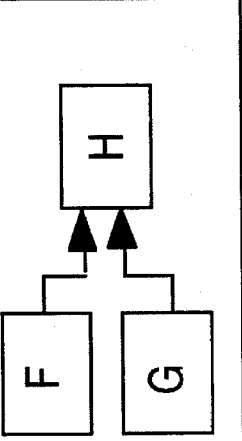
FIG. 7C

```
COMPONENTS OF A PROJECT STATUS REPORT

PROJECT ANALYSIS REPORT

DISCUSSION CRITICAL ITEMS

CRITICAL PATH ANALYSIS

PROJECT FLOAT ANALYSIS

PRODUCTIVITY REPORTING &
CALCULATIONS WORK MEASUREMENT
REPORTS BY TRADES

SUMMARY COST/STATUS REPORTS

PROGRAM COST CONTROL SUMMARIES
BY SUBSYSTEMS

MONETARY VALUE % COMPLETED
(PREVIOUS) (TO DATE) (CURRENT PERIOD)

CASH FLOW PROJECTIONS
BUDGETED-ACTUAL

STATUS REPORT LABOR
MATERIAL/EQUIPMENT

UPDATED MASTER MILESTONE SCHEDULE

UPDATED CPM NETWORK DIAGRAMS

UPDATED COMPUTER GENERATED
REPORTS
```

FIG. 10A

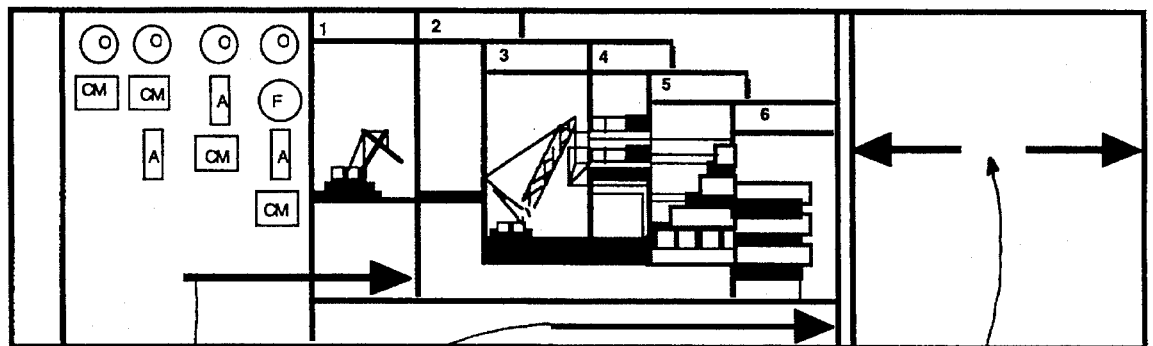

FIG. 10D

```
┌─────────┐ ┌──────────────────┐
│ESTIMATE │ │PROJECT ESTIMATE  │
│┌────────┴┐│ 2                │
││ DESIGN  ││ 3                │
││PACKAGES ││ 4                │
│└─────────┘│ 5                │
└───────────┘ 6                │
              └────────────────┘
```

| BASE CONTRACT | CONTRACT COMMITMENT | SORT BY PO # | COST CODE DISTRIBUTION |
|---|---|---|---|
| SUBCONTRACTS ___ | 2 _____ | A-13 _____ | 02-1 _____ |
| SUBCONTRACTS ___ | 5 _____ | A-103 _____ | 05-1 _____ |
|  |  |  | 05-2 _____ |
| SUBCONTRACTS ___ | 6 _____ | A-104 _____ | 05-3 _____ |
| SUBCONTRACTS ___ | 9 _____ | A-110 _____ | 06-1 _____ |
|  | TOTAL CONTRACT | PURCHASE ORDER REGISTER | Sort by Cost Code Charge Account # |

| PROJECT BUDGET SUMMARY | Budget Value | Commitment To Date | Balance Funds to Complete | Projected Cost Forecast | Variance Forecast/ Budget | Previous Forecast Variance Last Period |
|---|---|---|---|---|---|---|
| 2 SITE PREP |  |  |  |  |  |  |
| 3 BUILDING SHELL |  |  |  |  |  |  |
| 4 INTERIOR FINISHES |  |  |  |  |  |  |
| 5 MECAHNICAL |  |  |  |  |  |  |
| 6 ELECTRICAL |  |  |  |  |  |  |
| 7 FIT-UP |  |  |  |  |  |  |
| 8 FURNISHINGS |  |  |  |  |  |  |
| 9 LANDSCAPING |  |  |  |  |  |  |
| 10 INDIRECTS |  |  |  |  |  |  |
| 11 OFF SITES |  |  |  |  |  |  |

MONTHLY DETAILED PAYMENT SUMMARY

| PAYMENT REQUEST | BASE AMOUNT | Complete To Date | Retention Remaining Funds | Payable To Date | Previous Payment | Amount Due |
|---|---|---|---|---|---|---|
| 2 |  |  |  |  |  |  |
| 3 |  |  |  |  |  |  |
| 4 |  |  |  |  |  |  |
| 5 |  |  |  |  |  |  |
| 6 |  |  |  |  |  |  |
| 7 |  |  |  |  |  |  |
| 8 |  |  |  |  |  |  |
| 9 |  |  |  |  |  |  |
| CO. #1 |  |  |  |  |  |  |

SUMMARY MONTHLY COMMITMENTS
Change Orders This Period ☐

SUMMARY MONTHLY FORECAST TO COMPLETE

Outstanding Requests For Proposals ☐

FIG. 13

| TIER 1/LEVEL 1 SCHEDULE |||||
|---|---|---|---|---|
| DESCRIPTION | MONTH 1 | MONTH 2 | MONTH 3 | MONTH 4 |
| WORK ITEM NO.1 | ▭▭▭▭ | ▭▭▭▭ | ▭▭ | |
| WORK ITEM NO.2 | ▭▭ | ▭▭▭▭ | ▭▭▭▭ | |
| WORK ITEM NO.3 | | | | ▭▭ |

| TIER 2/LEVEL 2 SCHEDULE |||||
|---|---|---|---|---|
| DESCRIPTION | MONTH 1 | MONTH 2 | MONTH 3 | MONTH 4 |
| WORK ITEM NO.1A | ▭▭▭ | ▭ | | |
| WORK ITEM NO.1B | | ▭▭▭ | | |
| WORK ITEM NO.1C | | | ▭ | |

| TIER 3/LEVEL 3 SCHEDULE |||||
|---|---|---|---|---|
| DESCRIPTION | MONTH 1 | MONTH 2 | MONTH 3 | MONTH 4 |
| WORK ITEM NO.1A1 | ▭ | | | |
| WORK ITEM NO.1A2 | | ▭ | | |
| WORK ITEM NO.1B1 | | ▭ | | |
| WORK ITEM NO.1B2 | | | ▭ | |
| WORK ITEM NO.1B3 | | | ▭ | |
| WORK ITEM NO.1C1 | | | ▭ | |
| WORK ITEM NO.1C2 | | | | ▭ |

FIG.14

Typical Project Life Cycle - Phases & Typical Activities

SCOPE MANAGEMENT - TABLE

| CONCEPTUAL DEVELOPMENT | SCOPE STATEMENT | WORK AUTHORIZATION | SCOPE REPORTING | CONTROL SYSTEMS | PROJECT CLOSEOUT |
|---|---|---|---|---|---|
| A-PROBLEM/NEED STATEMENT/GOAL | A-CRITERIA | A-WORK PACKAGES/ CONTROL POINT | A-COST STATUS | A-CONFIGURATION (BASELINE) CONTROL | A-HISTORIC RECORDS |
| B-INFORMATION GATHERING | B-MANAGEMENT PLAN | B-CONTRACTS | B-SCHEDULE STATUS | B-DESIGN CONTROL | B-POST PROJECT ANALYSIS & REPORT |
| C-CONSTRAINTS | C-WORK BREAKDOWN STRUCTURE | | C-TECHNICAL PERFORMANCE STATUS | C-DOCUMENT CONTROL | C-FINANCIAL CLOSEOUT |
| D-ALTERNATIVE ANALYSIS | D-SCOPE BASELINE | | D-INTEGRATED PROJECT PROGRESS REPORTS | D-ACQUISITION CONTROL | |
| E-PROJECT OBJECTIVES | E-SCOPE BASELINE APPROVAL | | E-VARIANCE REPORTS | E-SPECIFICATION CONTROL | |
| | | | F-TREND REPORTS | | |
| | | | G-EXCEPTION REPORTS | | |

FIG. 17

| QUALITY MANAGEMENT - TABLE | |
|---|---|
| QUALITY ASSURANCE (MANAGERIAL) | QUALITY CONTROL (TECHNICAL) |

FIG. 18A

| QUALITY ASSURANCE (MANAGERIAL) SUBTABLE | | | | | |
|---|---|---|---|---|---|
| OVERALL QUALITY PHILOSOPHY | FUNCTION QUALITY INTEGRATION | MIS QUALITY REQUIREMENTS | CLIENT QUALITY SERVICES | FORMATIVE QUALITY EVALUATION | MANAGERIAL QUALITY ADMINISTRATION |
| A-DEFINITION | A-SCOPE | A-OBJECTIVES | A-EXPECTATION REVIEW | A-EXTERNAL CONFORMANCE | A-DEFINITIONS |
| B-DESIGN | B-COST | B-STRATEGIES | B-FEEDBACK | B-INTERNAL CONFORMANCE | B-RESPONSIBILITY |
| C-RESPONSIBILITIES | C-TIME | C-POLICIES | C-PUBLIC RELATIONS | | |
| D-PERFORMANCE | | D-PROCEDURES | D-ANTICIPATED QUALITY | | |
| E-CONFORMANCE | | E-SYSTEM FLOW | | | |

FIG 18B

| QUALITY CONTROL (TECHNICAL) SUBTABLE | | | | |
|---|---|---|---|---|
| TECHNICAL QUALITY SPECIFICATIONS | TECHNICAL QUALITY ADMINISTRATION | QUALITY PROGRESS REVIEW | TECHNICAL QUALITY SUPPORT | QUALITY EVALUATION METHODS |
| A-DESIGN INFORMATION | A-PROJECT DEFINITION | A-PRODUCT | A-TRAINING | A-SAMPLING |
| B-PROCUREMENT CONTROL | B-SYSTEM | B-PRODUCT USE | B-RESOURCRES | B-REPORTS |
| C-MATERIAL CONTROL | C-RECORDS | C-SUMMATIVE | | C-GRAPHS & CHARTS |
| D-MANUFACTURE EXECUTION | | | | D-MAX. VISIBILITY CONTROL |
| E-ACCEPTANCE | | | | |
| F-MEASUREMENT | | | | |

| TIME MANAGEMENT - TABLE | | | |
|---|---|---|---|
| TIME PLANNING | TIME ESTIMATING | TIME SCHEDULING | TIME CONTROL |

FIG. 19B

| TIME PLANNING - SUBTABLE | | | |
|---|---|---|---|
| STRATEGY | RESOURCE CONSTRAINTS | MILESTONES | MASTER PLAN |
| 1-TIME MANAGEMENT SCOPE<br>2-CONSTRAINTS<br>3-GENERAL SEQUENCING<br>4-METHODS AND PROCEDURES<br>5-AUTHORITTY AND RESPONSIBILLITY<br>6-ACCURACY | 1-LOGIC DRIVE<br>2-RESOURCE DRIVEN<br>3-RESOURCE EVALUATION<br>4-RESOURCE EVALUATION<br>5-INTERFACES | 1-CALENDAR<br>2-CALENDAR RANGE<br>3-CONTRACTS DATES<br>4-IMPOSED DATES<br>5-KEY EVENT SCHEDULE | 1-PRESENTATION<br>2-ACCEPTANCE<br>3-KEY EVENT SCHEDULE<br>4-ACCURACY<br>5-LEVEL1 TASKS<br>6-BREAKDOWN AND LOGIC<br>7-SCOPE DEFINITION<br>8-LINE ACTIVITY<br>9-ACYIVITY DESCRIPTION<br>10-CALENDAR UNIT<br>11-CRITERIA<br>12-WORK UNIT |

TIME ESTIMATING - SUBTABLE

| CONTENT | CONSTRAINTS | RESOURCES | ANALYSIS |
|---|---|---|---|
| 1-IDENTIFY<br>2-WBS<br>3-LEVEL OF DETAIL<br>4-QUANTITY TAKE-OFF | 1-RESOURCE DRIVEN<br>2-RESTRAINTS<br>3-INTERFERENCES<br>4-EXTERNAL IMPACTS | 1-IDENTIFY<br>2-VARIATION<br>3-RESOURCE CODE<br>4-RESOURCE PLOTS<br>5-PRODUCTIVITY | 1-ALTERNATIVES<br>2-FEASIBILITY<br>3-DURATION<br>4-FORECASTING<br>5-WORKLOAD<br>6-CONTINGENCIES |

FIG 19C

TIME CONTROL - SUBTABLE

| PROJECT<br>CONTROL PLAN | MONITORING<br>AND ANALYSIS | REPORTS | ACTION<br>ALTERNATIVES |
|---|---|---|---|
| 1-CONTROL OBJECTIVES<br>2-ACCURACY<br>3-TOLERANCES<br>4-INFORMATION FLOW<br>5-ORGANIZATION BREAKDOWN<br>   STRUCTURE(OBS)<br>6-IDENTIFY OBS OBJECTIVE<br>7-SYSTEM FLOW DIAGRAMS | 1-DATA COLLECTION<br>2-CALCULATIONS<br>3-VARIANCE IDENTIFICATION<br>4-POST PROOJECT<br>   EVALUATION | 1-PURPOSE<br>2-LEVEL OF DETAIL<br>3-FREQUENCY<br>4-DISTRIBUTION<br>5-ARCHIVE | 1-COMPREHEND SITUATION<br>2-RECOGNIZE ALTERNATIVES<br>3-RANK ALTERNATIVES<br>4-SELECT<br>5-DIRECT<br>6-FOLLOW UP |

FIG 19D

TIME SCHEDULING - SUBTABLE

| REAL TIME | REAL RESOURCES | LOGIC | ANALYSIS | INFORMATION MANAGEMENT |
|---|---|---|---|---|
| 1-INPUT MILESTONES | 1-INPUT LIMITS | 1-DATA REFINEMENT | 1-VERIFICATION | 1-DISPLAY SCHEDULE |
| 2-INPUT TIME RESTRAINTS | 2-INPUT PROORITIES | 2-DUMMY ACTIVITIES | 2-INTERPRETATION | 2-DISTRIBUTION |
| 3-INPUT PROORITIES | 3-RESOURCE | 3-SLACK TIME | 3-ALTERNATIVES | |
| | | 4-EXPERT SYSTEMS | 4-SELECTION | |
| | | 5-STANDARD NETWORKS | 5-CALCULATIONS | |
| | | | 6-REGRESSION ANALYSIS | |
| | | | 7-SCHEDULE CONTOURING | |
| | | | 8-RESOURCE LEVELING | |
| | | | 9-DISCUSSION | |
| | | | 10-FEEDBACK | |

FIG.19E

COST MANAGEMENT - TABLE

| COST ESTIMATING & FORECASTING | COST BUDGETING | COST CONTROLS | COST APPLICATIONS |
|---|---|---|---|
| A-ECONOMIC ANALYSIS | A-WORK BREAKDOWN STRUCTURE | A-DEFINITIONS | A-HISTORICAL DATA BANKS |
| B-PROFITABILITY | B-CODE OF ACCOUNTS | B-POLICIES | B-RESPONSIBILITY CHARTING |
| C-FINANCING | C-BUDGET COST | C-PROCEDURES | C-POST PROJECT EVALUATION |
| D-PROSPECTUS | D-CASH FLOW FORECAST | D-SYSTEMS FLOW DIAGRAMS | D-LIFE CYCLE COSTING |
| E-PROJECT INVESTMENT COST | E-MANAGERIAL RESERVES | E-CONTINGENCY MANAGEMENT | E-VALUE ANALYSIS |
| F-CONTINGENCY ALLOWANCE | F-PERFORMANCE MEASUREMENT | F-MONITORING ACTUALS VS. BUDGETS | F-COMPUTER APPLICATION |
| G-INFLATION/ESCALATION ALLOWANCE | G-PROJECT COST SYSTEM | G-VARIANCE ANAYSIS | |
| H-INTEREST DURING EXECUTION | H-FUNDING | H-INTEGRATED COST/SCHEDULE | |
| I-FORECASTING | | I-PROGRESS ANAYSIS/REPORTING | |
| J-STATISTICS | | J-CORRECTIVE ACTION | |

FIG 20

RISK MANAGEMENT - TABLE

| IDENTIFICATION | MITIGATION |
|---|---|
| | |

FIG 21A

IDENTIFICATION - SUBTABLE

| EXTERNAL UNPREDICTABLE | EXTERNAL PREDICTABLE (BUT UNCERTAIN) | INTERNAL (NON TECHNICAL) | TECHNICAL | LEGAL |
|---|---|---|---|---|
| A-REGULATORY UNANTICIPATED GOVERNMENT INTERVENTION | A-MARKET RISK | A-SCHEDULE DELAYS | A-CHANGES IN TECHNOLOGY | A-LICENSES |
| B-NATURAL HAZARDS | B-OPERATIONAL | B-COST | B-PERFORMANCE | B-PATENT RIGHTS |
| C-POSTULATED | C-ENVIRONMENTAL IMPACT | C-CASH FLOW | C-RISKS SPECIFIC TO PROJECT'S TECHNOLOGY | C-CONTRACTUAL FAILURE |
| D-UNEXPECTED SIDE EFFECTS | D-SOCIAL IMPACT | | D-DESIGN | D-OUTSIDER SUIT |
| E-COMPLETION | E-CURRENCY CHANGES | | | E-INSIDER SUIT |
| | F-INFLATION | | | F-FORCE MAJEURE |
| | G-TAXATION | | | |

FIG. 21B

MITIGATION - SUBTABLE

| INSURABLE | IMPACT ANALYSIS | RESPONSE PLANNING | RESPONSE SYSTEM | DATA APPLICATIONS |
|---|---|---|---|---|
| A-DIRECT PROPERTY DAMAGE | A-BASELINE | A-ALLOCATION | A-DEFINITIONS | A-HISTORICAL DATA BASE |
| B-INDIRECT CONSEQUENTIAL LOSS | B-SCREENING | B-MITIGATION | B-POLICIES/ PROCEDURES | B-CURRENT PROJECT DATA BASE |
| C-LEGAL LIABILITY | C-DEGREE OF UNCERTAINTY | C-DEFLECTION | C- RESPONSIBILITIES | C-POST PROJECT ASSESSMENT & ARCHIVE |
| D-PERSONNEL | D-AMOUNT AT STAKE & CRITICALITY ASSESSMENT | D-CONTINGENCY PLANNING | D-RISK MODEL | |
| | E-VARIATION WITH PROJECT LIFE CYCLE | E-UNFORESEEN | E-MONITOR AND REVIEW | |
| | | | F-SYSTEM ADJUSTMENTS | |

FIG 21C

HUMAN RESOURCES MANAGEMENT - TABLE

| ADMINISTRATION | BEHAVIORAL |
|---|---|

FIG. 22A

ADMINISTRATION - SUBTABLE

| EMPLOYEE RELATIONS | COMPENSATION AND EVALUATION | GOV'T REGULATIONS AND EVALUATION |
|---|---|---|
| A-RECRUITMENT, SELECTION, AND JOB PLACEMENT<br><br>B-PERSONNEL TRAINING<br><br>C-LABOR RELATIONS<br><br>D-CAREER PATH PLANNING<br><br>E-MANPOWER PLANNING | A-JOB DESCRIPTIONS<br><br>B-PERFORMANCE EVALUATION<br><br>C-SALARY ADMINISTRATION<br><br>D-BENEFITS ADMINISTRATION | A-DISCRIMINATION<br><br>B-EQUAL OPPORTUNITY<br><br>C-ARBITRATION |

FIG. 22B

| BEHAVIORAL – SUBTABLE | | |
|---|---|---|
| INDIVIDUALS OUTSIDE THE PROJECT | TEAM MEMBERS | THE PROJECT TEAM |
| A-TOP MANAGEMENT | A-COMMUNICATING WITH INDIVIDUALS | A-LEADERSHIP |
| B-LINE/FUNCTIONAL MANAGERS | B-MOTIVATING | B-TEAM BUILDING |
| C-SERVICE AND SUPPORT PERSONNEL | C-COUNSELING | C-TEAM MOTIVATION |
| D-STAFF PERSONNEL | D-NEGOTIATING | D-TEAM DECISION MAKING |
| E-THE PUBLIC | E-DELEGATING | E-TEAM REWARD SYSTEM |
| F-CUSTOMER/CLIENT PERSONNEL | F-PROBLEM RESOLUTION | F-CONFLICT MANAGEMENT |
| G-REGULATORY PERSONNEL | G-PERSONAL REWARDS | G-ORGANIZATIONAL POLITICS |
| H-ENVIRONMENTALLY CONCERNED | H-PERSONAL RECOGNITION | H-COMMUNICATION WITH GROUPS |
| I-LEGALLY CONCERNED | I-POWER/INFLUENCE | I-PERFORMANCE |

FIG. 22C

CONTRACT/PROCUREMENT MANAGEMENT - TABLE

| OBJECTIVE | INFORMATION SYSTEMS | PROCUREMENT IDENTIFICATION | ACQUISITION PROCESS | CONTRACT ADMINISTRATION | POST CONTRACT EVALUATIONS |
|---|---|---|---|---|---|
| A-SCORE OF WORK | A-INFORMATION SOURCES | A-PERSONNEL | A-ACQUISITION METHODS | A-FUNDING | A-PROCUREMENT PERFORMANCE EVALUATION |
| B-STRATEGY | B-DATA GAPS | B-GOODS | B-SOURCES SELECTION | B-NOTICE TO PROCEED | B-CONTRACTOR'S PERFORMANCE |
| C-ENVIRONMENT | C-SUPPLEMENTARY | C-SERVICES | C-CONTRACT TYPES | C-PERFORMANCE CONTROL | |
| D-ALTERNATIVES | | | D-PROCUREMENT/TENDER | D-FINANCIAL CONTROL | |
| E-RISK ANALYSIS | | | E-INVITATION TO BID | E-CONTRACT MODIFICATIONS | |
| | | | F-RESPONSE | F-CONTRACT DISPUTE | |
| | | | G-EVALUATIONS | G-CONTRACT CLOSEOUT | |
| | | | H-CONTRACT RISK | | |
| | | | I-PROCUREMENT/CONTRACT | | |
| | | | J-AWARD | | |
| | | | K-BID PROTESTS | | |

FIG 23

COMMUNICATION MANAGEMENT – TABLE

| AUDIENCE | PROCESS | SKILLS | ENVIRONMENT | APPLICATIONS |
|---|---|---|---|---|
| A-CLIENT | A-TRANSMITTING | A-TECHNIQUE | A-COMMUNICATIONS CHANNELS | A-FUNCTIONAL |
| B-TOP MANAGEMENT | B-FILTERING | B-STYLE | B-LOGISTICS | B-TOOLS |
| C-TEAM | C-RECEIVING | | C-PERSONAL CONTACT | |
| | D-INTERPRETING/ UNDERSTANDING | | D-GROUP MEETINGS | |
| | | | E-TELEPHONE | |
| | | | F-CORRESPONDENCE | |
| | | | G-ELECTRONIC MAIL | |

FIG. 24

| ACT ID | DESCRIPTION | DURATION VALUE | CODE FIELD | ACTIVITY RELATIONAL DEPENDENCIES | | |
|---|---|---|---|---|---|---|
| 005 | TASK NO.1 | [ ] | A | 005 | 010 | FS |
| 010 | TASK NO.2 | [ ] | B | 010 | 015 | FS |
| 015 | TASK NO.3 | [ ] | BA | 015 | 020 | FS |
| 020 | TASK NO.4 | [ ] | C | 020 | 025 | FS |
| 025 | TASK NO.5 | [ ] | C | 025 | 030 | FS |
| 030 | TASK NO.6 | [ ] | BA | 030 | 035 | FS |
| 035 | TASK NO.7 | [ ] | A | 035 | 040 | FS |
| 040 | TASK NO.8 | [ ] | A | 040 | 045 | FS |
| 045 | TASK NO.9 | [ ] | BA | 045 | 050 | FS |
| 050 | TASK NO.10 | [ ] | BAA | 050 | 055 | FS |
| 055 | TASK NO.11 | [ ] | C | 055 | 060 | FS |
| 060 | TASK NO.12 | [ ] | CA | 060 | 065 | FS |
| 065 | TASK NO.13 | [ ] | CB | 065 | 075 | FS |
| 070 | TASK NO.14 | [ ] | CB | 070 | 080 | FS |
| 075 | TASK NO.15 | [ ] | CA | 075 | 080 | FS |
| 080 | TASK NO.16 | [ ] | C | 080 | 085 | FS |
| 085 | TASK NO.17 | [ ] | BAA | | | |

FIG. 27

| ACT ID | DESCRIPTION | DURATION VALUE | CODE FIELD NO.1 |
|---|---|---|---|
| E100A 005 | TASK NO.1 | [ ] | A |
| E200A 010 | TASK NO.2 | [ ] | B |
| E201A 015 | TASK NO.3 | [ ] | BA |
| E300A 020 | TASK NO.4 | [ ] | C |
| E300A 025 | TASK NO.5 | [ ] | C |
| E201A 030 | TASK NO.6 | [ ] | BA |
| E100A 035 | TASK NO.7 | [ ] | A |
| E100A 040 | TASK NO.8 | [ ] | A |
| E201A 045 | TASK NO.9 | [ ] | BA |
| E202A 050 | TASK NO.10 | [ ] | BAA |
| E300A 055 | TASK NO.11 | [ ] | C |
| E301A 060 | TASK NO.12 | [ ] | CA |
| E301B 065 | TASK NO.13 | [ ] | CB |
| E301B 070 | TASK NO.14 | [ ] | CB |
| E301A 075 | TASK NO.15 | [ ] | CA |
| E300A 080 | TASK NO.16 | [ ] | C |
| E202A 085 | TASK NO.17 | [ ] | BAA |

ACTIVITY RELATIONAL DEPENDENCIES

| | | |
|---|---|---|
| E100A005 | E200A010 | FS |
| E200A010 | E201A015 | FS |
| E201A015 | E300A020 | FS |
| E300A020 | E300A025 | FS |
| E300A025 | E201A030 | FS |
| E201A030 | E100A035 | FS |
| E100A035 | E100A040 | FS |
| E100A040 | E201A045 | FS |
| E201A045 | E202A050 | FS |
| E202A050 | E300A055 | FS |
| E300A055 | E301A060 | FS |
| E300A055 | E301B065 | FS |
| E301B065 | E301A075 | FS |
| E301B070 | E301B070 | FS |
| E301A075 | E300A080 | FS |
| E300A080 | E300A080 | FS |
| E300A080 | E202A085 | FS |

FIG. 27A

FIG. 30  HT - BASIC DATA IMPORTS

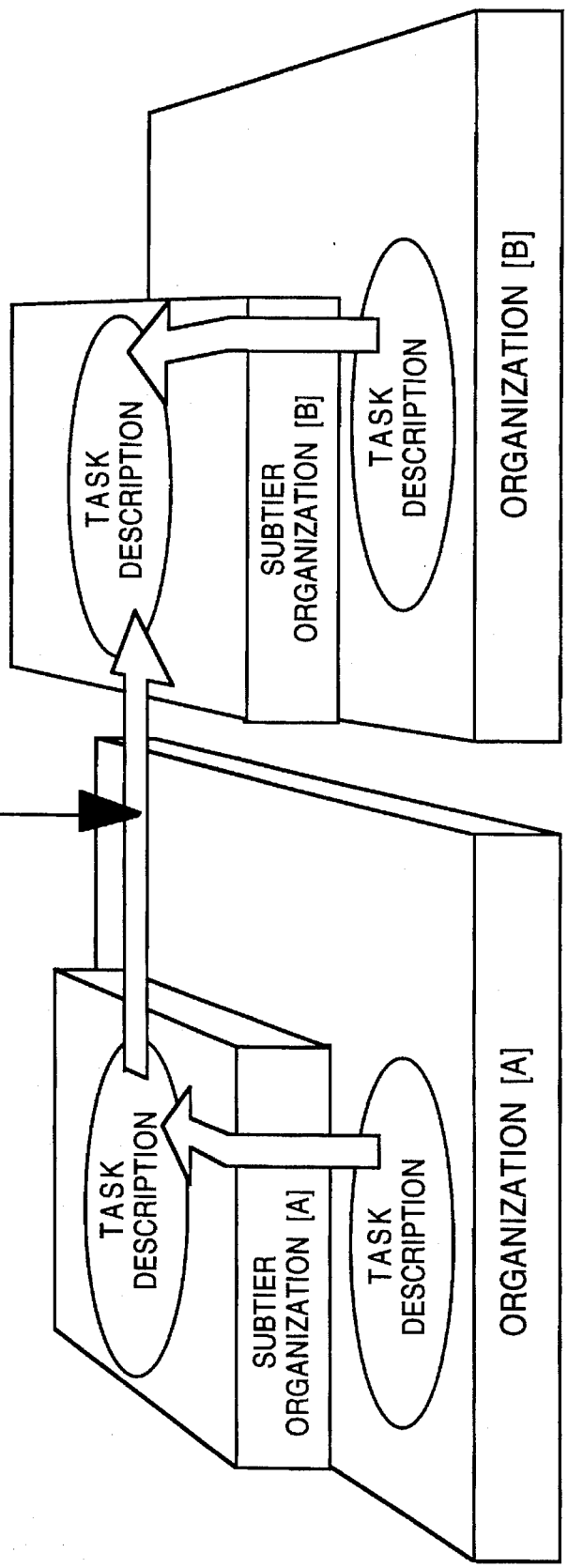
FIG. 32C
FIG. 32D

TUNNELING CONCEPT

| | | | |
|---|---|---|---|
| A | = | ORGANIZATION A | = E100A |
| B | = | ORGANIZATION B | = E200A |
| BA | = | ORGANIZATION BA | = E201A |
| BAA | = | ORGANIZATION BAA | = E202A |
| C | = | ORGANIZATION C | = E300A |
| CA | = | ORGANIZATION CA | = E301A |
| CB | = | ORGANIZATION CB | = E301B |

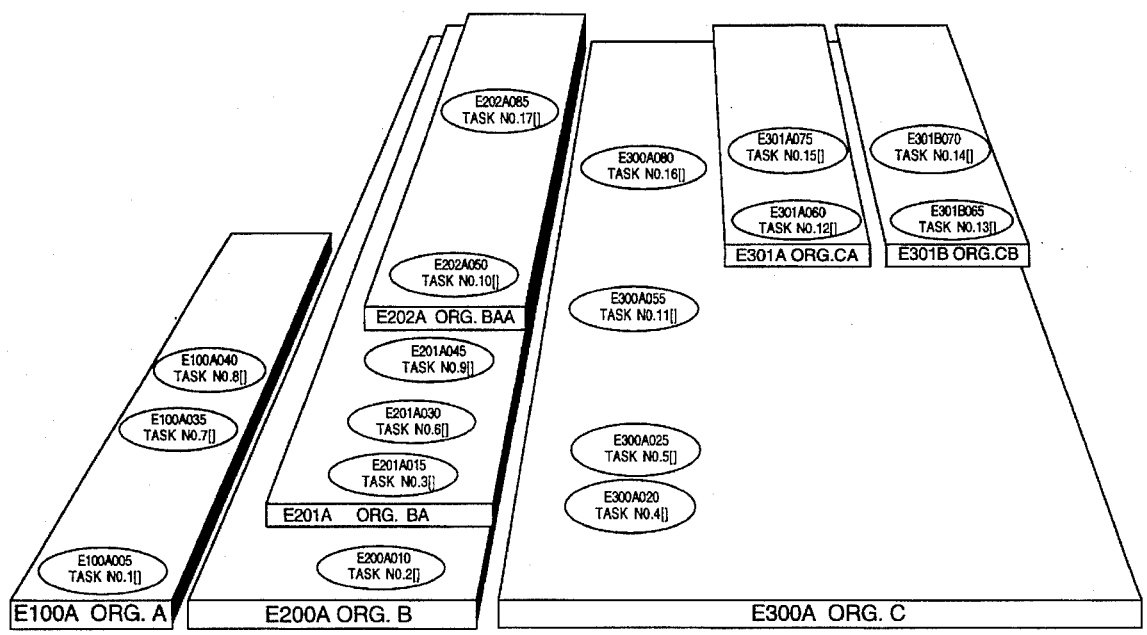
| ACTIVITY ID | | DESCRIPTION | DURATION VALUES |
|---|---|---|---|
| E100A | 005 | TASK NO. 1 | [] |
| E200A | 010 | TASK NO. 2 | [] |
| E201A | 015 | TASK NO. 3 | [] |
| E300A | 020 | TASK NO. 4 | [] |
| E300A | 025 | TASK NO. 5 | [] |
| E201A | 030 | TASK NO. 6 | [] |
| E100A | 035 | TASK NO. 7 | [] |
| E100A | 040 | TASK NO. 8 | [] |
| E201A | 045 | TASK NO. 9 | [] |
| E202A | 050 | TASK NO. 10 | [] |
| E300A | 055 | TASK NO. 11 | [] |
| E301A | 060 | TASK NO. 12 | [] |
| E301B | 065 | TASK NO. 13 | [] |
| E301B | 070 | TASK NO. 14 | [] |
| E301A | 075 | TASK NO. 15 | [] |
| E300A | 080 | TASK NO. 16 | [] |
| E202A | 085 | TASK NO. 17 | [] |
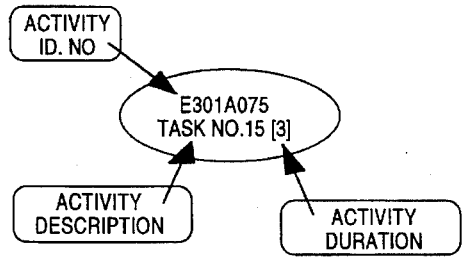
FIG.35

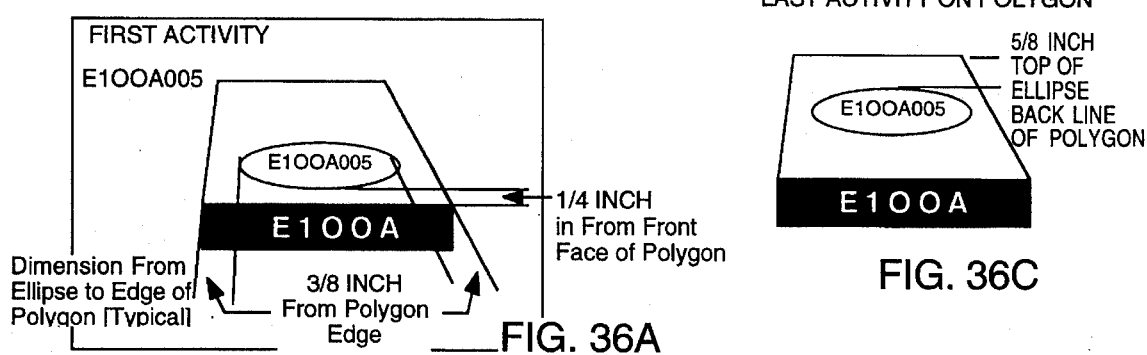
FIG. 36A
FIG. 36C
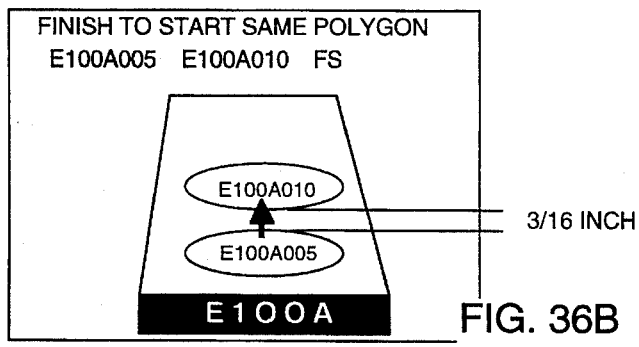
FIG. 36B
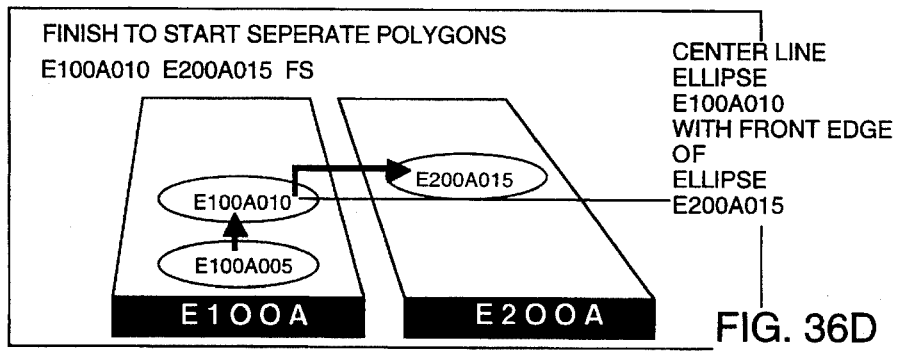
FIG. 36D
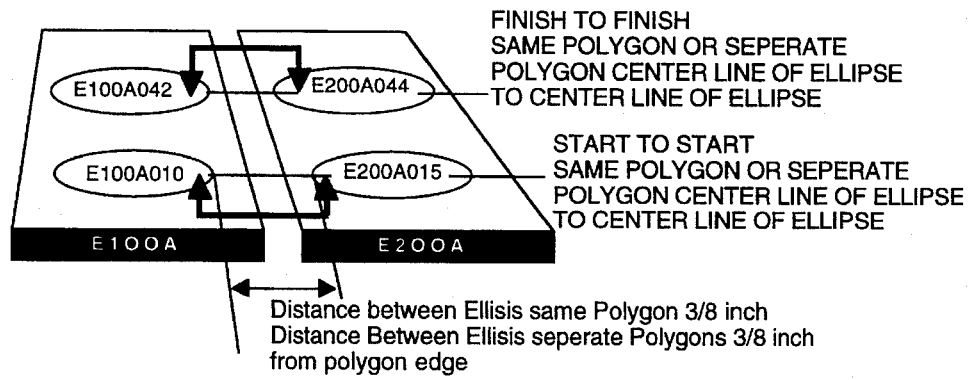
FIG. 36E

| Activity ID | Activity Sucessor ID | Type of Relationship |
|---|---|---|
| 005 | 010 | FS |
| 010 | 015 | FS |
| 015 | 020 | FS |
| 020 | 025 | FS |
| 025 | 030 | FS |
| 030 | 035 | FS |
| 035 | 040 | FS |
| 040 | 045 | FS |
| 045 | 050 | FS |
| 050 | 055 | FS |
| 055 | 060 | FS |
| 055 | 065 | FS |
| 060 | 075 | FS |
| 065 | 070 | FS |
| 070 | 080 | FS |
| 075 | 080 | FS |
| 080 | 085 | FS |

| Activity ID | | Activity Sucessor ID | | Type of Relationship |
|---|---|---|---|---|
| E100A | 005 | E200A | 010 | FS |
| E200A | 010 | E201A | 015 | FS |
| E201A | 015 | E300A | 020 | FS |
| E300A | 020 | E300A | 025 | FS |
| E300A | 025 | E201A | 030 | FS |
| E201A | 030 | E100A | 035 | FS |
| E100A | 035 | E100A | 040 | FS |
| E100A | 040 | E201A | 045 | FS |
| E201A | 045 | E202A | 050 | FS |
| E202A | 050 | E300A | 055 | FS |
| E300A | 055 | E301A | 060 | FS |
| E300A | 055 | E301B | 065 | FS |
| E301A | 060 | E301A | 075 | FS |
| E301B | 065 | E301B | 070 | FS |
| E301B | 070 | E300A | 080 | FS |
| E301A | 075 | E300A | 080 | FS |
| E300A | 080 | E202A | 085 | FS |

HT Code ↗

| FIELDTYP | FIELDID | DICTIONARY | DICTID | DICTDESC1 | DIRECTRY |
|---|---|---|---|---|---|
| ACO | ACOST | MEDICAL.ACT | | | \HT\LINMED |
| ACT | ID | MEDICAL.ACT | | | \HT\LINMED |
| BCO | BCOST | MEDICAL.ACT | | | \HT\LINMED |
| EDA | EFDATE | MEDICAL.ACT | | | \HT\LINMED |
| FIL | C1 | SSC_C1.COD | C1 | C1DESC | |
| FIL | C4 | ASDC4.COD | C4 | C4DESC | |
| MOD | C4 | ASDC4.COD | C4 | C4DESC | |
| MOD | C5 | SSC_C5.COD | C5 | C5DESC | |
| NDX | DTOS (ESDATE) | | | | |
| NDX | DTOS (EFDATE) | | | | |
| NDX | ID | | | | |
| REL | ID | MEDICAL.REL | PRED | | \HT\LINMED |
| RTF | RELTF | MEDICAL.ACT | | | \HT\LINMED |
| SDA | ESDATE | MEDICAL.ACT | | | \HT\LINMED |
| TFT | TF | MEDICAL.ACT | | | \HT\LINMED |

FIG. 40

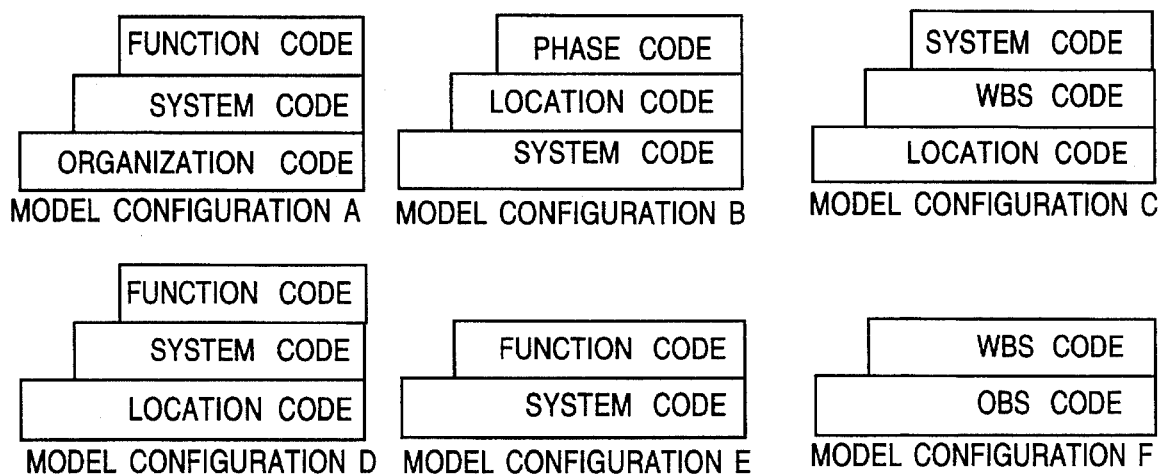

FIG. 41

Step 5

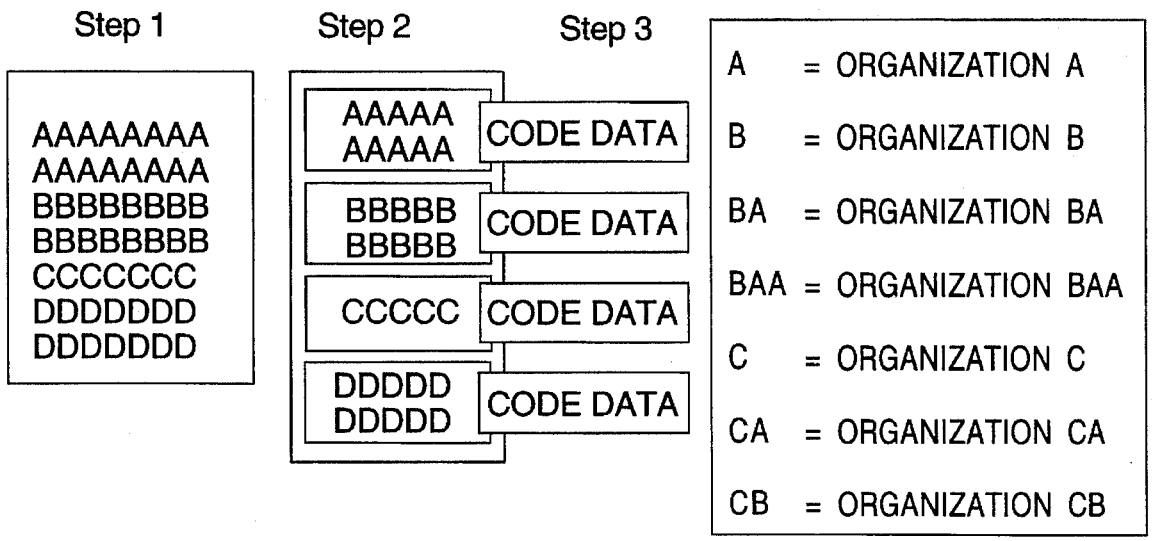
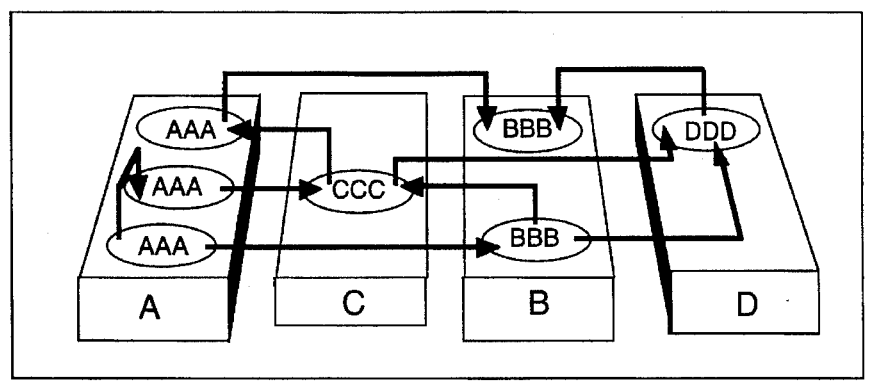
Step 5
FIG. 43

| | |
|---|---|
| ACTIVITY ID# | |
| DESCRIPTION | TEXT INPUT HERE |
| OBS CODE | |
| WBS CODE | |
| DURATION | |
| UNIT OF MEASURE | |
| PREDECESSOR ID | |
| SUCESSOR ID | |
FIG. 44
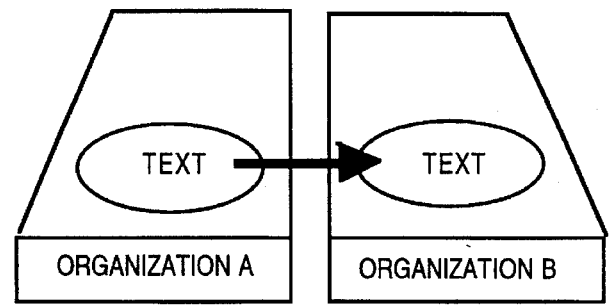
FIG. 44A
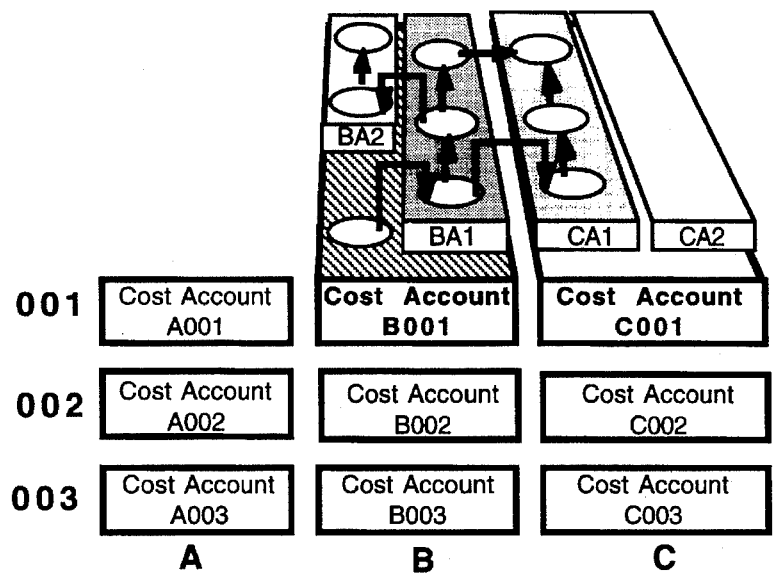
FIG. 45

| PHONE LOG A | | | |
|---|---|---|---|
| From | To | Date | Time | Duration |
| 369-1234 | 369-0001 | 8/21/93 | 09:01am | 20 Min |
| 369-1234 | 369-1002 | 8/21/93 | 10:15am | 15 Min |
| 369-1234 | 754-1065 | 8/21/93 | 10:48am | 10 Min |
| 369-1234 | 754-2000 | 8/21/93 | 11:02am | 12 Min |

| PHONE LOG B | | | |
|---|---|---|---|
| From | To | Date | Time | Duration |
| 754-2000 | 754-1500 | 8/21/93 | 8:30am | 14 Min |
| 754-2000 | 369-1234 | 8/21/93 | 9:25am | 18 Min |
| 754-2000 | 754-1065 | 8/21/93 | 11:45am | 10 Min |

| PHONE LOG B | | | | |
|---|---|---|---|---|
| From | To | Date | Time | Duration |
| 754-2000 | 754-1500 | 8/21/93 | 8:30am | 14 Min |
| 754-2000 | 369-1234 | 8/21/93 | 9:25am | 18 Min |
| 754-2000 | 754-1065 | 8/21/93 | 11:45am | 10 Min |

| PHONE LOG A | | | | |
|---|---|---|---|---|
| From | To | Date | Time | Duration |
| 369-1234 | 369-0001 | 8/21/93 | 09:01am | 20 Min |
| 369-1234 | 369-1002 | 8/21/93 | 10:15am | 15 Min |
| 369-1234 | 754-1065 | 8/21/93 | 10:48am | 10 Min |
| 369-1234 | 754-2000 | 8/21/93 | 11:02am | 12 Min |

FINANCIAL RECORDS

CHECKS ISSUED
901 ORGANIZATION [A]  $ 10,000
902 ORGANIZATION [B]  $ 15,000
903 ORGANIZATION [C]  $ 1,000
904 ORGANIZATION [B]  $10,000
905 ORGANIZATION [B]  $ 12,000

DEPOSITS
1- DEPOSIT  ORGANIZATION [A]  $ 10,000
2- DEPOSIT  ORGANIZATION [B]  $ 27,000
3- DEPOSIT  ORGANIZATION [C]  $ 15,000

FIG. 52

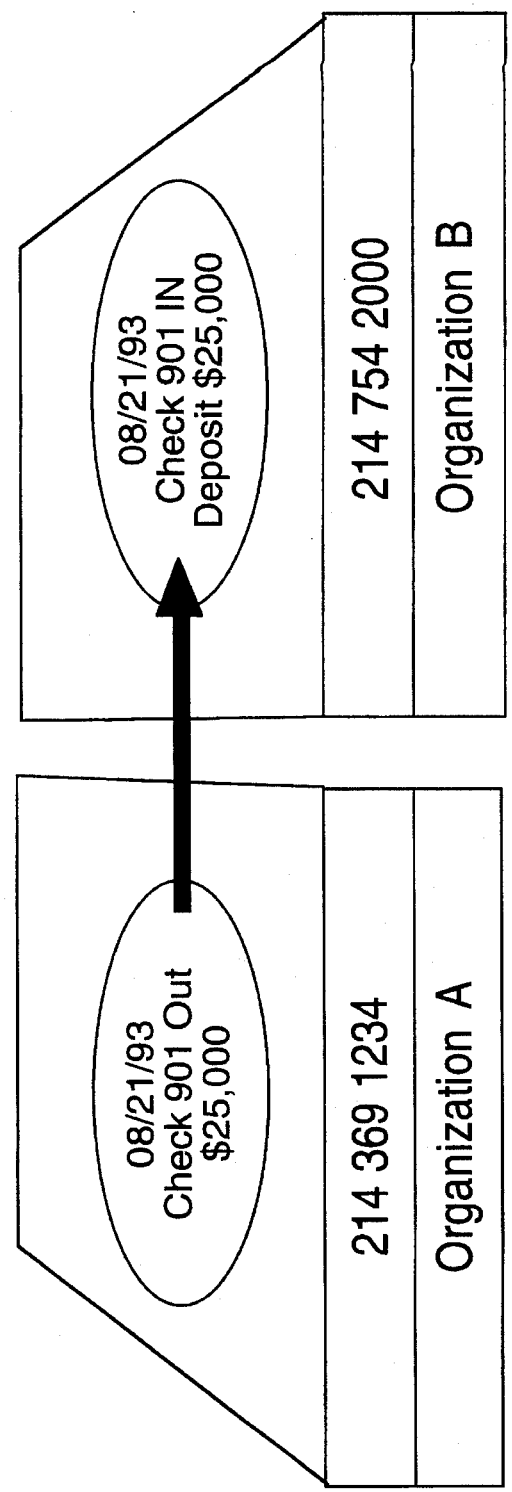

PROCESS FOR CONVERTING TWO DIMENSIONAL DATA INTO A MULTIDIMENSIONAL FLOW MODEL

BACKGROUND OF THE INVENTION

1. Field of Invention

The invention relates generally to a system for modeling complex projects or processes and, more particularly, to a system which takes information related to a project or process which can be generated in a textual format or a two dimensional flow model and converts this information into a multidimensional flow model which in a preferred environment is generated on a computer screen.

2. Description of the Prior Art

Both the private sector and the public sector have had to develop techniques to examine and manage various processes, projects, etc. In some situations billions of dollars may be allocated to a project which may have numerous private and public entities interacting. However, both big projects and small projects require managing and examining to understand and control cost, reporting, coordination of events, rescheduling, strategic planning, etc. Previously available techniques and technologies have attempted to address these issues by placing information in a 2-dimensional flow model or a flow diagram. These techniques are limited by the 2-dimensional environment in which they are model. This limitation inhibits an overall comprehension of a project or process by the viewer of the model and the limitations become more apparent as the complexity of the project or process increases.

Other currently available technologies including the Performance Evaluation and Review Technique [PERT], and Critical Path Method [CPM] and CPM's two techniques, Arrow Network Diagraming Method [ADM] and Precedence Network Diagraming Method [PDM] are 2-dimensional modeling systems which give priority to the start and or completion of events with work task lines that go from left to right (see FIGS. 1–14). Each of these 2-dimensional techniques allow each event, work task, or activity to be loaded with resource information such as dollars, manpower, equipment and materials. However, the output for the events, work tasks and activities are shown in either tabular formats or time line formats that read left to right.

SUMMARY OF THE INVENTION

HYPERCUBIC TUNNELING™ is a process that converts 2-dimensional data [relational data, text, information, etc.] into a multidimensional flow model. Any data that describes a process, be it an administrative, business or technical process or any relational data base or series of relational steps, tasks, activities or events can be modeled. The process is used to model organizational missions, its structural interfaces, procedures, policies and functions in a timed phase manner, in order to present a clear overview of the overall process being modelled. Much like aviation radar systems which track objects incoming and out-going in a three dimensional environment, HYPERCUBIC TUNNELING provides a similar tool. It integrates management components in a synergistic manner in a multiplane and multilevel environment including a time line.

HYPERCUBIC TUNNELING uses geometric shapes as its modeling basis. As used herein the term "modeling" includes mapping. Thru the utilization of polygon (such as a cube) surfaces, representative modeling of functional process elements are organized to produce a "4-dimensional" matrix (as used herein "4-dimensional" does not refer to four simultaneous spacial dimensions but rather refers to a model or screen display having three simultaneous spacial dimensions with a forth time dimension further including the ability to directly access a related model by selecting a desired location on the model being viewed and to use colors to identify, relate and/or segregate information; as used herein "multidimensional" is synonymous with "4-dimensional").

HYPERCUBIC TUNNELING™ gives a graphical representation of an organization performing tasks and its relationships and interfaces with other organizations, and their subtier of divisions, departments, groups, sections or personnel.

HYPERCUBIC TUNNELING™ represents the next generation of modeling techniques and provides an output with a time line that goes into the page rather than the conventional left to right. This revised timeline methodology allows for arrangement of geometric shapes (such as cubes/polygons) which are utilized to represent the organization being modeled, according to time. The geometric shapes are placed in an into the page, tunnel environment with the timeline going into the tunnel. This allows for the alignment of the geometric shapes according to a time scale.

The name of the organization is placed on the front face of the cube or polygon with the other surfaces of the geometric shape extending into the tunnel environment. Each of the remaining geometric surfaces in, for example, a cube including both the external 4 surfaces and internal 5 surfaces (9 combined surfaces) can be utilized to store information.

The information stored on a surface is preferably placed in an ellipse, although other single plane shapes or indicia can be utilized. Information or 2-dimensional data such as dates, descriptions of events, work tasks or activities are organized, broken down and rewritten in a basic or lowest level of desired functional display of descriptive text. This information is placed into the ellipse and the information containing ellipsis are placed on any of the external or internal faces and located on the appropriate organizational level of the geometric surfaces. The ellipsis are arranged according to time just as the geometric shapes are arranged according to time in the tunnel environment.

The ellipsis are connected by arrows in order to show logic dependencies between information such as events, work tasks, or activities being displayed. Different arrows can be used to represent different types of logic connections. Referring to FIG. 5, such arrows in a 2-dimensional representation include: [1] a finish to start relationship, [2] a start to start relationship, or [3] a finish to finish relationship. These relationships can also indicate any lead or lag values. The arrows can be labeled or indicate on their exterior surface what is being transmitted to the next event, work task, or activity be it information, a document, material, equipment or other resource completed by the preceding event, work task or activity.

The geometric shapes which are representative of primary organizations are further developed to show subtier or suborganizations. By placing a second layer geometrical shape such as a second cube and/or polygon on top of a primary cube or polygon surface the next tier or suborganizational level can be displayed and modeled. This layering may be repeated until the lowest desired organizational level or representation is accomplished by placing the next level of organizational structures on top of the cube or polygon surface of the previous organizational representation. As described above, events, work tasks and activities for other levels/suborganizations are placed in ellipsis and connected with logic arrows. This system can be used at any level of an organization being modeled and logic arrows may be used to interconnect information on different tiers. Unlike the 2-dimensional conventional representation the HT arrow connectors are required to be organized in a 3-D environment which requires a mapping of a topagraphical map environment.

Modeling of a single process utilizing the HYPERCUBIC TUNNELING™ technique is called a process plate. This technique allows and provides a methodology for modeling multiple processes both serial and consecutive. The ability of the HYPERCUBIC TUNNELING technique to do parallel processing of multiple processes creates an organized system for representing processes such as the project management process in a multi-dimensional environment.

In applying this technique to project management it is to be understood that the project management process is broken down into eight major sections according to the body of knowledge of the Project Management Institute. The eight major sections are as follows: [1] Scope Management, [2] Cost Management, [3] Time Management, [4] Communication Management, [5] Contract/Procurement Management, [6] Quality Management, [7] Risk Management, and [8] Human Resource Management. Each of these major sections is broken down into procedures and policies for addressing the functional tasks involved in managing subcomponents of each section.

The HYPERCUBIC TUNNELING technique and modeling methodology provides and allows for the harmonious integration of all of these project management processes and their subcomponents, subprocesses, procedures and policies. This method can model individual processes which we call a process plate or provide and integrate parallel processing model of all or any quantity of combined processes to be modeled. In a multi-process representation process plates can be stacked on top of each other similar to the stacking of dishes. Relationships between process plates are represented by the arrow connection coming from and going to the appropriate event, work task, or activity from the associated process plate. The stacking approach allows for both a vertical and horizontal stacking pattern or any combination of both.

The HYPERCUBIC TUNNELING technique includes a methodology for rolling-up and summarizing representations of processes. At the highest level roll-up, level one, a representation or model of a phase of a program or project on a time line is depicted. Each location of such a phase can be selected and the corresponding process plates can be horizontally and vertically stacked to represent the administrative, business and technical processes included during the phase of the program or project. The level one modeling also serves as a menu for all of the processes that have been integrated into the complete model.

To proceed to level two one can select a process plate represented or shown in the level one model. Level two then produces a model or horizontal representation of the process selected for viewing. To proceed to level three one would select any event, work task or activity shown in level two that had a sublevel of detail prepared for further describing the process series of work activities for accomplishing an event or work task. The fourth level continues to be a further breakdown of work activities describing any event or work task shown in level three with a sublevel of additional logic or process information.

HYPERCUBIC TUNNELING modeling can be output in several environments, such as, in a two 2-dimensional environment with the time line going into the page which provides the appearance of a 3-dimensional process model representation or in a 3-dimensional environment as a sculpture out of a vast number of construction materials. In the computer environment process modeling is automated by the HYPERCUBIC TUNNELING software, allowing the user to directly access and input any existing 2-dimensional relational data base or generated models. The HYPERCUBIC TUNNELING models can also be transferred into a virtual reality environment providing a 4-dimensional environment with user interface and interaction.

The file of this patent contains at least one drawing executed in color. Copies of this patent with color drawings will be provided by the Patent and Trademark Office upon request and payment of the necessary fee.

BRIEF DESCRIPTION OF THE DRAWINGS

FIG. 1 is a flow diagram on the history of development of PERT, CPM and PDM.

FIG. 2 is a diagram of the prior art critical path method scheduling.

FIG. 3 is an example of the prior art arrow network diagram.

FIG. 4 is similar to FIG. 3.

FIG. 7 is similar to FIG. 5.

FIGS. 8 thru 14 are further examples of prior art or conventional 2-dimensional modeling systems.

FIG. 17 is a function chart for scope management from the project management body of knowledge.

FIG. 18 is a quality management chart from the project management body of knowledge.

FIG. 19 is a time management chart from the project management body of knowledge.

FIG. 20 is a cost management chart from the project management body of knowledge.

FIG. 21 is a risk management chart from the project management body of knowledge.

FIG. 22 is a human resources management chart from the project management body of knowledge.

FIG. 23 is a contract/procurement management chart from the project management body of knowledge.

FIG. 24 is communication management chart from the project management body of knowledge.

FIG. 27 shows a prior art scheduling database based on FIG. 26 and the conversion of that database to a database used in the present invention.

FIG. 35 shows an example of assigning HT code to activity identification numbers for the placement of ellipsis on polygons.

FIG. 36 shows locations and relationships for the placement of the ellipsis on polygon surfaces.

FIG. 40 shows a setup menu used to develop a model for the present invention.

FIG. 41 is an illustration of several types of modeling configurations which can be generated by the present invention.

FIG. 43 is a diagram of the steps carried out to generate a multidimensional flow model using a computer system.

FIG. 44 is an example input screen for entering data into a computer using the invention.

FIG. 45 shows an example of how a cost account matrix can be converted to a cost account modeling incorporating the present invention.

FIG. 46a is a diagram of a patent process model incorporating the present invention.

FIGS. 52 thru 55 are similar to FIGS. 49 thru 51 with additional financial record information.

DETAILED DESCRIPTION OF THE INVENTION

HYPERCUBIC TUNNELING APPLICATION AND USAGE IN THE PROJECT MANAGEMENT PROCESS

Figures 5, 6:
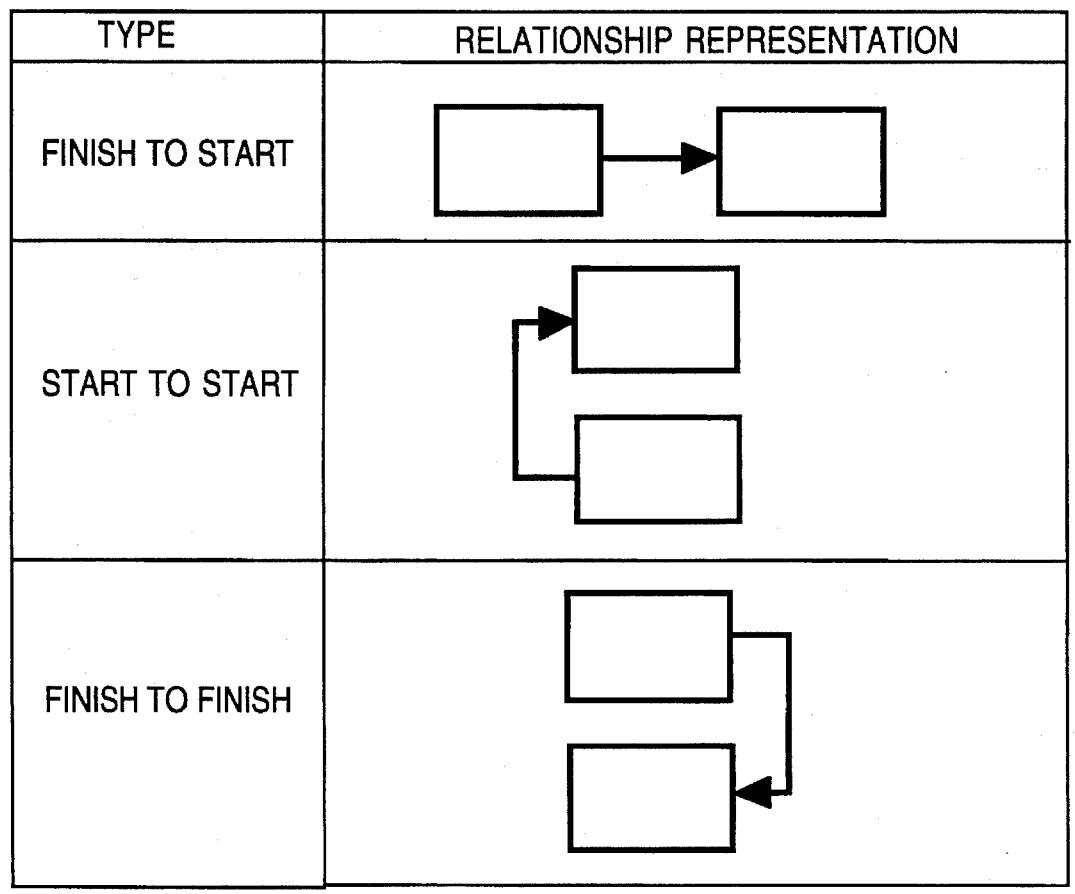
FIG. 5 is a 2-dimensional example of the various logical relationships.
FIG. 6 is an example of the prior art precedence network diagram.
Figure 8:
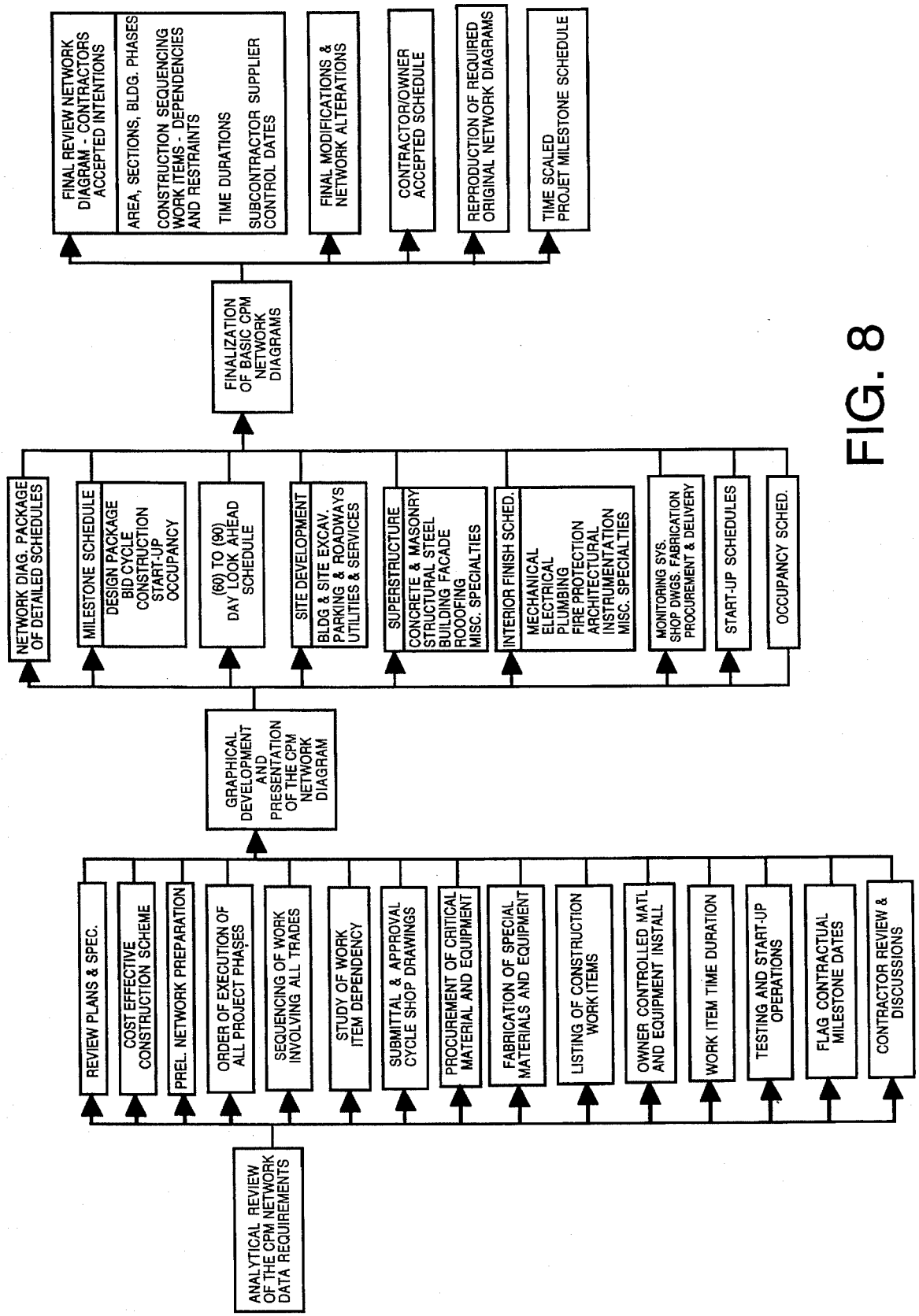
Figure 9:
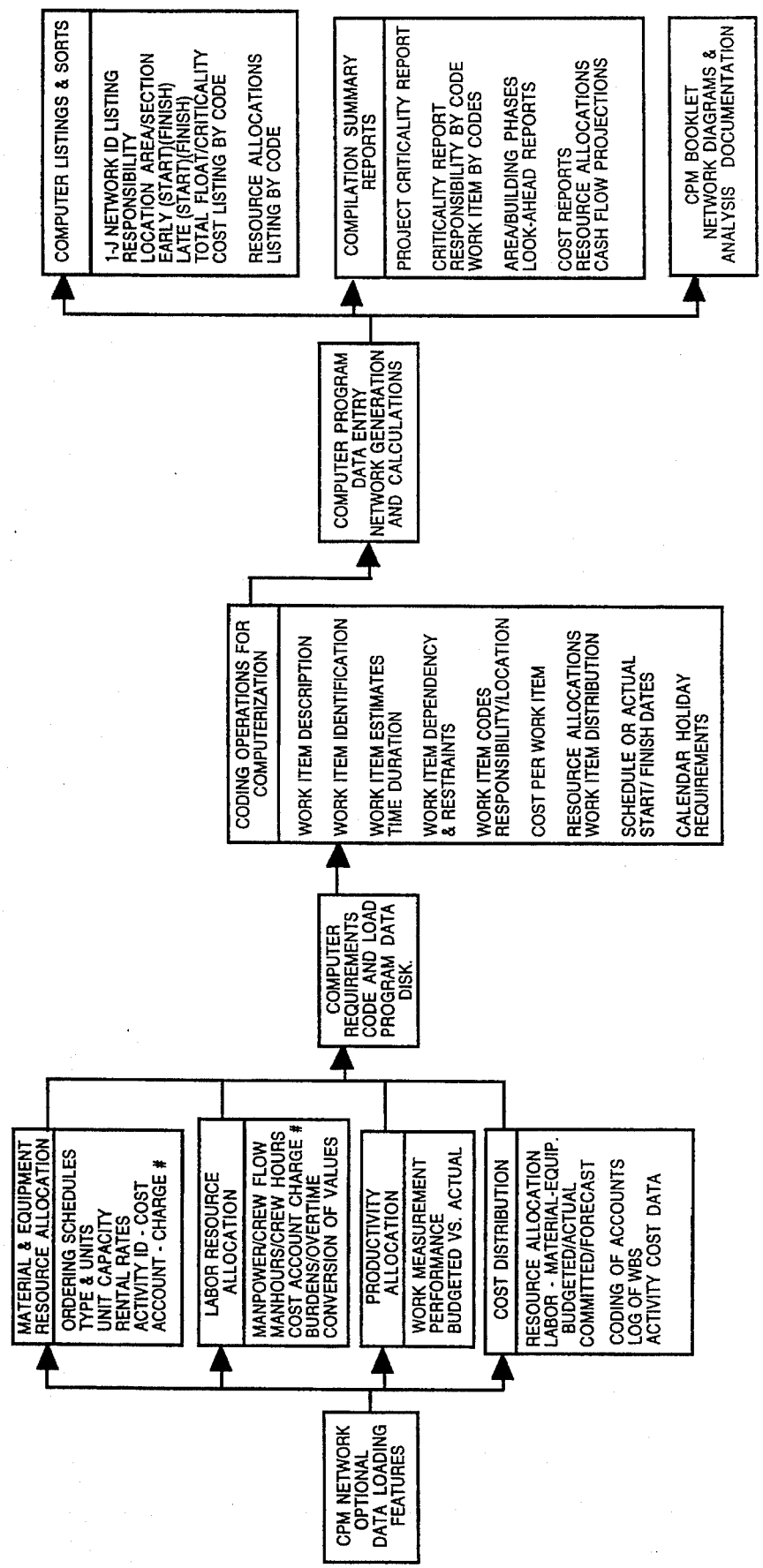
Figure 10B:
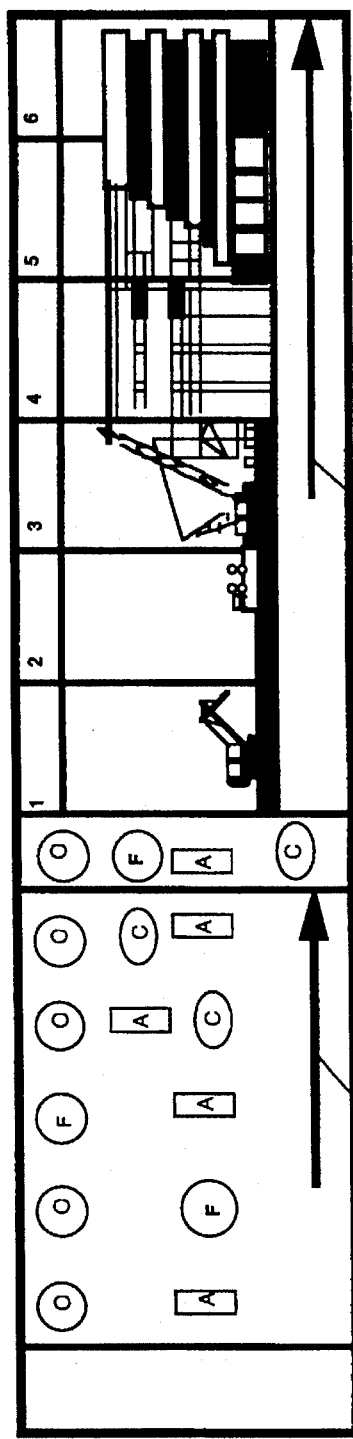
Figure 10C:
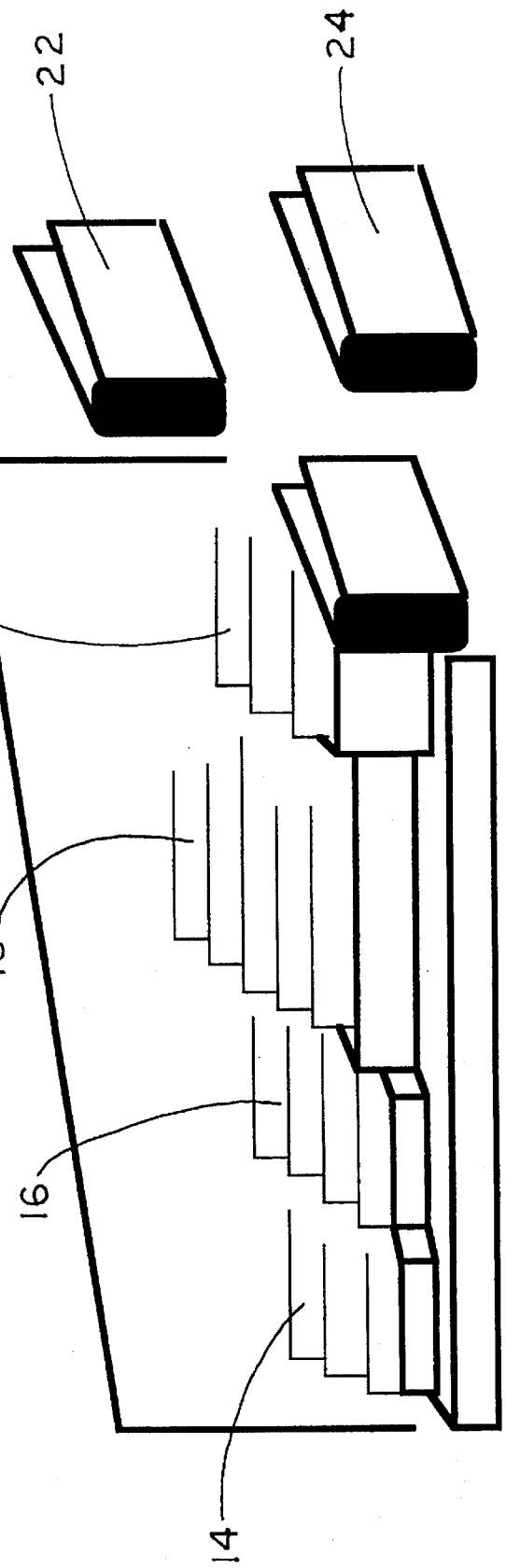
Figure 11:
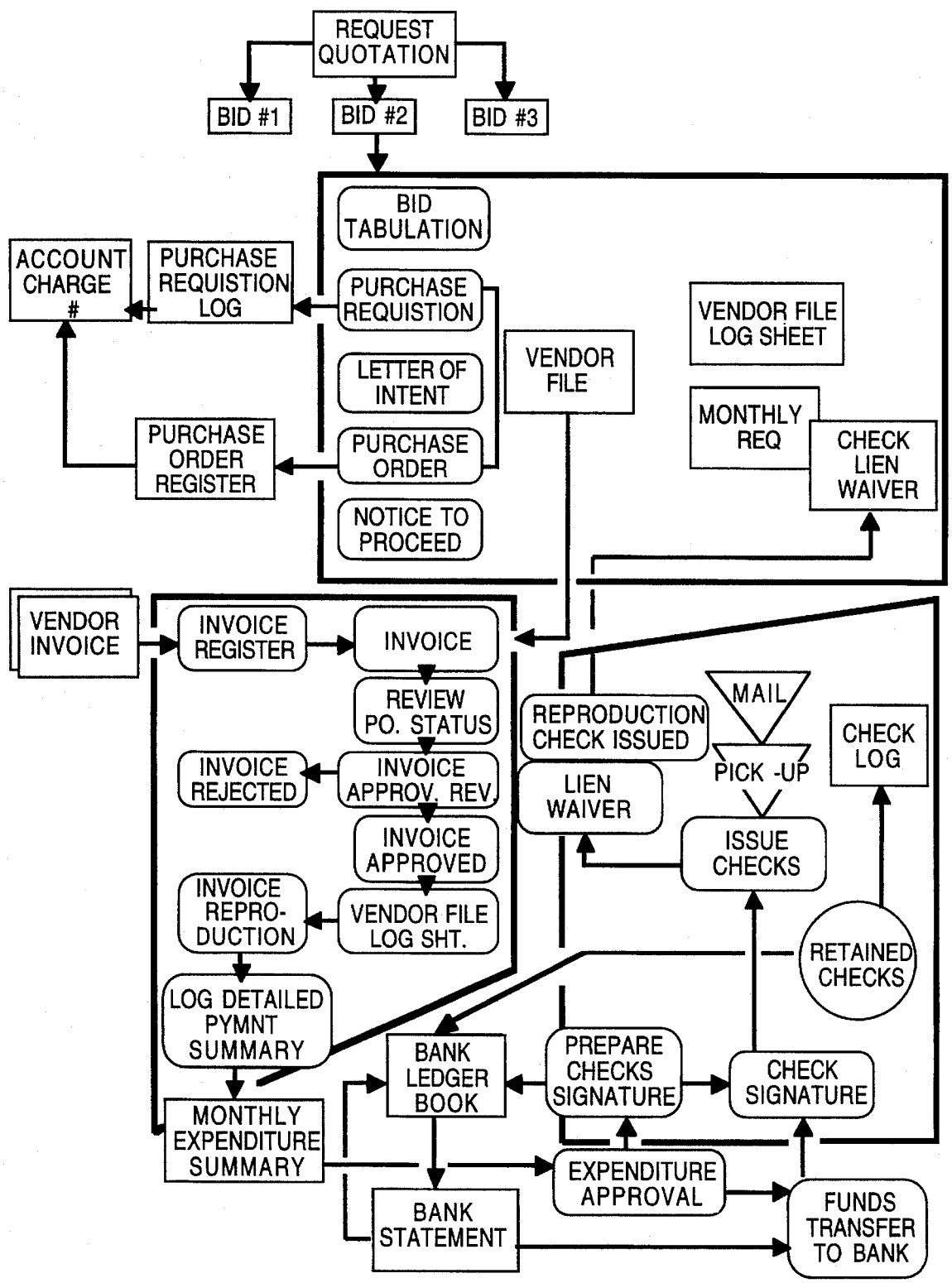
Figure 12:
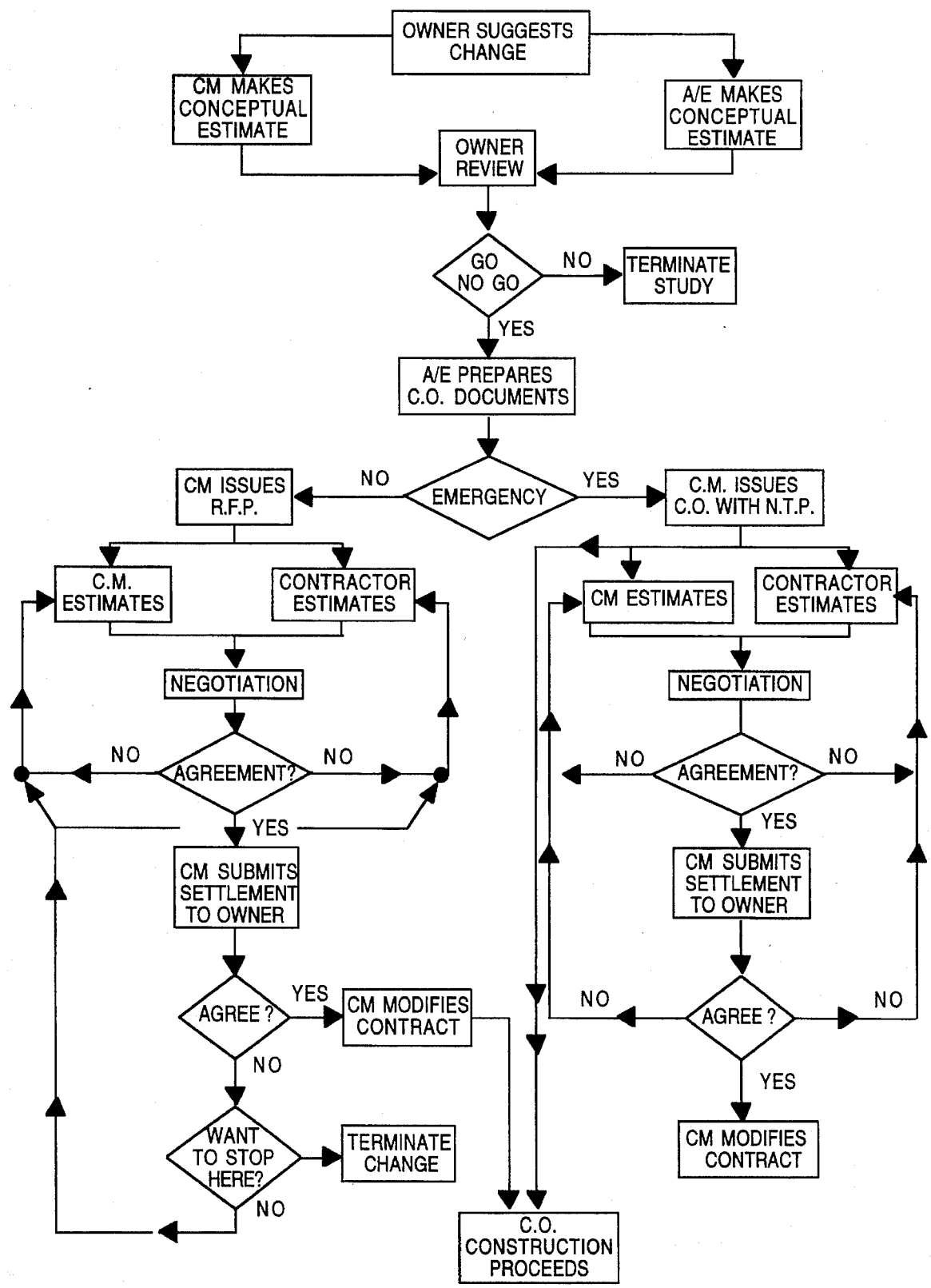
Figure 15:
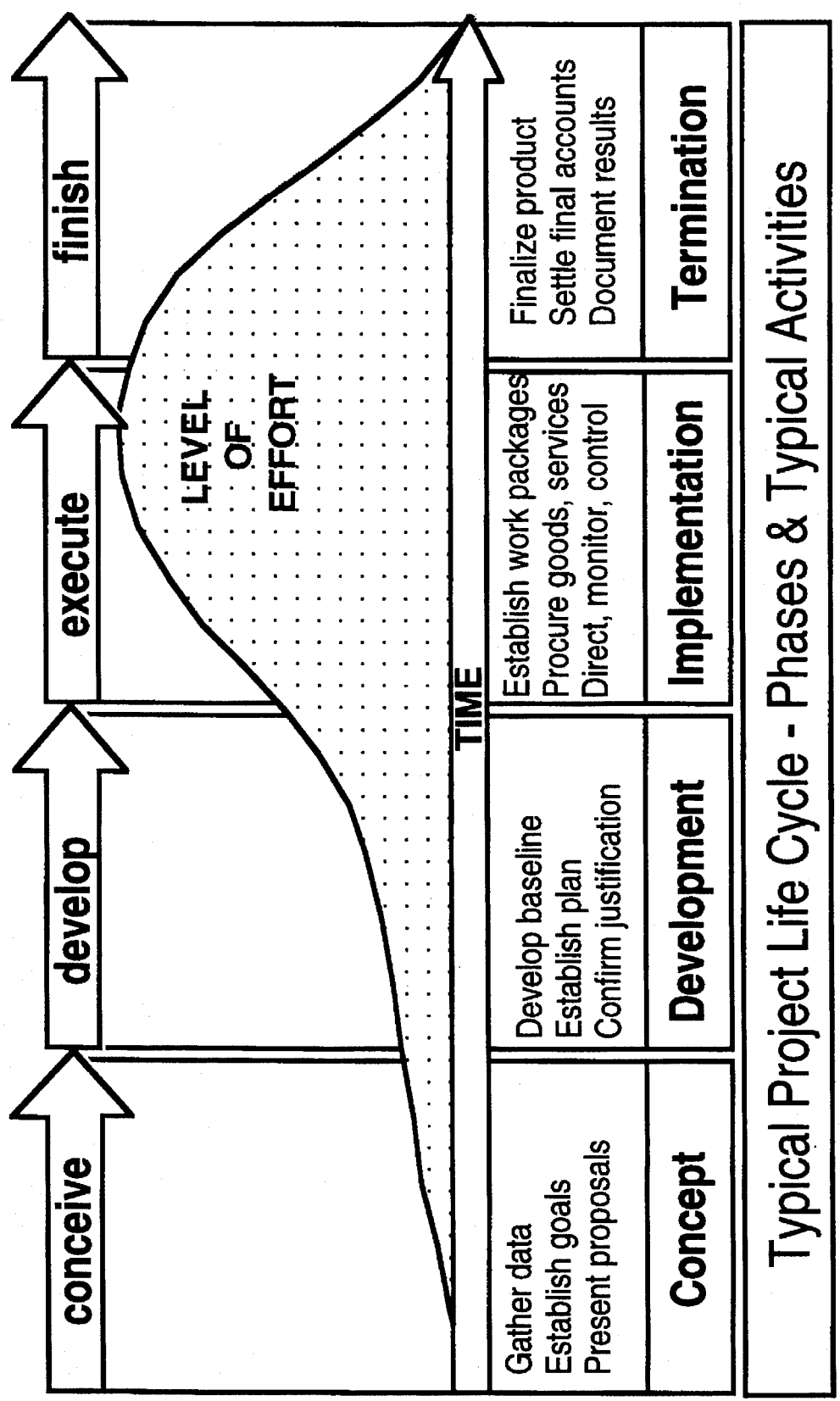
FIG. 15 is a diagram of the project life cycle four basic phases from the project management body of knowledge.
Figure 16:
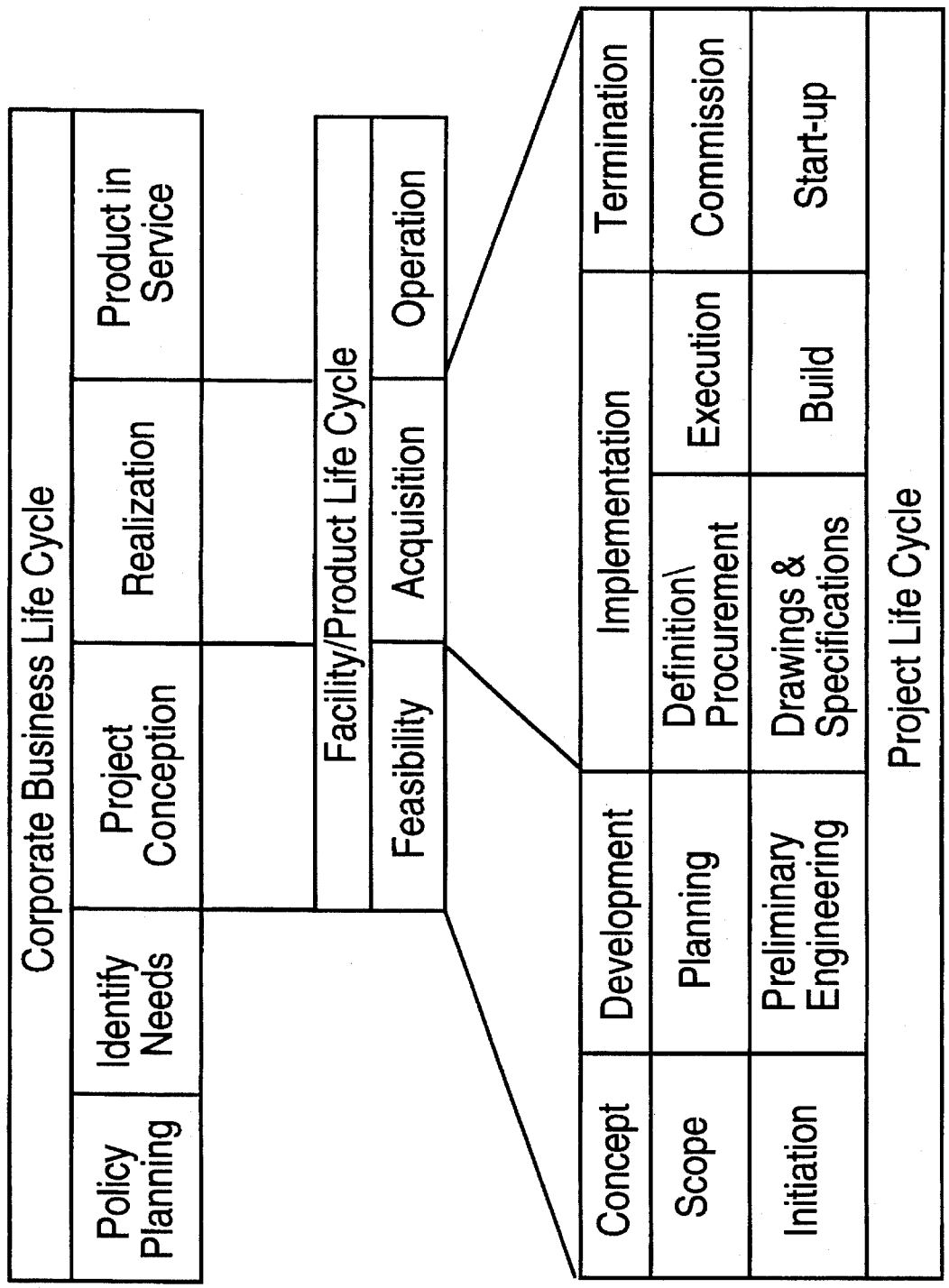
FIG. 16 is a diagram of the corporate business and facility/product life cycle from the project management body of knowledge.

As discussed above the present invention can be used to manage and examine numerous public and private sector projects or processes. For instance, the invention can be used in the corporate and facilities/product lifecycles to examine, project, and analyze operations, structure, goals, interrelationships. A corporation can make more informed decisions, whether it is growing or downsizing, by using the invention to examine inner workings within an organization. More specifically, an organization can examine and manage its administrative, business and technical informational and functional processes, and can identify at a glance interactions between cost, time and logistics as related to human, technical and environmental aspects of any given project or mission, allowing potential bottlenecks and mitigation of risk factors to be addressed and identified. One representative application of the invention would be its use in the project management process.

Referring to FIGS. 15 thru 24, in order to develop and gain an understanding of the project management process we refer to the body of knowledge of the Project Management Institute which has published a national and an international book on the project management body of knowledge [PMBOK], which is a consolidation of the basic management components of all commercial, industrial, and federal management processes.

The project management process as contained in the PMBOK is broken down into eight sections. Those major sections are as follows:

(1) Scope Management [PMBOK—Section A4]

(2) Quality Management [PMBOK—Section B4]

(3) Time Management [PMBOK—Section C4]

(4) Cost Management [PMBOK—Section D4]

(5) Risk Management [PMBOK—Section E4]

(6) Human Resource Management [PMBOK—Section F4]

(7) Contract/Procurement Management [PMBOK—Section G4]

(8) Communication Management [PMBOK—Section H4]

Each of these major sections is broken down into functional components as shown in FIGS. 18 thru 24.

The project life cycle is broken down into the following four management phases:

(1) Concept (2) Development (3) Implementation (4) Termination

The HYPERCUBIC TUNNELING technique, its 4-dimensional analytical methodology and display capabilities were developed to allow the project management professional a means for integrating and viewing all eight (8) major management sections thru each of the four (4) management phases, while focusing on organizations responsible for completing associated work tasks, thus providing a means to harmoniously integrate and interface the project management processes.

Since the project management process is applicable to all commercial, industrial, federal, state, and local governments, the present invention could set a new standard in communicating the project management process.

The HYPERCUBIC TUNNELING Technique and use of the base module for modeling creates a common language in which academicians, scientists, engineers, managers, administrators, and politicians can communicate effectively. It can be used to address the concerns, problems and changing needs of organizations, which require the integration of multiple disciplines in finding solutions.

Figure 25:
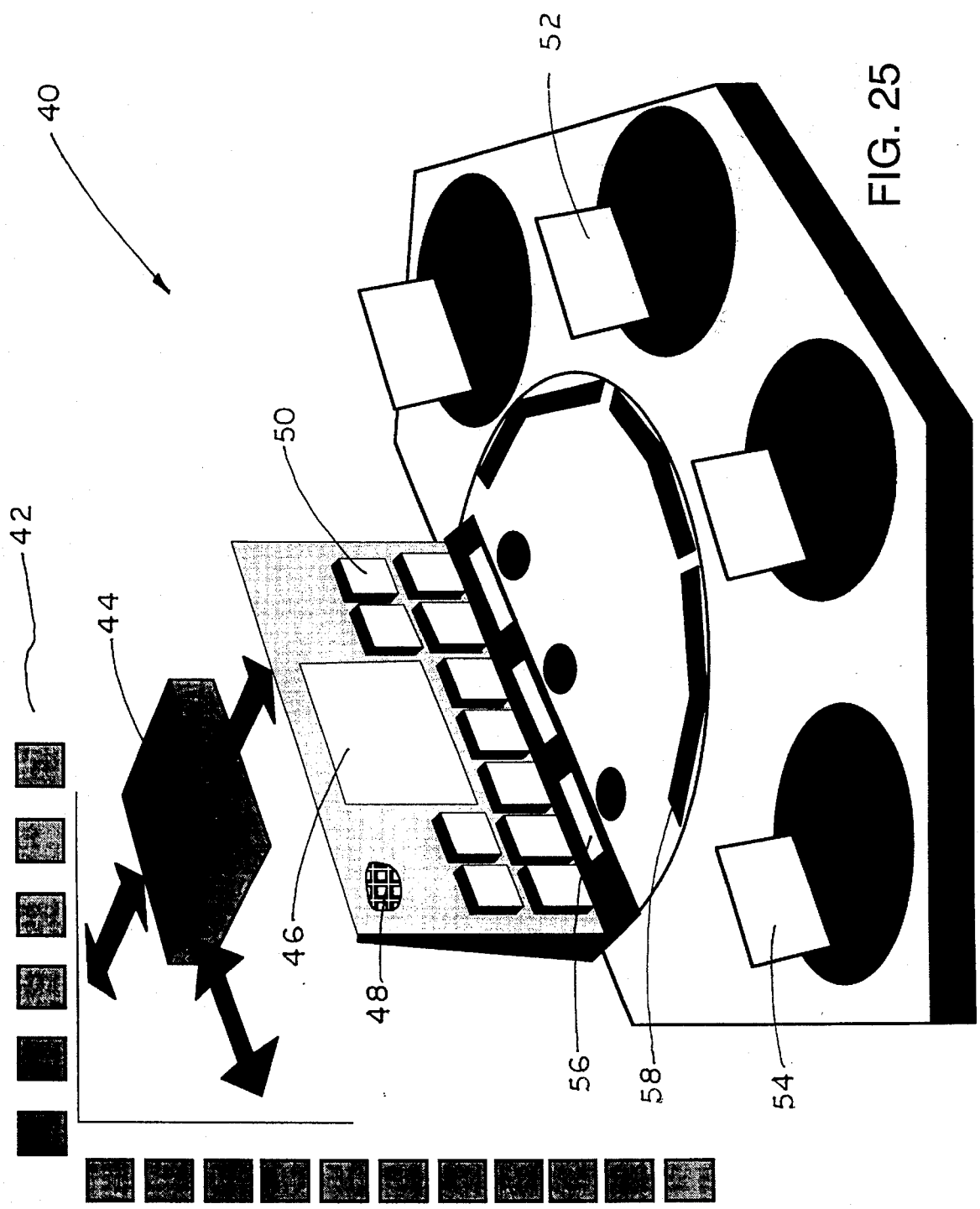
FIG. 25 is a diagram showing the invention integrated into a project management war or strategy room.

Referring to FIG. 25, the HYPERCUBIC TUNNELING technology can serve as the core component of a project management war room or strategy room where all management processes are synthesized and harmoniously displayed to model organizational missions, structural interfaces, procedures, polices and functions in a time phased manner, in order to present an overview of an entire project whether simple or complex.

Computerized systems were created in the past to generate two dimensional flow models. This information was stored in what can be referred to as a "scheduling database". The present invention allows existing scheduling databases to be imputed into the system and then converted for the ultimate production of a multidimensional flow model.

UNDERSTANDING EXISTING SCHEDULING DATA BASES

Overview

A scheduling Data Base consists of three types of files which are as follows:

1) Activity File
2) Relationship File
3) Code File Dictionaries

Activity File

The activity file record is a tabular listing of the activities in the scheduling data base. Each activity record contains the following type of information usually as a field which is associated with each activity record. The listing below is an example of the fields which are related to the activity record.

| Field | Field Name | Type | Width | Description |
|---|---|---|---|---|
| 1 | Activity ID No. | Character | 10 | Activity Identifier |
| 2 | Duration | Numeric | 4 | Duration |
| 3 | Activity Desc. | Character | 45 | Description |
| 4 | Calendar | Numeric | 3 | Calendar Number |
| 5 | ES Date | Date | 8 | Early Start Date |
| 6 | EF Date | Date | 8 | Early Finish Date |
| 7 | LS Date | Date | 8 | Late Start Date |
| 8 | LF Date | Date | 8 | Late Finish Date |
| 9 | SS Date | Date | 8 | Scheduled Start Date |
| 10 | SF Date | Date | 8 | Scheduled Finish Date |
| 11 | BL Start | Date | 8 | Baseline Start Date |
| 12 | BL Finish | Date | 8 | Baseline Finish Date |
| 13 | Actual Start | Date | 8 | Actual Start Date |
| 14 | Actual Finish | Date | 8 | Actual Finish Date |
| 15 | Target Start | Date | 8 | Target Start Date |
| 16 | Target Finish | Date | 8 | Target Finish Date |
| 17 | Free Float | Numeric | 5 | Free Float |
| 18 | Total Float | Numeric | 5 | Total Float |
| 19 | Budget Cost | Numeric | 10 | Budget Cost |
| 20 | Actual Cost | Numeric | 10 | Actual Cost |
| 21 | Progress Value | Numeric | 4 | Progress Value % |
| 22 | Progress Type | Character | 2 | Logic Code |
| 23 | Critical | Numeric | 2 | Critical Status |
| 24 | Logic Code | Character | 2 | Logic Code |
| 25 | Computed | Numeric | 3 | Computed % Complete |
| 26 | Physical | Numeric | 3 | Physical % Complete |
| 27 | Last A Cost | Numeric | 10 | Actual Cost to Last Period |
| 28 | Last Physical | Numeric | 3 | Physical % Complete to Last Period |
| 29 | Target S Type | Character | 2 | Target Start Date Type |
| 30 | Target F Type | Character | 2 | Target Finish Date Type |
| 31 | Code 1 | Character | 10 | Code Field No. 1 [wbs] |
| 32 | Code 2 | Character | 4 | Code Field No. 2 [OBS] |
| 33 | Code 3 | Character | 4 | Code Field No. 3 [System] |
| 34 | Code 4 | Character | 4 | Code Field No. 4 [Location] |
| 35 | Code 5 | Character | 5 | Code Field No. 5 [Phase] |
| 36 | Code 6 | Character | 3 | Code Field No. 6 [Function] |
| 37 | Code 7 | Character | 4 | Code Field No. 7 [Milestone Type] |
| 38 | Code 8 | Character | 6 | Code Field No. 8 [Design Rev. No.] |
| 39 | Code 9 | Character | 5 | Code Field No. 9 [Trade] |
| 40 | Code 10 | Character | 6 | Code Field No. 10 [Optional] |

Relationship File

Contains the Activity record ID No. for each Activity, and shows the Predecessor (the Activity which proceeds the start of the Activity being listed) and the Successor Activity (that which can start after completing of the Activity being listed). Both the predecessor and the Successor activity type is displayed. Relationship types are as follows: a finish to start relationship [FS], a finish to finish relationship [FF], a start to start relationship [SS].

The relationship File is a tabular file and would be represented for example as follows;

| Predecessor | Activity | Successor |
|---|---|---|
|  | 001 | 002 FS |
| 001 FS | 002 | 003 SS |
|  |  | 004 FS |
| 002 SS | 003 | 005 FS |
| 002 FS | 004 | 005 FF |
| 003 FS | 005 | 006 |
| 004 FF |  |  |

The Code Files

Contain the Dictionary for the Code Fields listed in the Activity File Records. The Code File contains the code and the descriptions which are assigned to each code listing. There is a code field dictionary for each code field found in the Activity File.

| Code File: for Code Field No. 2 [OBS] | |
| --- | --- |
| Code | Code Description |
| A | Organization A |
| A1 | Organization A Department No. 1 |
| A2 | Organization A Department No. 2 |
| B | Organization B |
| B1 | Organization B Department No. 1 |
| B2 | Organization B Department No. 2 |
| B2A | Organization B Department No. 2 Section A |
| B2B | Organization B Department No. 2 Section B |
| B3 | Organization B Department No. 3 |
| C | Organization C |
| C1 | Organization C Department No. 1 |
| C2 | Organization C Department No. 2 |

The present invention can be used to attach to and interpret several database families including D-base; X-base; R-base; ASCII delimited, delimited data files, etc. (the system can be used on databases other than project management databases).

Figure 26:
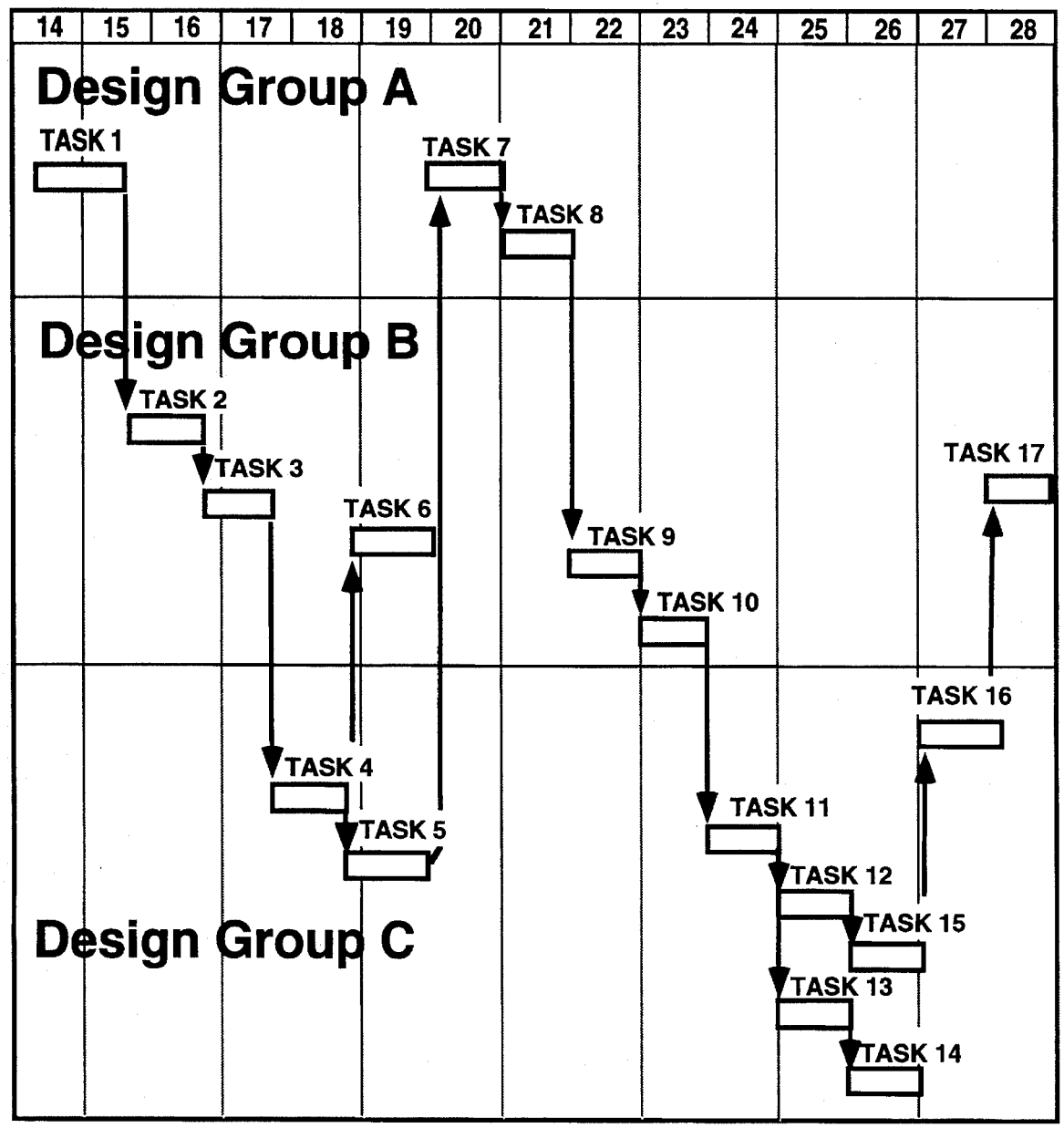
FIG. 26 is an example of a prior art conventional (ghant chart or bar chart) flow diagram/schedule.
Figure 28:
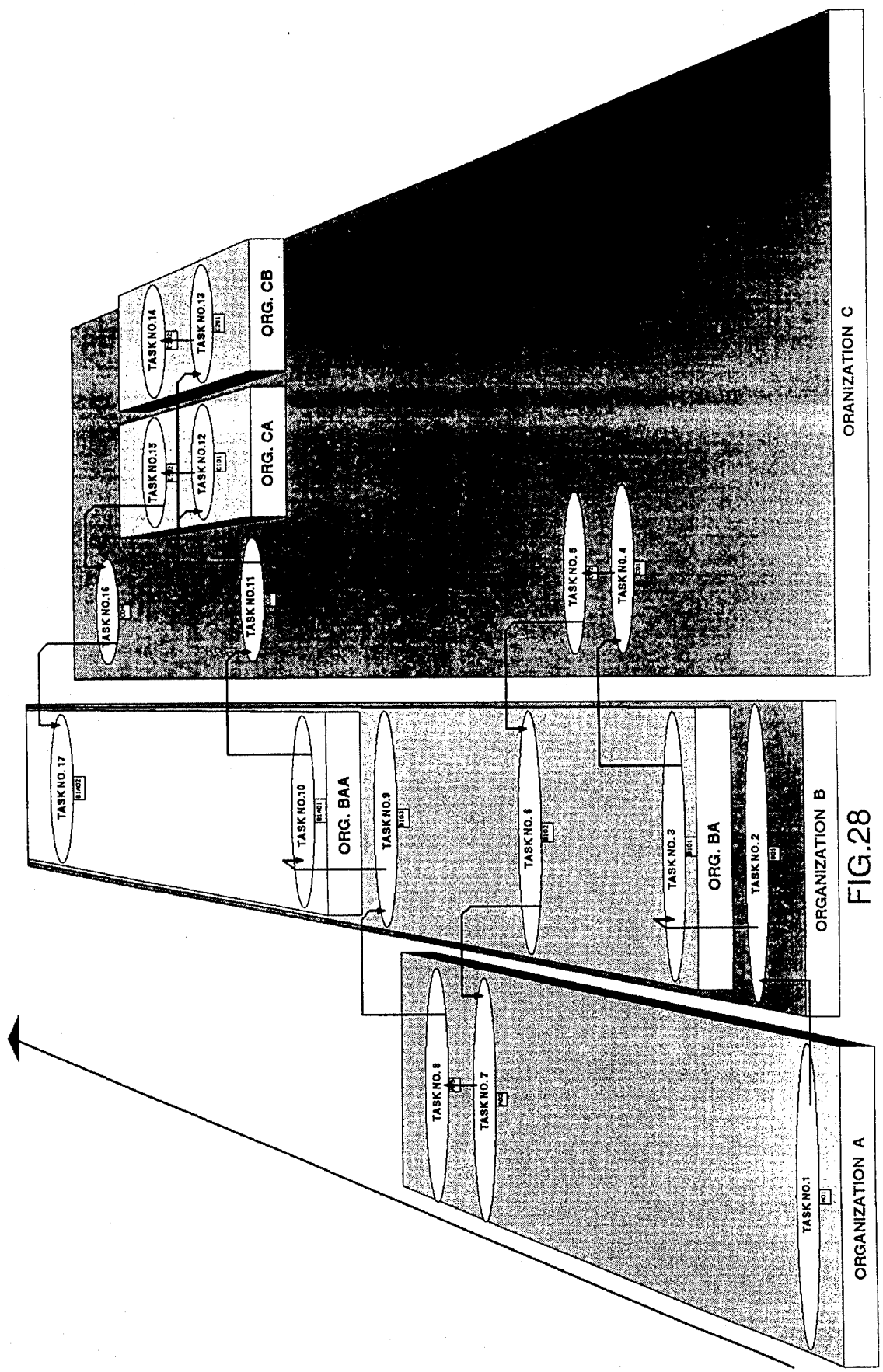
FIG. 28 is a model or process plate generated by the present invention based on FIGS. 26 and 27.
Figure 29:
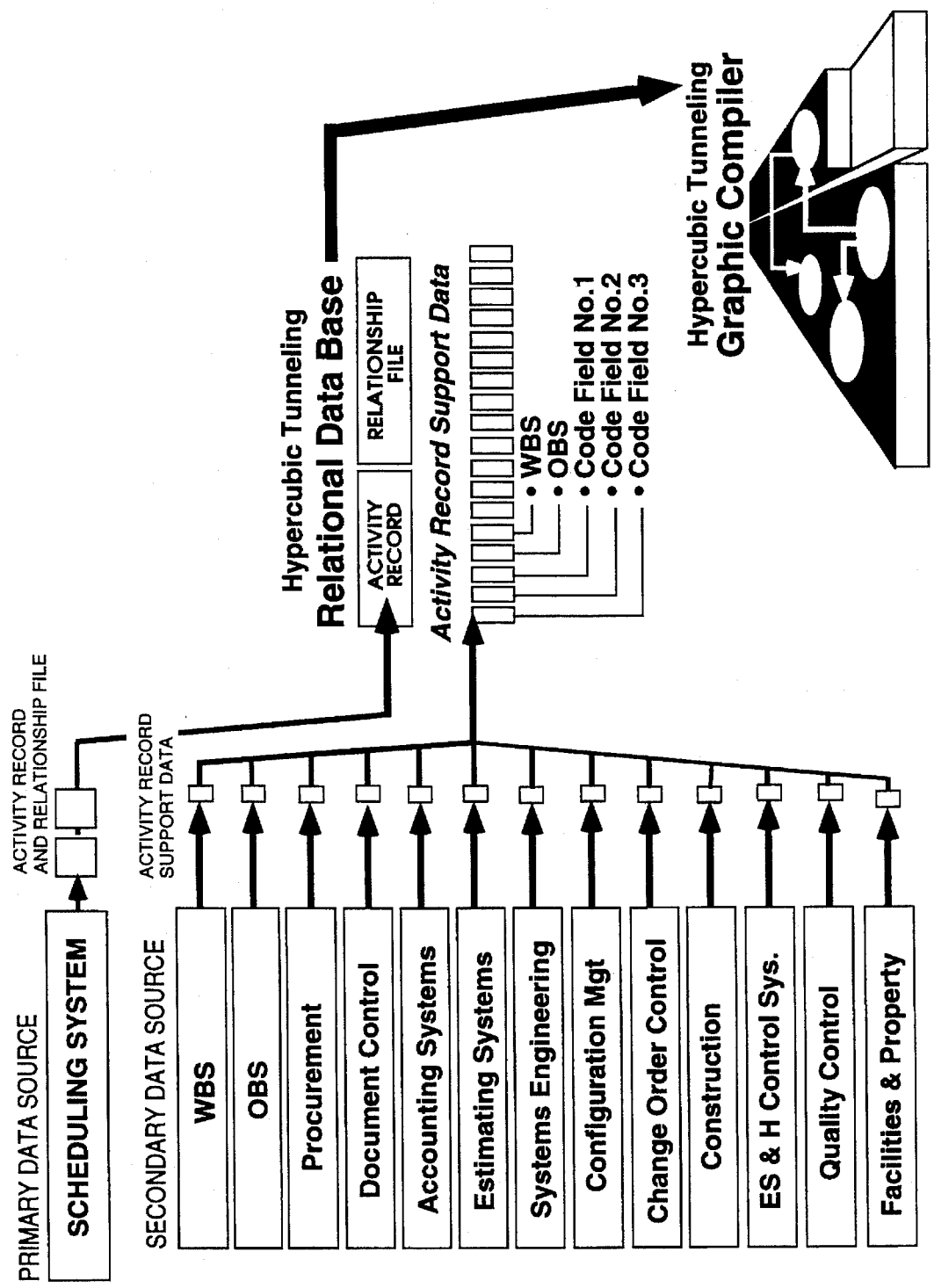
FIGS. 29 thru 31 are diagrams illustrating conversion from an existing or prior art scheduling database to the database used in the present invention.
Figure 30:
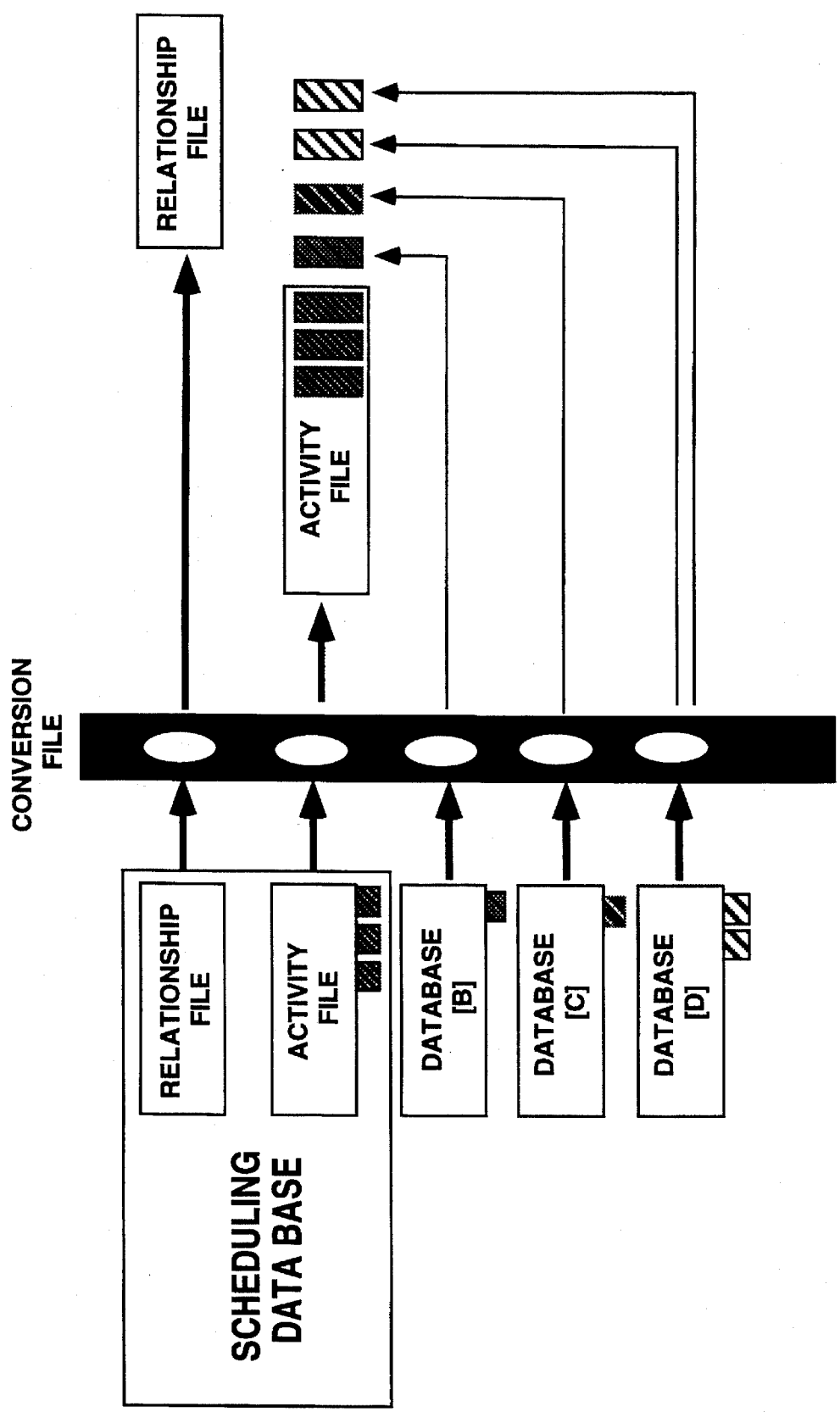
Figure 31:
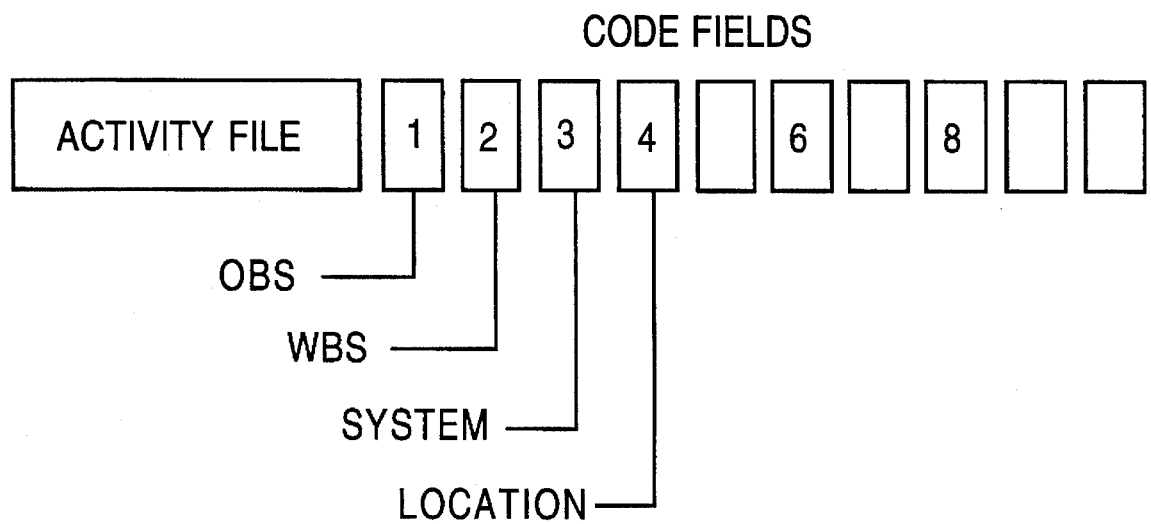

Referring to FIG. 26 a group of activities or tasks are shown. These tasks are related or connected by logic arrows (finish to start). FIG. 27 shows the activity file and the relationship file for the process shown in FIG. 26 and shows how the existing database can be converted to the HYPERCUBIC TUNNELING database. Once the conversion to the HYPERCUBIC TUNNELING database is made the computer program which is the subject matter of U.S. Copyright Registration No. TXU 578814 which is incorporated herein by reference can be used to process the data and generate the multidimensional flow model shown in FIG. 28. FIGS. 29 thru 31 further illustrate the conversion of data from existing databases to the HYPERCUBIC TUNNELING database. A more detailed description of how the converted data is used to generate the model is included below.

THE HYPERCUBIC TUNNELING BASE MODULE COMPONENT LEGEND

Figure 32A:
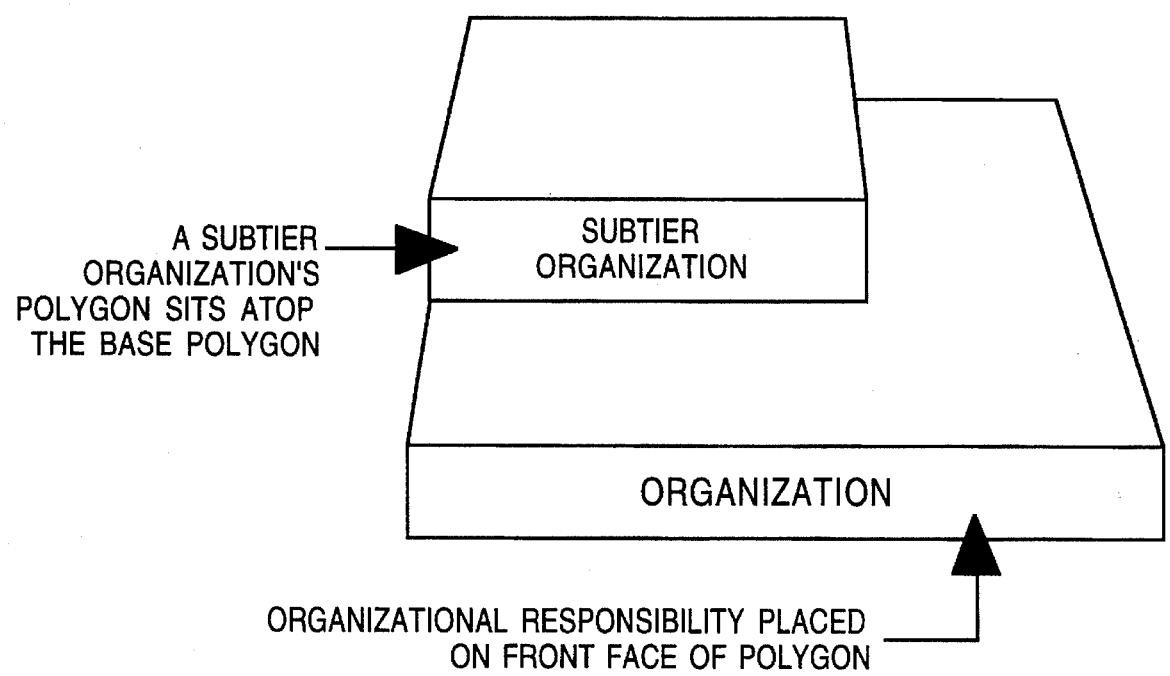
FIG. 32 is a diagram of the HYPERCUBIC TUNNELING base module.
Figure 32B:
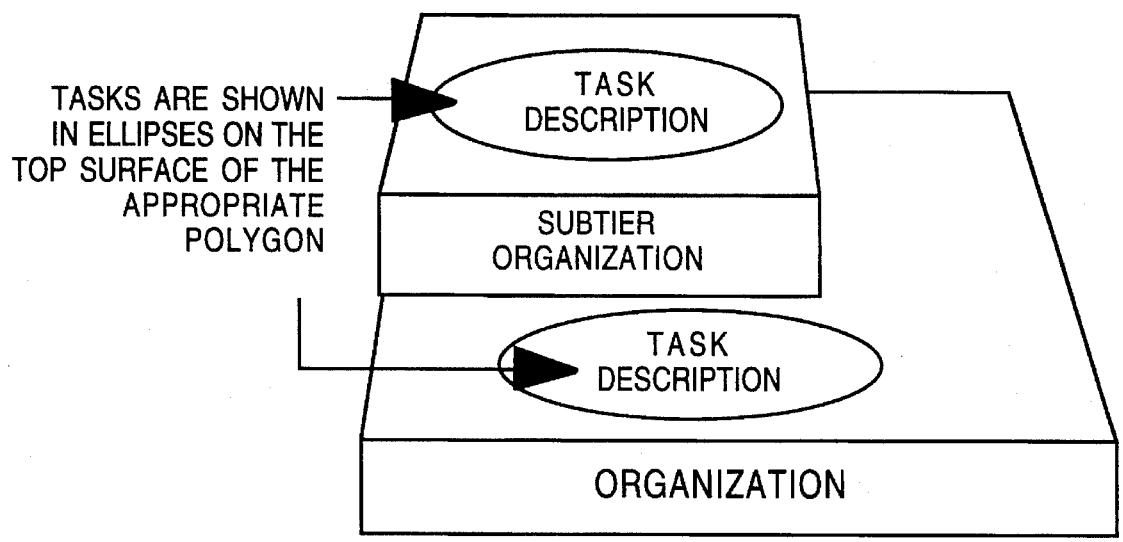
Figure 32:
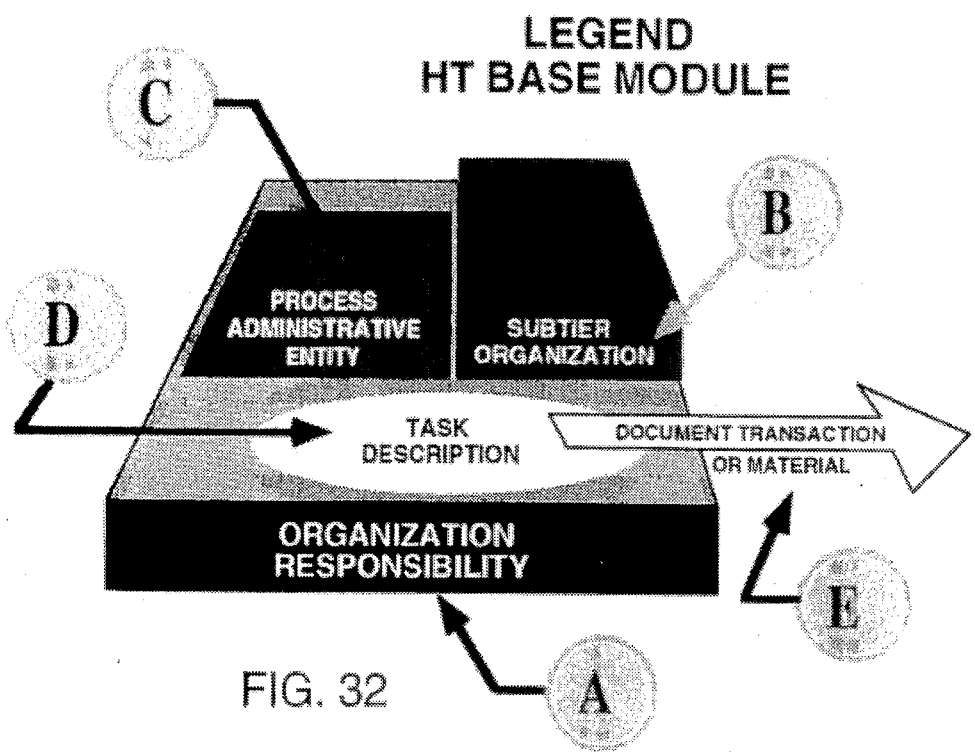

HYPERCUBIC TUNNELING uses geometric shapes such as polygons as its modeling basis. Through the utilization of cube/polygon surfaces, representative modeling of functional process elements are organized to produce a 4-dimensional matrix. FIG. 32 shows a basic formation constituting a base module.

HYPERCUBIC TUNNELING focuses on giving priority to an organization performing tasks and its relationships and interfaces with other organizations, and their subtier of departments, groups and sections. In FIG. 32, the [A] reference pointer indicates the front face of the cube/polygon (other 3-dimensional shapes can be utilized and may be required to create a desired number of surfaces upon which information can be placed) which is the locations where organizational responsibility is placed.

A cube/polygon placed above another cube/polygon represents a subtier organization as shown in FIG. 32 reference [B]. Within an organization or subtier of that organization a process administrative entity is shown by the shaded area on the top face of the cube/polygon as represented by reference [C].

Tasks performed are shown in the ellipse as indicated by reference [D] and are located on the cube's top surface of the appropriate organization, subtier organization or administrative entity. The logic connection between tasks are shown by arrow logic connectors [E]. With arrow logic connectors, document or material transactions between tasks are shown.

DEVELOPMENT OF THE HYPERCUBIC TUNNELING TIME LINE

Figure 33:
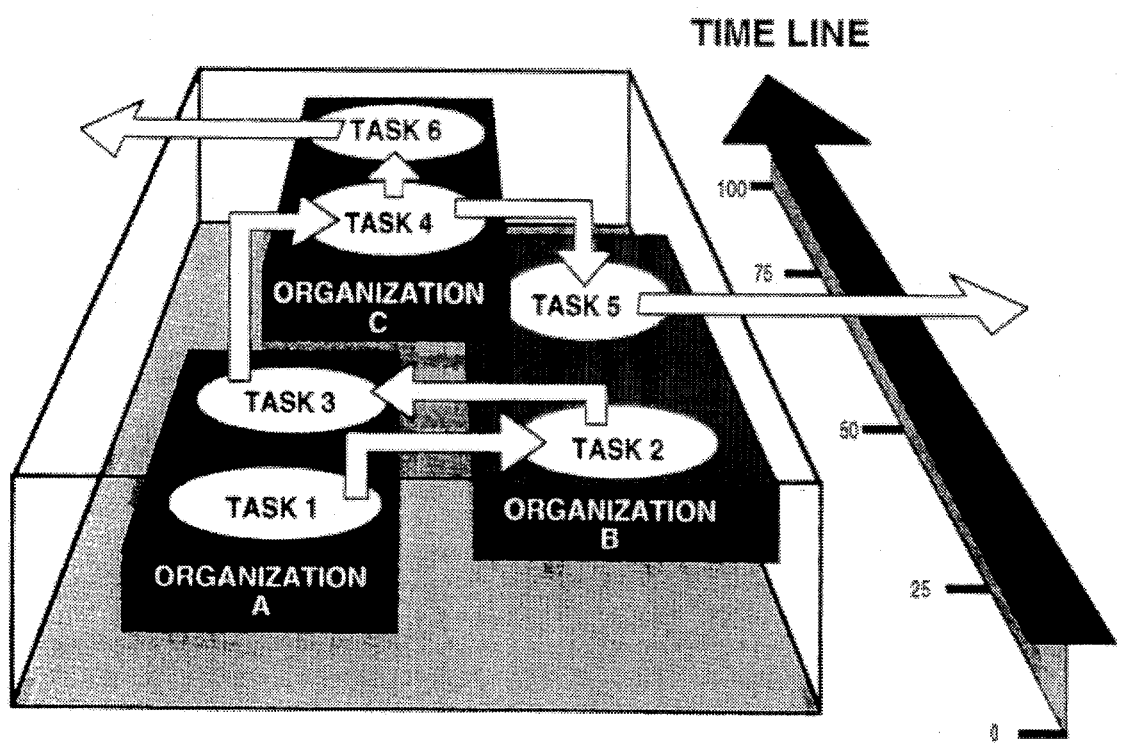
FIG. 33 is a diagram of the HYPERCUBIC TUNNELING flow model.

Referring to FIG. 33, the HYPERCUBIC TUNNELING Technique utilizes a time line that goes into the page rather then the conventional time line that goes left to right in a 2-dimensional environment. Since the invention uses a 3-dimensional environment with geometric shapes for modeling a new approach to dealing with time representation is required. The development of the tunneling concept as shown in FIG. 33 illustrates the basic concept.

The tunneling method for time representation allows the geometric shapes to be placed within the tunnel and the ellipsis which represent the activities events, or work tasks to be positioned on the geometric shapes based on their relative relationship to the time line within the tunnel environment. the arrow connections which provide the logic ties are then made between the ellipsis and their corresponding positions on the polygons, whether they reside on the base polygon, children or subset as discussed in more detail below.

The utilization of the tunneling approach allows the production of a 4-dimensional output in a 2-dimensional environment, with the time line going into the page rather than the standard left to right as used by other critical path method applications. The HT Base Module referred to earlier in FIG. 32 is utilized to convert standard analytical models into the tunneling concept with great ease and clarity.

AUTOMATED DEVELOPMENT OF POLYGONS

Figure 34:
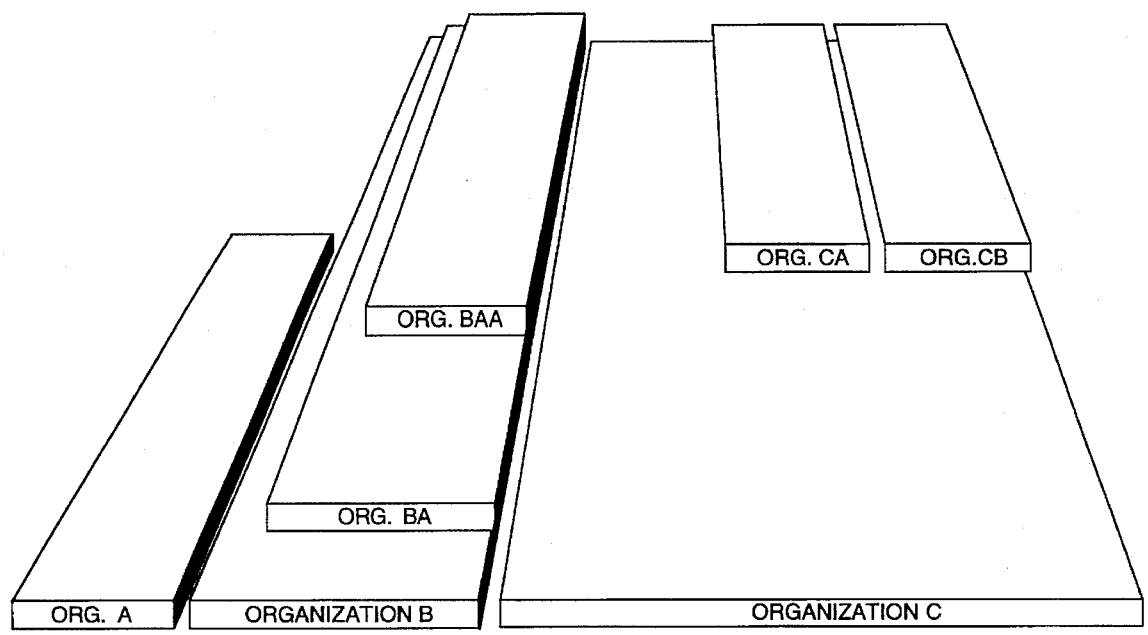
FIG. 34 is a diagram illustrating the conversion of data for the development of polygons.

Referring to FIG. 34, the polygons are produced by attaching to a code field. This is done by calling out the code field (a predefined category of related information) to be modeled (computer generated screen display models are built upon code fields called out by the user) which is located in the HT model preparation/convert file menu of the software.

Code fields reside in the Activity file for each activity record. The description for each code in a code field is located in the Code file which is the dictionary for each code in the code field.

Priority is given to the organization or modeling code. This code can relate to an organization, location, system, function, responsibility, phase, wbs, obs, milestone type, trade, or any assignment of a code to an activity record which might be given.

FIG. 34 is an example of a code file, which shows the code characters on the left and the code description on the right. The code characters are found in each activity record for the selected activities to be modeled. The HYPERCUBIC TUNNELING program first looks at all activities selected and finds all code field characters in that selection. The system then attaches to the code file which is the dictionary for the code field characters and converts that information into a representation of polygons, a base polygon for a primary code character and a secondary or stacked polygon for the primary code children. A code description is extracted from the code file dictionary and preferably appears as text on the front face of the polygons.

FIG. 34 also shows a representation of what the codes would look like on a computer generated screen display. The actual size and length of the polygons are based on the amount of ellipsis which are placed on the polygon surfaces. Polygon development is the same for schedule, process, or log modeling. All activity records require a code to be modeled.

The same applies to developing models manually using the HYPERCUBIC TUNNELING technique. One generally needs to research, develop or assign the names of all of the organizations being modeled.

FIG. 34 also shows an example of the Code Character [HT Code] reassignment that takes place inside the HYPERCUBIC TUNNELING software in order to allow the system to generate a model of the polygons from the code characters. As not all prior coding methodologies are the same this system allows for standardization of prior coding methods for the modeling calculations.

THE POLYGON HT CODE

The First Digit of the HT Code [e.g. "E"M300A] indicates a Primary or Secondary modeling request. The 3 digit number which follows indicates whether it is a base polygon, an example is that E200 is a base polygon, E201 is a child or subset at the next or 2nd level up, and E202 would be a subsequent and consecutive child or subset at the third level up. The last alpha character indicates how many polygons are assigned to the levels. An example is E301A and E301B are both polygons assigned to the 2nd level of the E300 base Polygon. All existing database code fields which are used for modeling from an existing activity record are reassigned the HT Code for modeling while maintaining their original code description.

PLACEMENT OF THE ELLIPSIS

The ellipse is placed on the top face of the polygon and contains the description of a work activity, event, or task. Other attributes or descriptions which can be shown if selected are the activity identification, duration, dates which can include early start/finish dates, baseline start/finish dates, target start/finish dates, baseline start/finish dates, schedule start/finish dates; Float: free/total float values; Cost: budgeted, actual,completed to date, remaining funds or any other fields found in the activity record.

If an entire schedule is to be displayed then it is selected and all of the activities in the activity file will be shown. If a selected set of activities are to be shown then one would filter the desired activities by using the code file or code fields as a filtering mechanism. Depending on the code development and intelligence one could filter on or chose from any combination which my include, organization, wbs, location, phase, system, function, trade, milestone type, activity type, or any other optional code file in the activity record.

FIG. 35 shows an example of the Activity Identification Number reassignment that takes place inside the HYPERCUBIC TUNNELING software in order to allow the system to place the ellipsis on the top faces of the polygons. As stated in the section discussing the polygon development the HT Code is developed each time a set of models are specified for modeling based on the selection of code fields to be modeled. The HT Code is also assigned to activity Identification Numbers to assist in the placement of activities onto the corresponding polygons (be it the parent polygon or associated polygon children or subset). Thus, each model has a unique computer generated screen display specification which includes the code fields to be modeled and the filtered activities to be displayed based upon a unique set of HT Codes used to create the computer generated screen display.

Activities are then given a specific set of placement instructions to indicate placement, first, by one of the following configurations Early Start/finish date, Late Start/finish date, Baseline start/Finish date, Target start/finish date, then second, by the activity identification number or any other combination of fields that reside in the activity record.

Although this initial set of rules tells the system which polygon the activities are to be assigned to final placement depends on the placement of the arrow connection or dependencies that are shown in the relationship file. To accomplish this the new HT Code which is assigned to the activities for polygon placement is synthesized with the relationship file by reassigning the HT Codes assigned to the activity identification in the activity file to the corresponding activity identification in the relationship file.

ELLIPSE RELATIONAL DIMENSIONS

A generated model can be more readily comprehended by the viewer when an order is given to spacing or relational dimensions of ellipsis. Dimensions are programmable within the software. However, some of the standard relational dimensions used in placing the Ellipsis on the top face of the Polygons are shown in FIG. 36. The over riding dimensional rule is one which would place the ellipse the farthest into the polygon, since an activity may have several Relationship arrow connections. The date selected is also used in the placement of ellipsis on the polygons. The relational tie dimension is used when a set of ellipsis have the same date or where durations to calculate dates are given.

THE ACTIVITY HT CODE

Figures 37A, 37B:
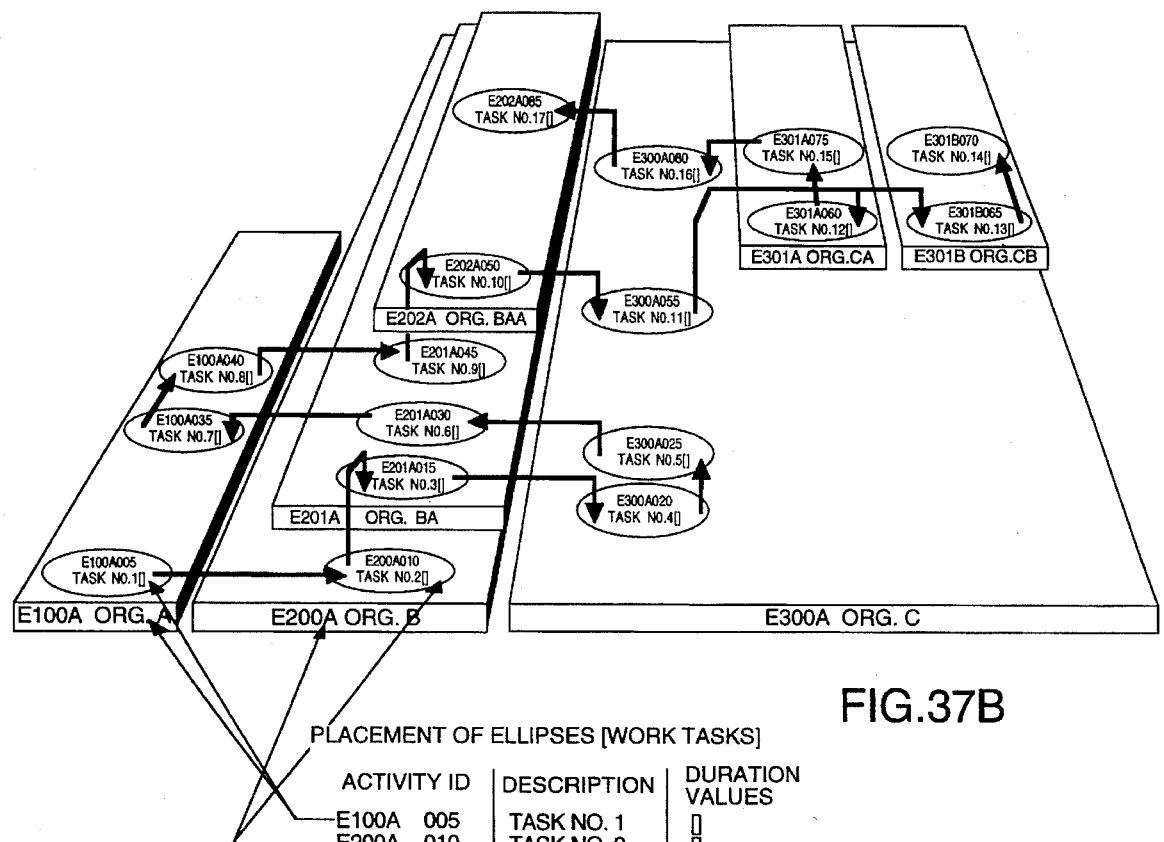
FIG. 37 shows an example of database integration into the present invention for placement of ellipsis within polygons.

FIG. 37 shows an example of the Activity ID number reassignment that takes place inside the HYPERCUBIC TUNNELING software in order to allow the system to place the ellipsis on the top face of the polygons. The HT Code which is initially assigned to the polygons is derived from the code field characters and restated as the HT Code. So a polygon along with activities assigned to corresponding polygon locations share the same location code. In the case of the activity id numbers the HT code is assigned and positioned in front of existing database activity identification numbers. As stated in the section discussing polygon development the HT Code is developed each time a set of models are specified for modeling based on the selection of code fields to be modeled. The HT Code is also assigned to the activity Id numbers to assist in the placement of activities on the corresponding polygons, be it the parent polygon or associated children or subset. Each generated model or representation has a unique set of HT Codes.

PLACEMENT OF THE ACTIVITY RELATIONSHIP ARROW CONNECTORS

Figures 38, 39, 39A, 39B:
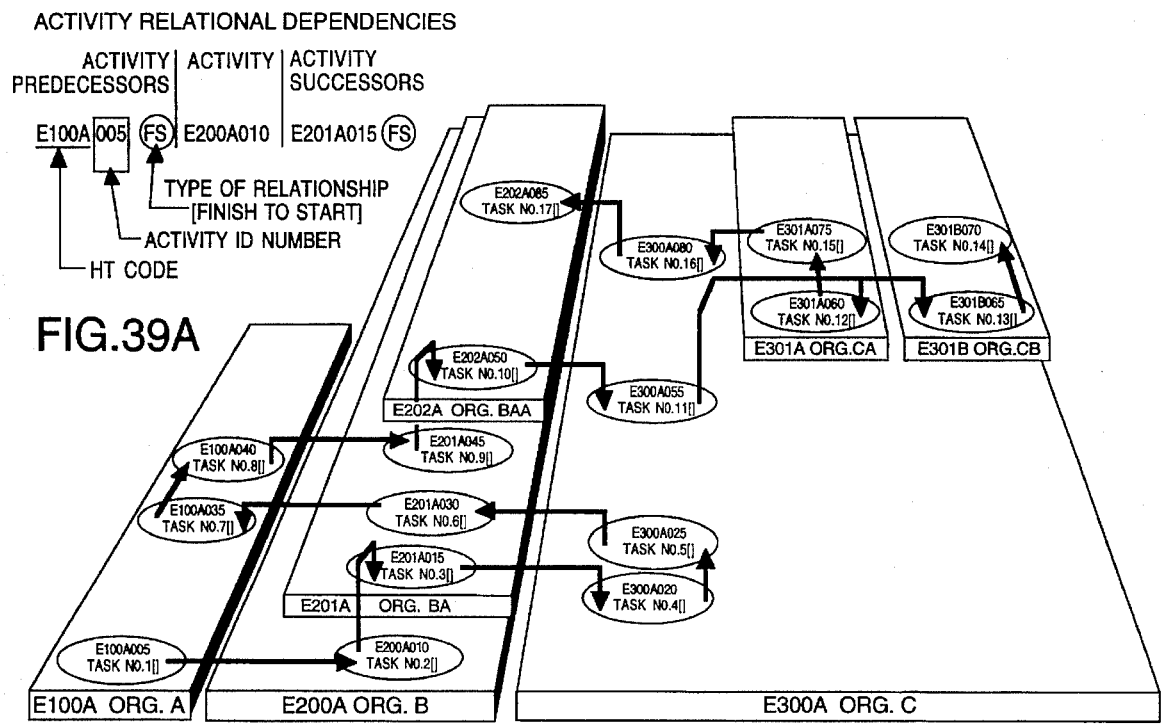
FIG. 38 is a diagram of a prior art scheduling relationship file.
FIG. 39 is a chart relating to FIG. 38 after the data has been converted into the present invention and how this data is generated as a flow model.

FIG. 38 shows a standard pre-existing scheduling relationship file, which contains the activity Identification number, the successor activity identification number and the type of relationship. FIG. 39 shows the same file after the HT Code has been assigned to each activity identification number.

The HT Code is used initially to identify the polygons and their children or subset. The HT Code is then applied to the Activity identification numbers in the Activity file for the activities selected for a desired model in order to associate activities with locations on the polygons. Likewise the activity identification numbers in the relationship file for both the predecessor activity identification and the successor activity ID require the HT Code assignment in order to locate the ellipsis. Since the polygons are 3-dimensional structures it is important that the HT code be applied to set the ellipsis on the polygons correlate with the relationship file to create a coordinate in order to attach the relationship arrow between corresponding ellipsis at the appropriate level on the polygons.

Since the time line tunnels into the page the ellipsis are placed based on a date or time (in the case of a process model where no date or time is indicated ellipsis are placed based on pure logic ties).

Since there are several relationship dependencies which include: 1) Finish to Start [FS], 2) Start to Start [SS], and 3) Finish to Finish [FF], the program indicates a Start to Start relationship by putting an [S] in the arrowhead, and for the Finish to Finish relationship an [F] in the arrowhead. Finish to start relationships have a standard or unlabeled arrowhead.

FIG. 40 shows the modeling set up log which is located in the HT Model Preparation/Convert File Menu view selection. It is this table which instructs the HT software which files are to be used to develop a model.

The FIELDTYP Column indicates a type of File or Action mode. ACO relates to "actual cost", ACT tells us this is an Activity File to be called up for use and BCO relates to "budgeted cost". EDA and SDA relate to dates for a time line. FIL tells us this a code field to be use for filtering. MOD tells us this is the code field we would like to model. NDX tells us the activity field for priority in placing activities. REL tells us the Relationship file we are using for modeling.

The FIELDID Column indicates the name of the field being called out for use. The DICTIONARY Column indicates the name of the file to be attached to for modeling. The ACT/ID file to be used is the MEDICAL.ACT. The FIL/C1 file to be used is SSC-C1.COD. the MOD/C4 file to be used is ASDC4.COD.

The DIRECTORY Column indicates the name of the subdirectory the files reside in order for the program to attach to the files for modeling.

If we look at the 7th and 8th lines down below the Heading Line we see "MOD" in the FIELDTPY Column, this is the instruction for Modeling of Polygons, in this case we are going to model the C4 field as the Primary Polygon Base and C5 will be used as the Secondary Polygon Base.

If we look at the 2nd line down below the Heading Line we see "ACT" in the FIELDTYP Column this line is the Activity file instruction for what Activity file is being call up to extract information for Modeling Activities.

If we look at the fourth to the last line below the Heading Line we see "REL" in the FIELDTYP Column this is the Relationship file instruction for what Relationship file is being call up to extract activity relationship information for modeling activities.

Figure 41A:
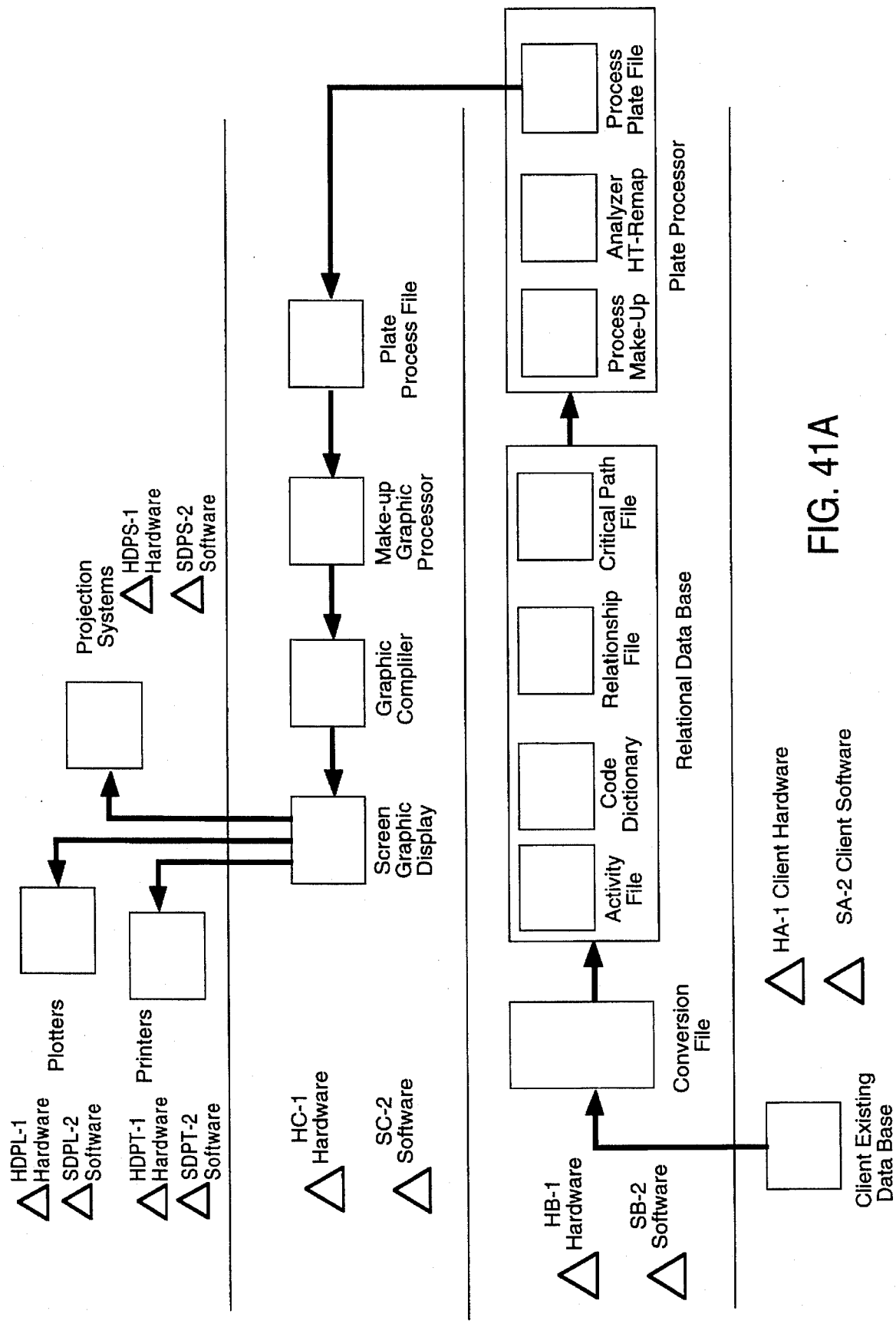
FIG. 41a is an overview of the invention starting from the integration of data to generating a model.

It should be noted that the HYPERCUBIC TUNNELING software is capable of modeling several code fields in a single view and any combination of code fields can be utilized for modeling. FIG. 41 provides an illustration of several types of modeling configurations by code assignments. FIG. 41a is an overview of how the system integrates existing data to graphically display, print, etc. a model.

RULES FOR GENERATING A HYPERCUBIC TUNNELING PROCESS FLOW MODEL FROM A TEXT DOCUMENT

[Manually]

The following rules will address the procedure for developing a HYPERCUBIC TUNNELING Model from a text document. In general, processes, policies, procedures, contractual arrangements, organizational integration, case files, stories or events are described in the form of written text. Almost all text describes some sort of transaction or set of events that bring the reader from point [A] to a point [B]. The present invention provides a means of modeling the events, steps, tasks, procedures, policies, or stories that a document is describing.

Figure 42:
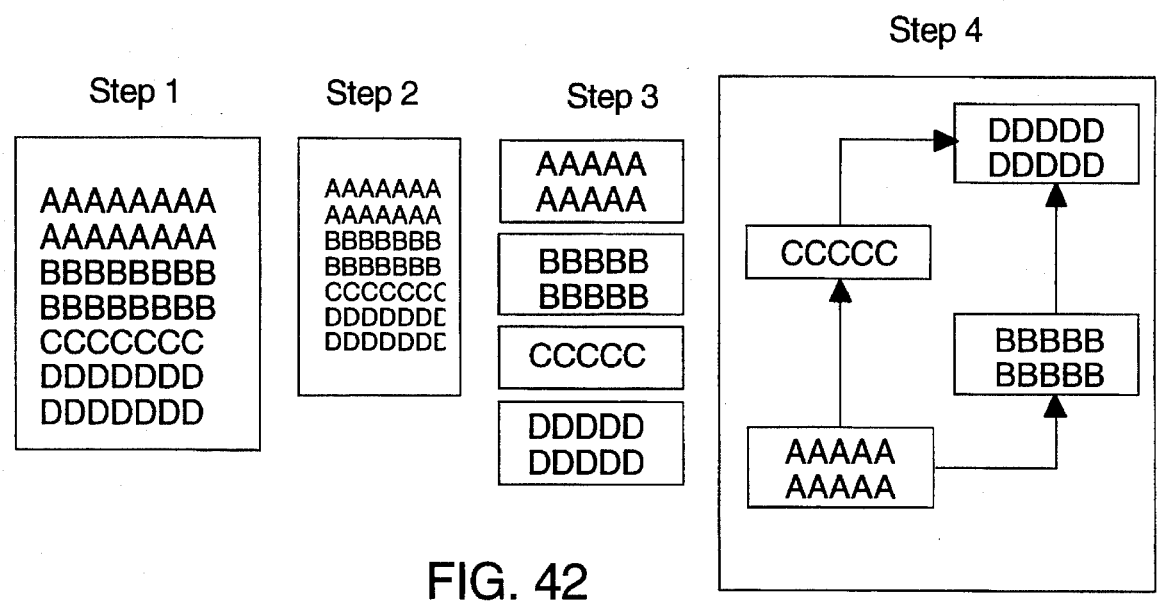
FIG. 42 is a diagram of the steps carried out to generate a multidimensional flow model from a text document manually.
Figure 42A:
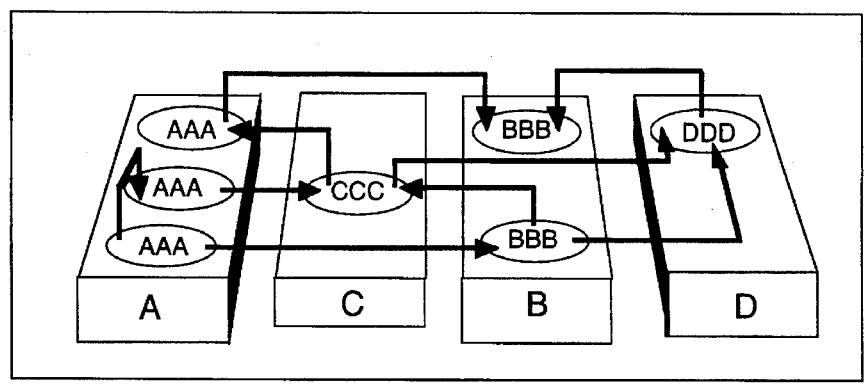

With reference to FIG. 42, the following is a brief set of rules for manually transforming a standard text document into a multidimensional model.

Step No. 1

One would select a document to be modeled.

Step No. 2

The document to be modeled is copied, preferably a 50% reduction is made.

Step No. 3

The modeler reads thru the document making a first pass at categorizing information in the document such as according to processes, procedure, policy or sets of events (the functional components are broken down and sectionalized). The categorization is made based on the organization or individual which is to/or has to perform the described tasks, events or interactions. This information is highlighted in the document.

Step No. 3a

The modeler will then cut these categorized sections out of the text document so that sentence, phrase or paragraph which describes a function is a stand alone cut out. The modeler will also make a note of the organization or individual which is assigned to each bit of information with a function involved. The modeler can either proceed at a summary level on the first pass or go down to any desirable level of detail. It is important that the modeler have an understanding of the multidimensional modeler technique in order to place the cutouts in compliance with the rules for modeling as described herein.

Step No. 4

The modeler will then transfer these stand-alone cutouts to a larger sheet of paper or planning board. The modeler will organize the cutouts by organization and place them in order of sequence. Once the Modeler has placed and taped or glued the cutouts to the surface of the planning board, the modeler can than take a marker or pen and add logic connections and/or subheadings to the model or diagram.

Step No. 5

The diagram that is produced in the first 4 steps of this process results in a logic diagram. The modeler then follows the rules for Base Module development and tunneling implementation of time representation can then add further detail or use the first pass as a rough draft for developing a final presentation documentation.

RULES FOR GENERATING A HYPERCUBIC TUNNELING PROCESS FLOW MODEL FROM A TEXT DOCUMENT

[Computer Generated]

The following rules will address the procedure for developing a HYPERCUBIC TUNNELING Model from a text document. In general, processes, policies, procedures, contractual arrangements, organizational integration, case files, stories or events are described in the form of written text. Almost all text describes some sort of transaction or set of events that bring the reader from point [A] to a point [B]. The present invention provides a means of modeling the events, steps, tasks, procedures, policies, or stories that a document is describing.

With reference to FIG. 43, the following is a brief set of rules for transforming a standard text document into a multidimensional model thru computer generation.

Step No. 1

One would select a document to be modeled.

Step No. 2

The document to be modeled is transferred into the HT Relational Data base.

Step No. 3

The modeler reads thru the document making a first pass at categorizing information in the document such as according to processes, procedure, policy or sets of events (the functional components are broken down and sectionalized). The categorization is made based on the organization or individual which is to/or has to perform the described tasks, events or interactions. This information a sentence, phrase or paragraph which describes an action is highlighted in the document.

Step No. 3a

The modeler then calls up an input screen in order for the categorized text to be transferred as a record and completes additional requests for the organization or individual code assignments (organization and other identifier codes are assigned to each bit of information with an action involved). The Modeler can either proceed at a summary level on the first pass or go down to any desirable level of detail. It is important that the modeler already have an understanding of the HYPERCUBIC TUNNELING technique in order to use the input screen as described through out this technical write-up. An example input screen for transferring the text is shown in FIG. 44.

Step No. 4

The modeler then types in the code dictionary associated with the code (a description for any code assignment which has been made).

Step No. 5

The modeler will then use the software to process the input data, create the organizational polygons, display the tasks in the ellipsis within the organizational polygons, and connect events, work tasks and activities with connecting arrows.

The user manual for the HYPERCUBIC TUNNELING software is incorporated herein by reference for additional information on computer generation of a multidimensional flow model.

APPLICATIONS OF HYPERCUBIC TUNNELING TECHNOLOGY

The HYPERCUBIC TUNNELING technique provide a 4-dimensional approach and methodology to display complex processes, and the integration/interfaces with the organizations involved with the work activities. The HYPERCUBIC TUNNELING technique provides a means of integrating management processes involving the administrative, business, and technical aspects of a given project, their corresponding control systems, and associated work tasks.

HYPERCUBIC TUNNELING modeling can be applied to the following list of functions and tasks, which can be broken down into three main categories: Investigating, Engineering, and Communications.

A. INVESTIGATING

1.] Investigative Reviews
2.] Criminal Investigations
3.] Litigation
4.] Requirements Analysis
5.] Mission Planning/Conceptualization
6.] Life Cycle Management Reviews
7.] Audit Reviews

B. ENGINEERING

1.] Configuration Control
2.] Document Control
3.] Acquisition Control
4.] Records Management
5.] Organizational/Functional Matrixes
6.] Formulate Integrated Policies and Procedures
7.] Project Control Planning
8.] Management Information Systems
9.] Information Management
10.] Contingency Planning
11.] Crash Time Analysis
12.] Risk Management External/Internal Interfacing
13.] Problem Analysis—Response Planning

C. COMMUNICATIONS

1.] Analyze and Interpret Directives
2.] Mission, Goals/Objectives—Display
3.] Communication—Information Management
4.] Policy/Procedure Processes Analysis
5.] Methods and Procedures Analysis
6.] System Flow Diagrams, process mapping
7.] Personnel Issues
8.] Lessons Learned
9.] Feedback Controls
10.] Educational Training Aides
11.] Public Relations
12.] Computer Automated Design [Cad/Cam Software]
13.] Graphic Display Aides The following is a representative sample of operations which can be monitored by using the invention:

ORGANIZATION

Management-System Orientation, Sub Element Interface

Review Structures Work Load—Resource Complexity

Resources Allocation—Training per Requirement

PLAN

Project Integration ID Sub Elements [Computer Automation].

Work Breakdown Structure [Analysis] Definition Work Units.

Time Phased Milestone—Detailed Networking CPM Scheduling.

Contingencies, Detailed: Operation Process Level Tracking.

Realistic Planning [Rubber on Road].

CONTROL

Integration of Budget, Schedule, Work Authorization Plans.

Allocation Measurement Budget/Cost—Manpower, Resources.

Redirect Change Implementation—Change control Communication.

Implement Decisions—Tracking System Automation [Sub Element].

Management Reporting—Mechanism.

Project Reporting—Mechanism.

Final Review/Post Audit Traceability.

REPORTING

Project Objectives—Graphic Display Feedback.

Critical Path Method Networking—Time Variance Analysis [Updating].

Measure Results Compute Automation;

Baseline Maintenance—Budget Variance/Earned Value/$ to Complete.

Baseline Change—Authorization Tracking, Sub Element Interface.

Performance—Manpower, Logistical Resources Allocation.

Resistance To Change Plan—Time Lag Analysis.

Frequency, Timeliness WBS Status Reporting.

Cost Management—Variance Analysis—$ Value Earned.

Accounting System Periods Reporting/Recording Interface.

Program Status—Qork Item Critically/Performance Monitor [Time] [Cost] [Quality].

Contingency Corrective Analysis Alternative Adjustment.

DOCUMENT

Progress Reviews, Measurement Results

Replanning—Program Level Process Plates [Allocation versus Process Requirements]

Strategic, Tactical Communication—Direct/Redirect Implementation.

Historic Performance Statistics—Lessons Learned.

Cost Per Application—Sub Element Measurement.

REVIEW

Reporting Process Consistency.

Directive—Mission[s] Requirement—Synthesizing Processes Controlling Deliverable[s].

Utility Assessment: [Resources Available versus Needed] [Time Allowed versus Required].

COORDINATE

Communication of Plans and Control Points.

Process Integration—Administrative/Operations.

Feedback Status Measurement—Revises Direction Analysis.

Integration External Elements—ID, Coordinate, Control, Feedback.

DEVELOPING A 4-DIMENSIONAL MODELING MATRIX UTILIZING THE HYPERCUBIC TUNNELING TECHNIQUE

The invention is a 4-dimensional modeling system which integrates stand-alone managing and/or examining information into one integrated relational database. The modeling program produces a 4-dimensional matrix model, integrating the organizational breakdown structure [OBS], work breakdown structure [WBS], product development flow models, administrative, business and technical processes.

Calculations provide a time line and vertical and horizontal relational integration that results in process modeling, thus providing a graphic representation of obscure concepts, information and complex processes. The invention focuses on giving priority to an entity performing tasks, its relationships and interfaces with other entities, and their subtier or departments, groups and sections. The process is used to model an entity's mission, its structural interfaces, procedures, polices, and functions in a time-phased manner, in order to present an overview that clearly yields the big picture. The result is a powerful strategic planning and tracking system, capable of providing the tools necessary to manage and examine a process.

In FIG. 45 we see a matrix example with the WBS running vertically and the OBS running horizontally with the cross section in this model being referred to as the cost account. The HYPERCUBIC TUNNELING technology allows for each intersection (in this case the cost account) to be a primary polygon and allows the user the flexibility to chose any secondary level of polygons from the code fields in the activity records, which might include; work packages, locations, systems, functions, phases, etc. for modeling and integration.

The system allows the flexibility to call up discrete modeling configurations so selected accounts can be modeled showing integration and interfacing with other accounts.

Figure 46:
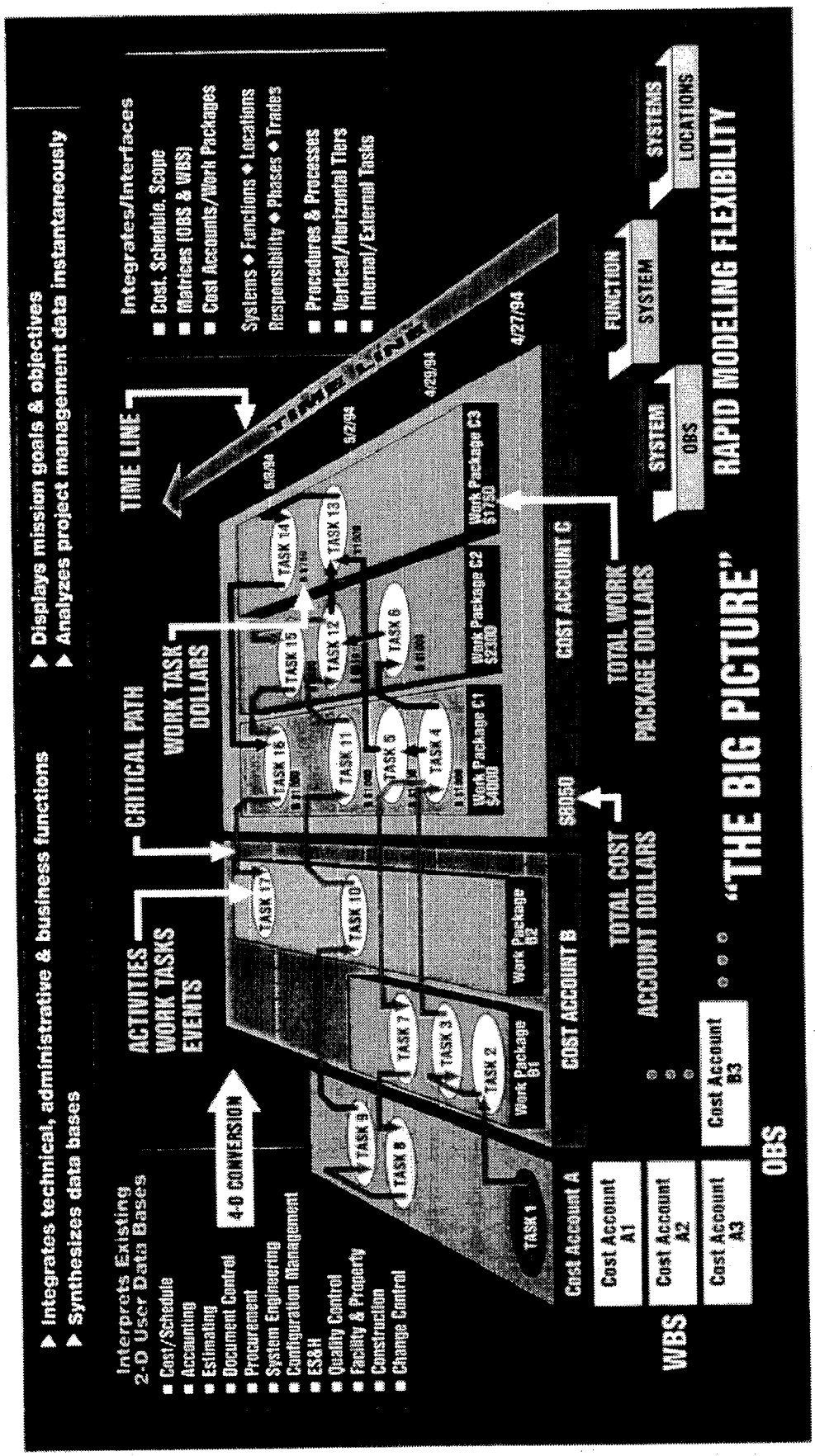
FIG. 46 is a diagram of a cost account model incorporating the present invention.

FIG. 46 is an example of a HYPERCUBIC TUNNELING process plate. The example selected is a data flow diagram of various cost accounts as they relate to packages of work having various tasks to be completed.

This process starts with the activity Task 1 and completes at the location of Task 17. If we look at the entity "Cost Account C", we see examples of subtier organizational units such as "Work Package C1".

FIG. 46*a* is another example of a model generated on a patent process.

VIEWING THE ENTIRE OPERATION

The use of process plates in vertical and horizontal planes provides a methodology to produce roll-ups reflecting the integration of project administrative, business and technical processes.

Figure 47:
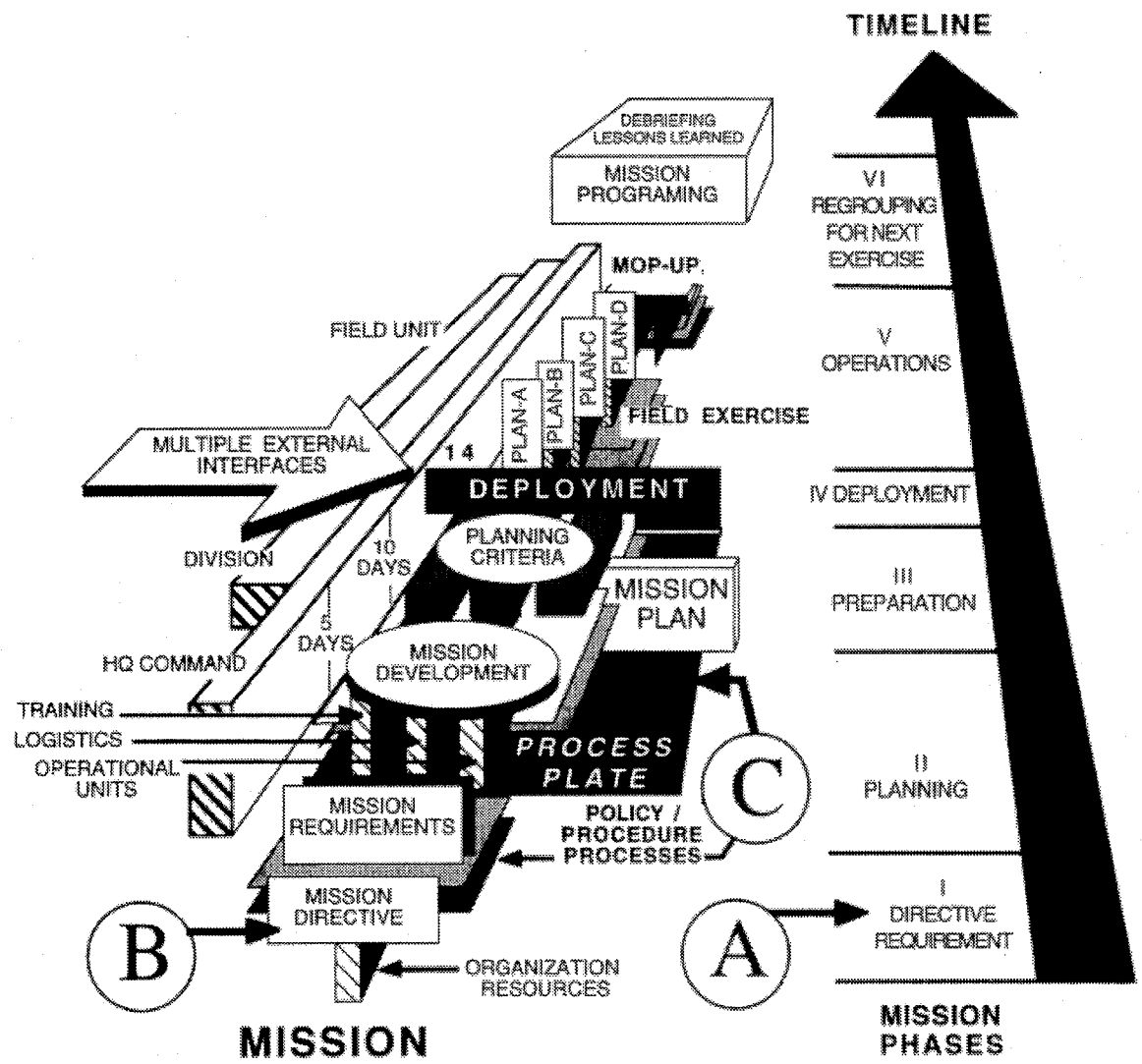
FIG. 47 is a crude model incorporating the present invention.

FIG. 47 is a graphic representation of a Project Summary Roll-up [Level 1]

FIG. 47 illustrates an overview of an entire operation which has six mission phases. The phases are represented and located by the reference [A] indicator. Key milestones are shown by the [B] reference indicator. Each of the six mission phases, of this operation has administrative, business, and technical processes, which require policies, procedures and process tracking. The [C] reference indicator, which is pointing to what appears to be a flat plate, is referred to as a process plate, representing one process employed during the mission development planning phase. In order to view this process plate, level 2 would be accessed.

Figure 48:
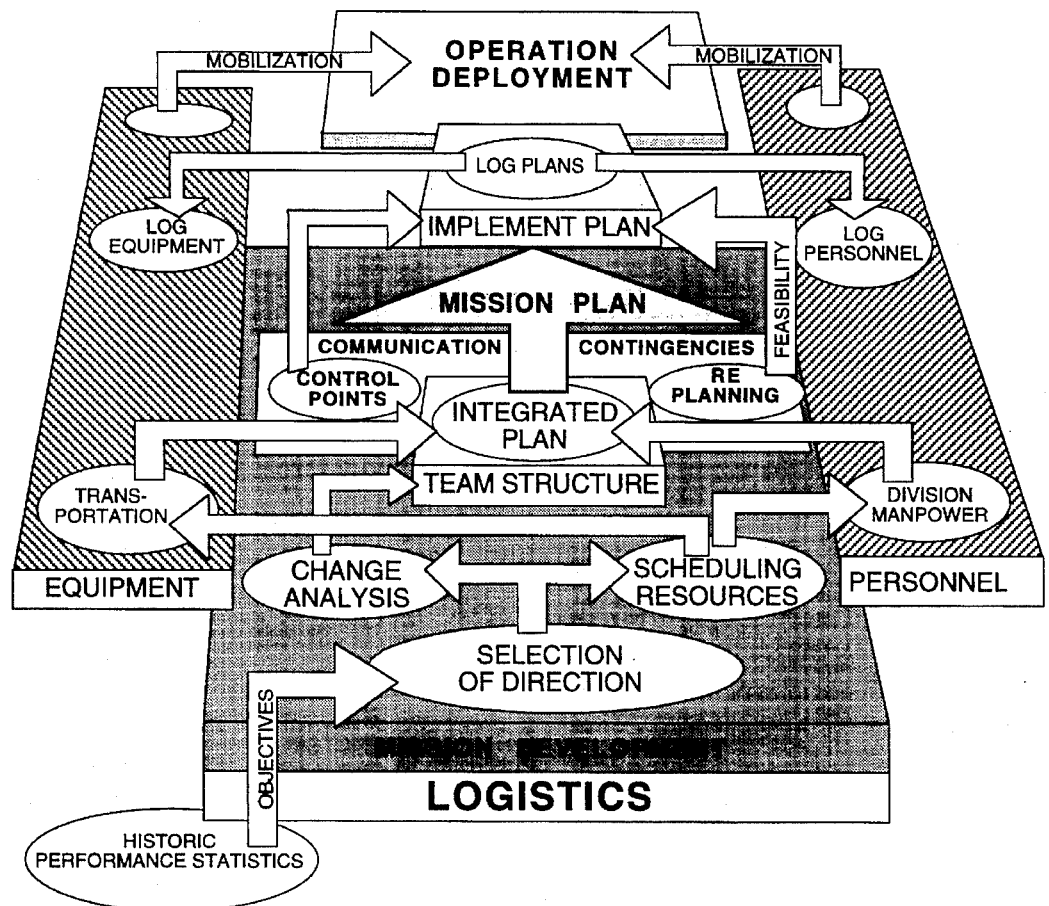
FIG. 48 is a diagram of a level 2 and a level 3 roll down of the model shown in FIG. 47.
Figure 48A:
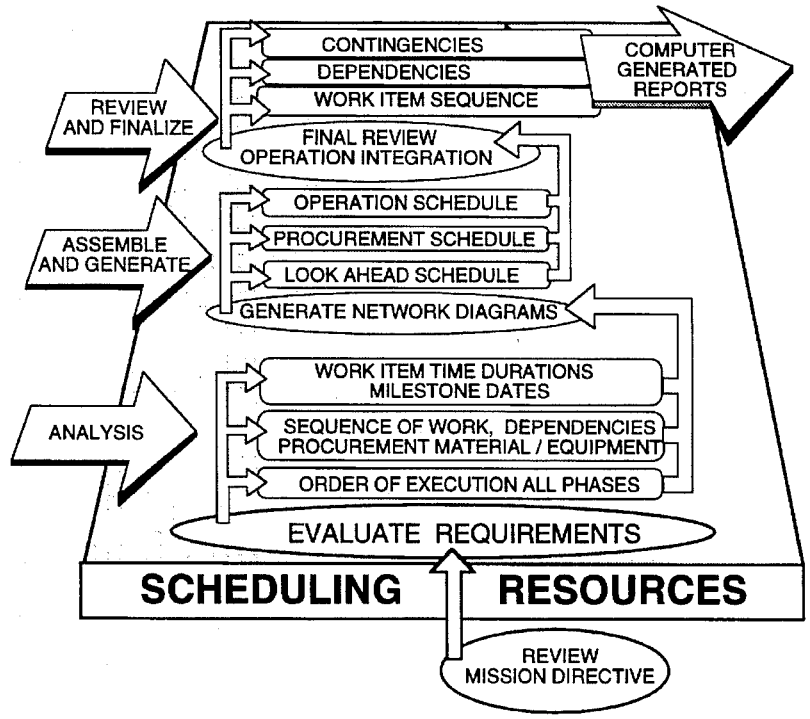

FIG. 48 is a representation of a level 2 process plate, with a roll-down to a level 3 view of work tasks, associated with a work activity from the level 2 process. The top process plate [Level 2], shown in FIG. 48, illustrates the work activities for the logistics planning, associated with the mission development planning phase shown in FIG. 47. If we look at FIG. 48, and locate the [D] reference indicator we see the work activity "Scheduling Resources". To review the work tasks, for the activity "Scheduling Resources", one drops down to level 3 to view the tasks for this work activity.

EXAMPLES OF VARIOUS MODELS INCORPORATING THE INVENTION

Figures 49, 51:
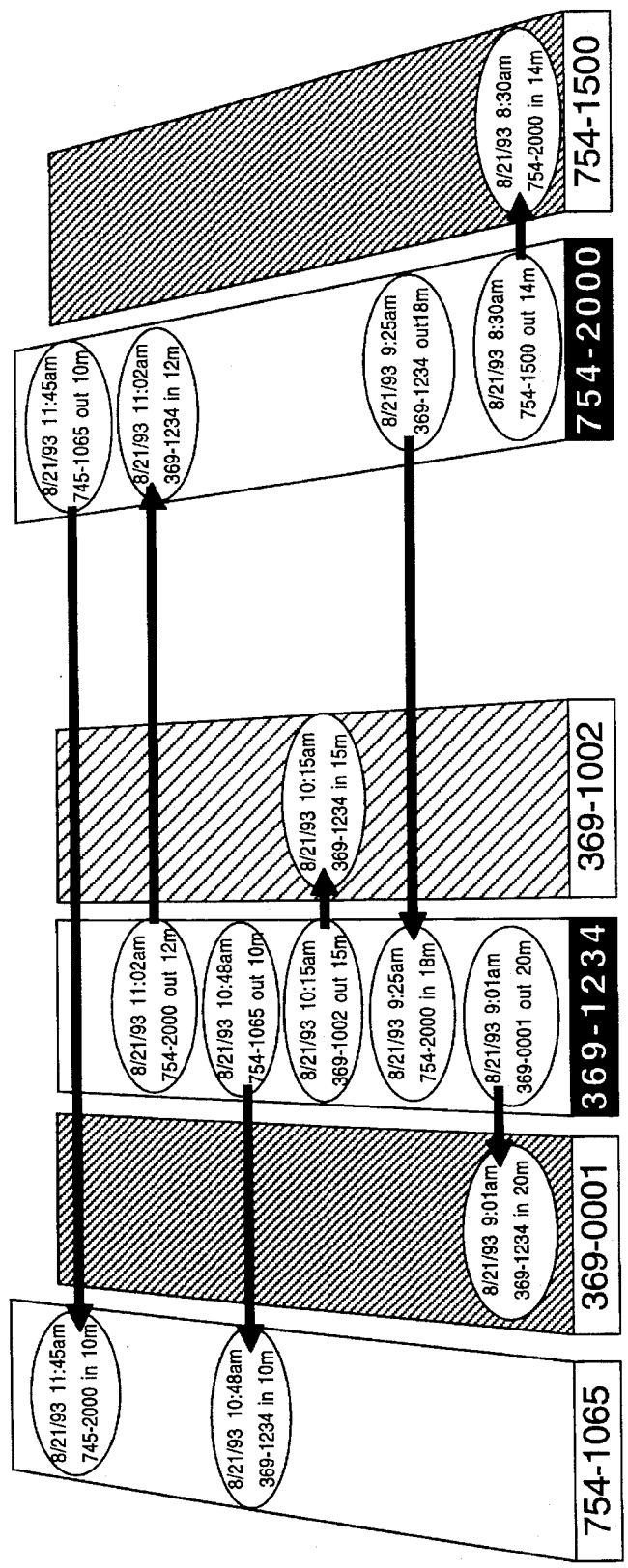
FIG. 49 is a telephone log.
FIG. 51 is a diagram of a model based on the information shown in FIGS. 49 and 50.
Figures 50A, 50B, 50C:
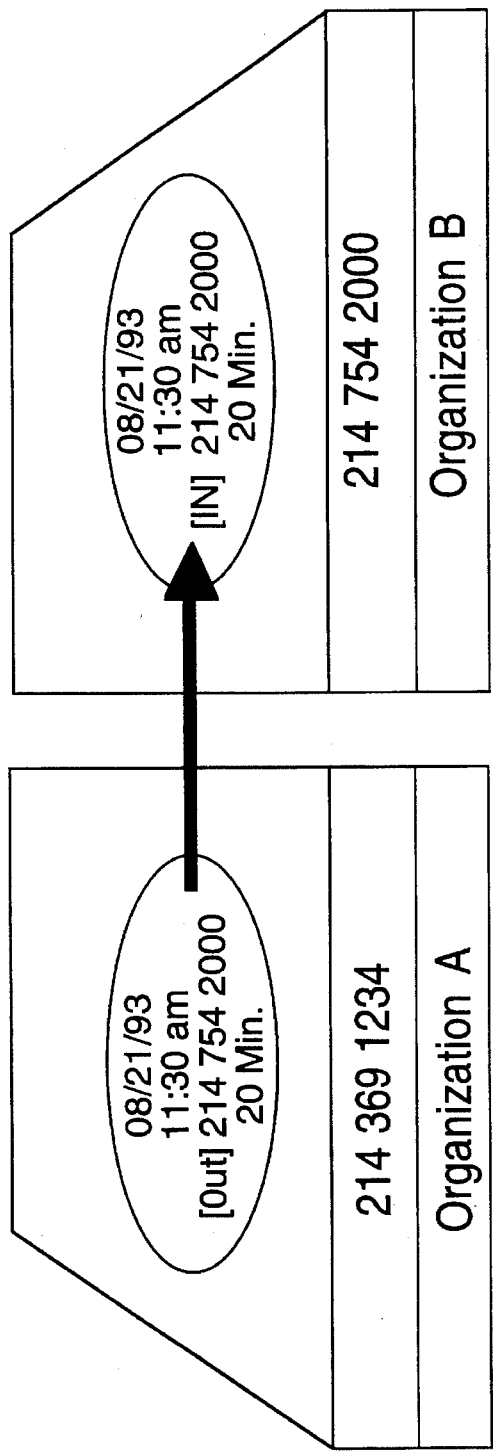
FIG. 50 is a representation of how telephone log data can be input as data to be used in the present invention and how the data would appear as a model.
Figures 54A, 54B, 54C:
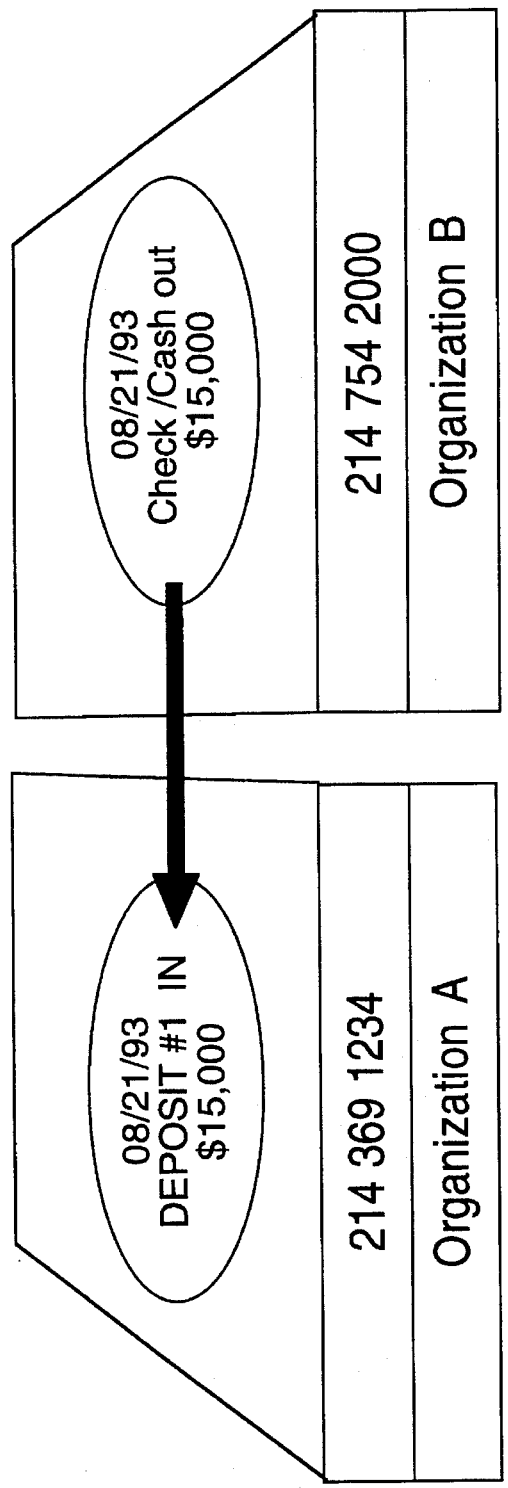
Figure 55:
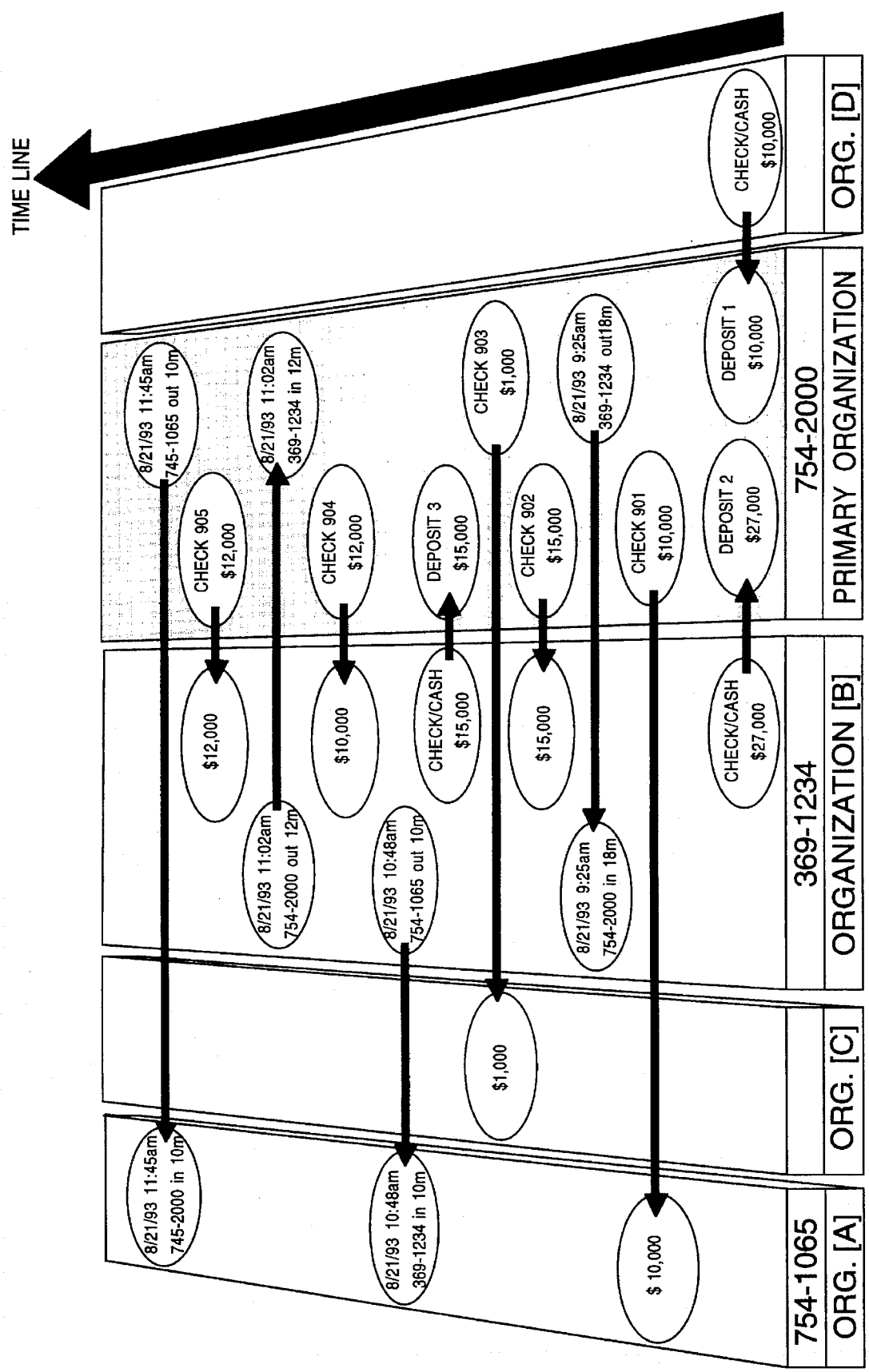

A variety of models incorporating the invention are disclosed in the drawings as identified below. Referring to FIGS. 49 thru 51 an example is shown of a model created for a law enforcement agency. FIG. 49 shows an ordinary phone log, FIG. 50 is an example of how the phone log data is inputed into the inventive system, and FIG. 51 shows the resulting generated model. This model represents several entities which in this case are phone numbers, and then shows phone calls placed and received between entities and times that phone calls are made. A similar model and data entries which further incorporate financial data relating to payments made and received are shown in FIGS. 52 thru 55.

Figure 56:
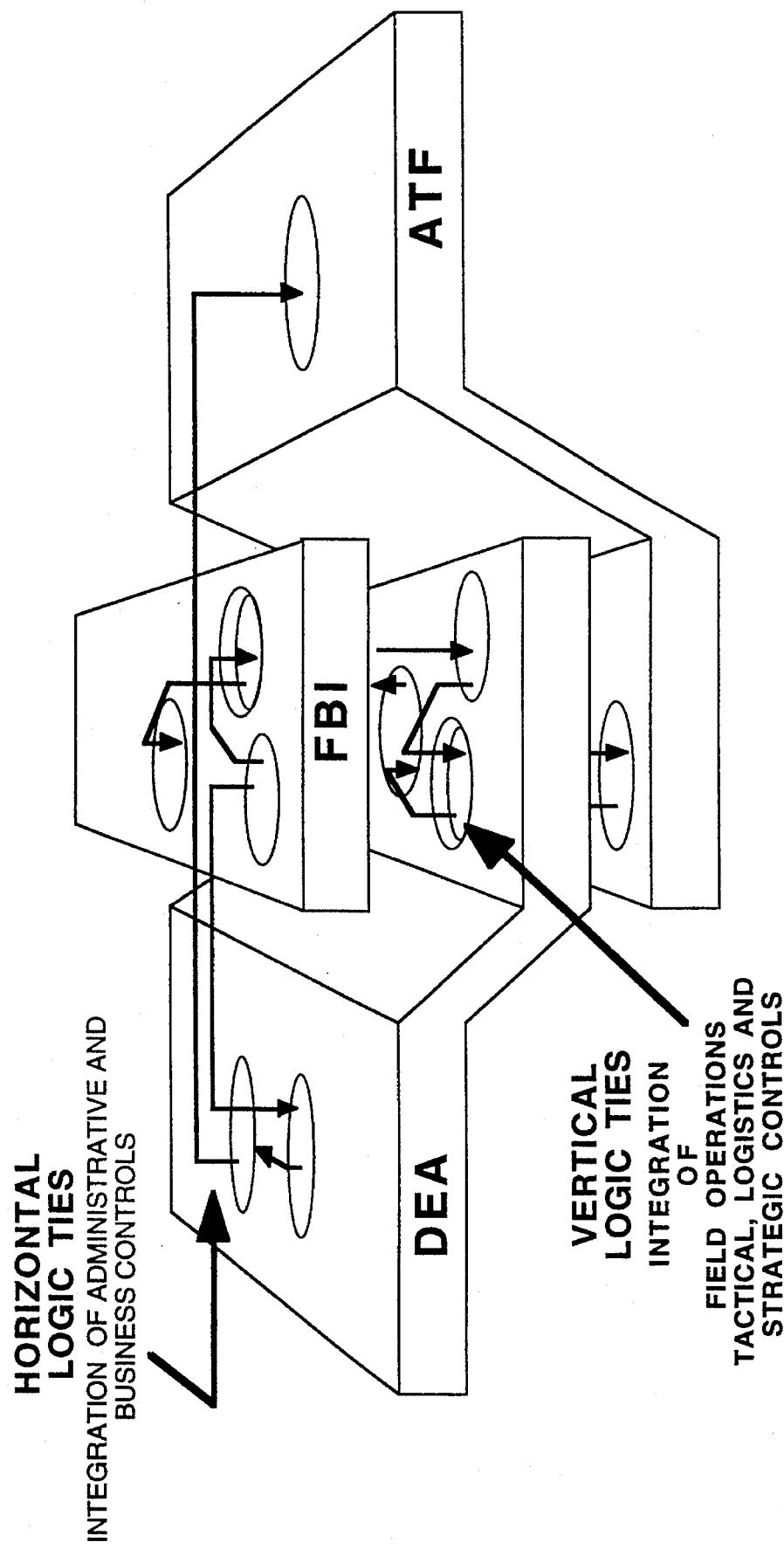
FIGS. 56 and 57 show a stepped polygon which can be used as a geometrical shape in a model.
Figure 57:
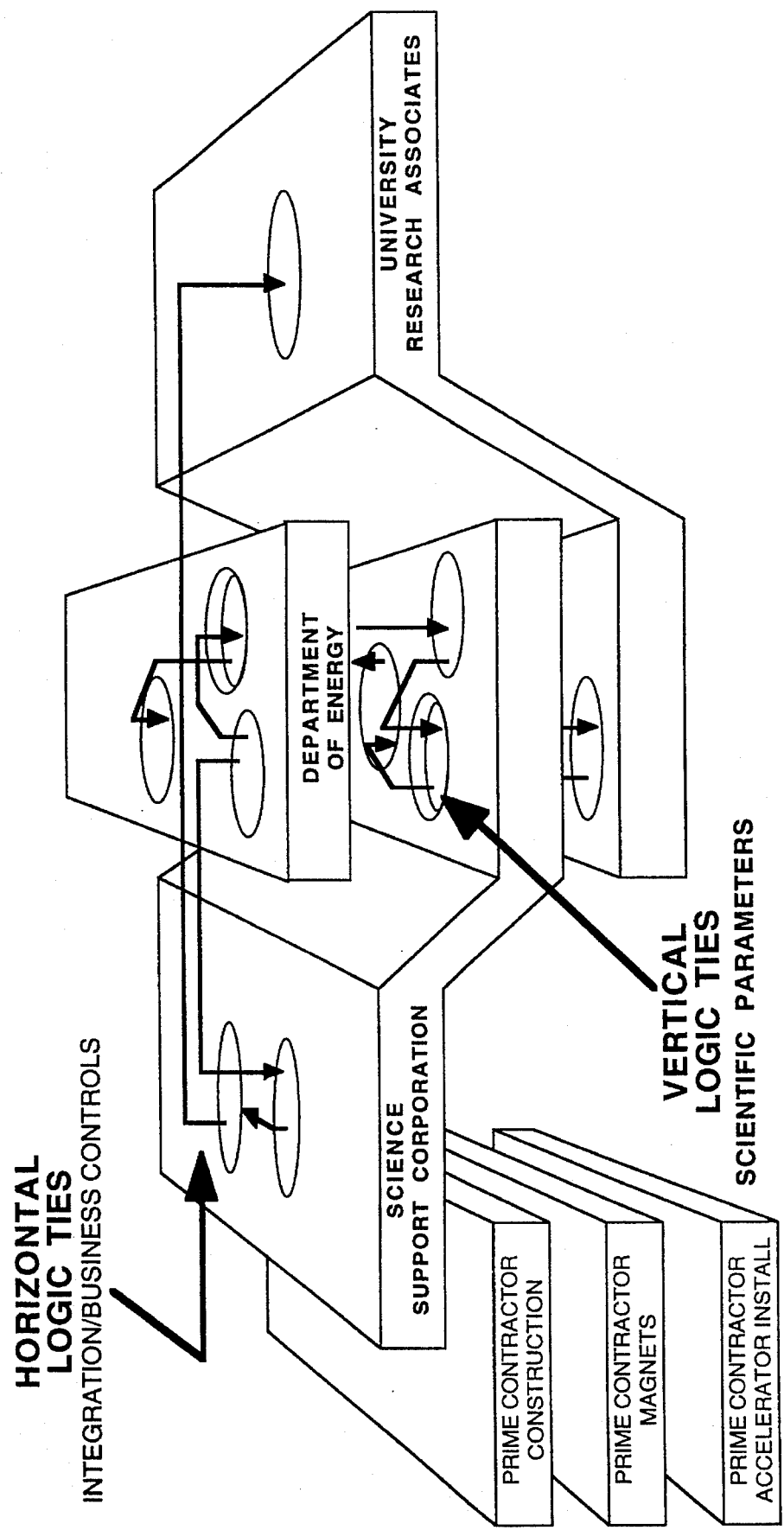
Figure 58:
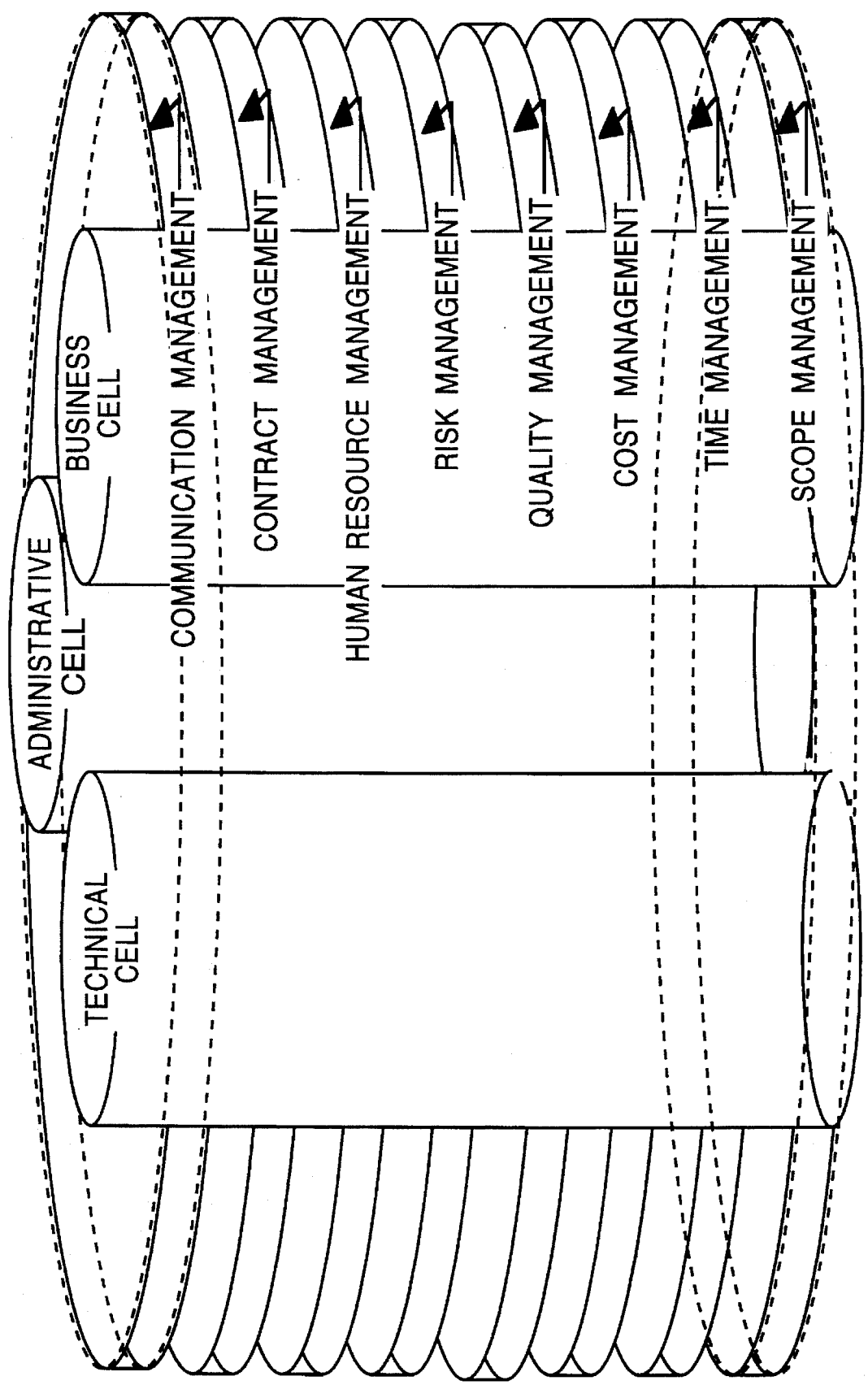
FIG. 58 is a diagram of a model incorporating cells or discs as geometrical shapes.
Figure 59:
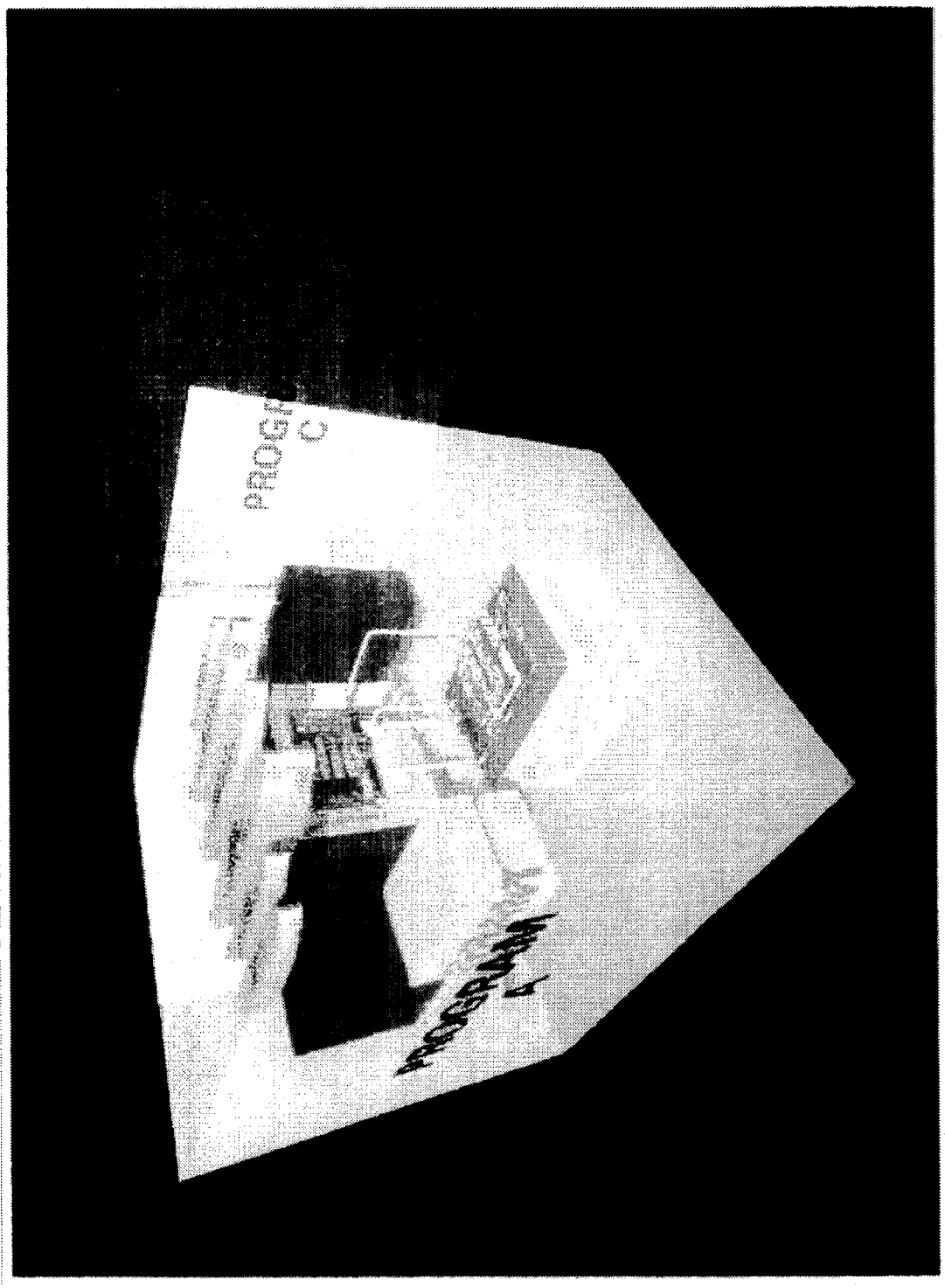
FIG. 59 is a diagram of a virtual reality environment incorporating the present invention.

Referring to FIGS. 56 thru 57 another embodiment of the invention is shown which uses polygons in conjunction with "steped-polygons" as an alternative geometric shape for modeling and showing relationships. FIG. 58 shows the implementation of discs as a geometric shape to be used in modeling. 3-dimensional triangles, hexagons and polygons are other examples of geometrical shapes which can be used.

Figure 60:
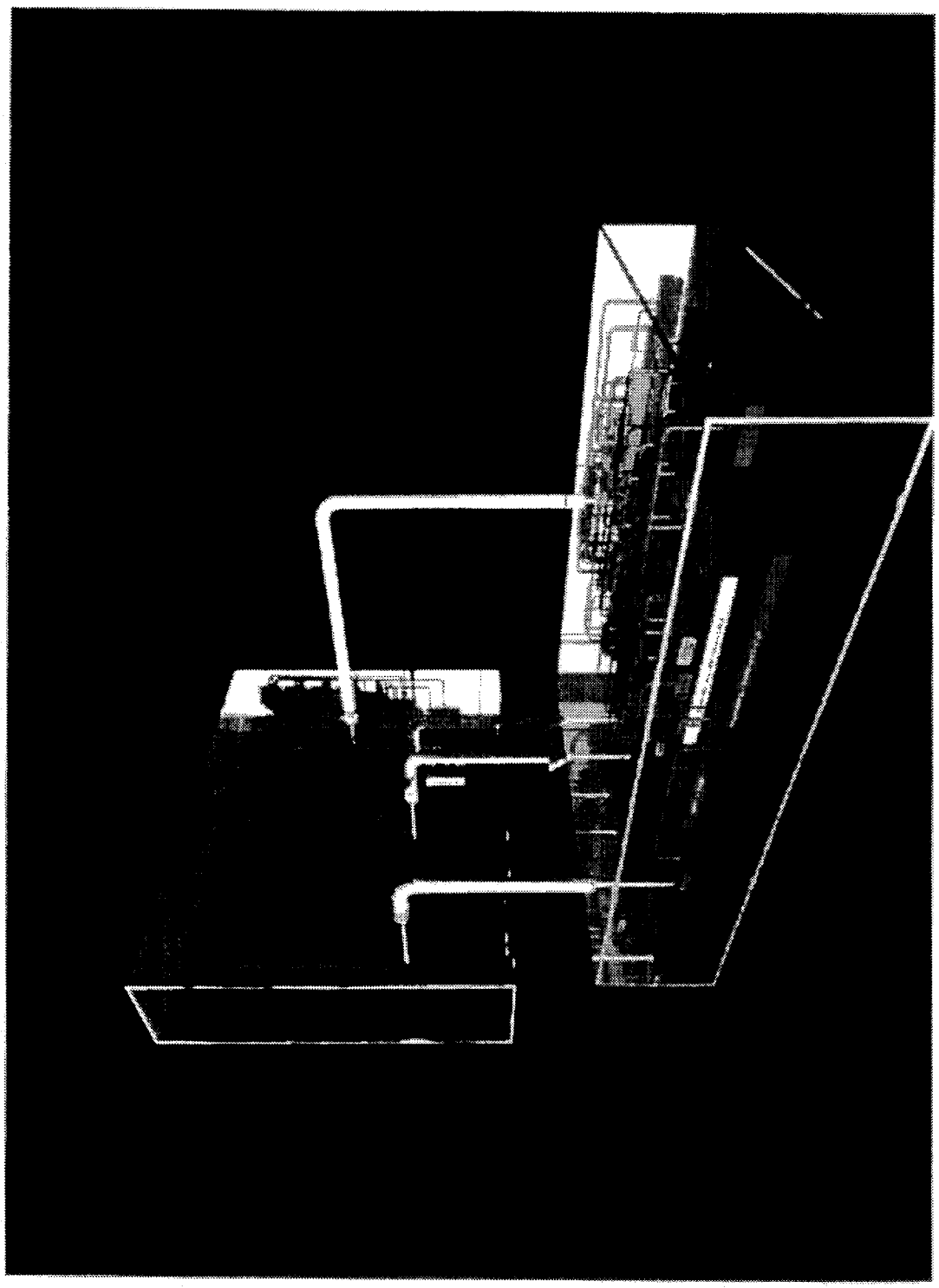
FIG. 60 is a blown up section taken from FIG. 59.
Figure 61:
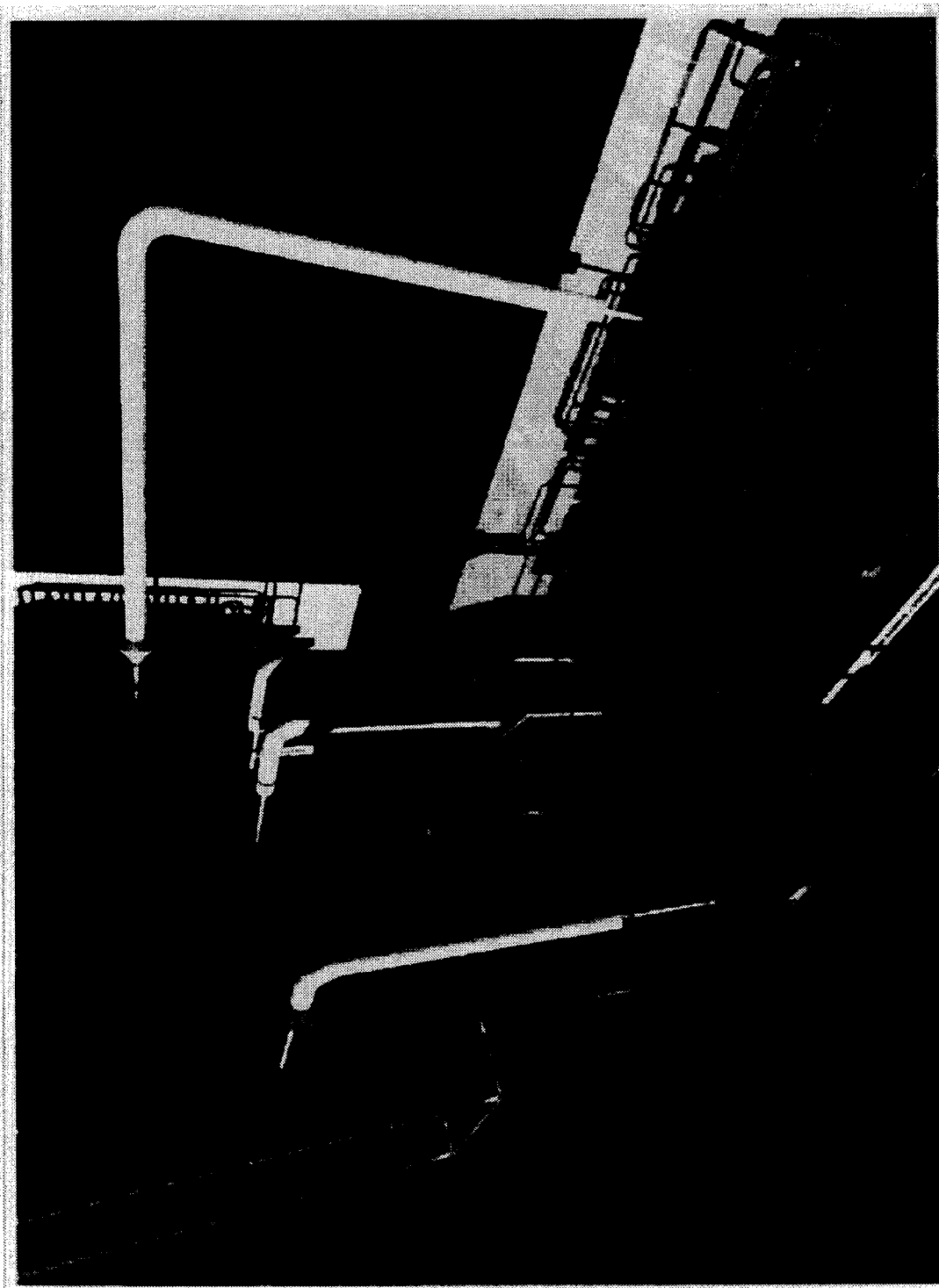
FIG. 61 is a blown up section taken from FIG. 60.
Figure 62:
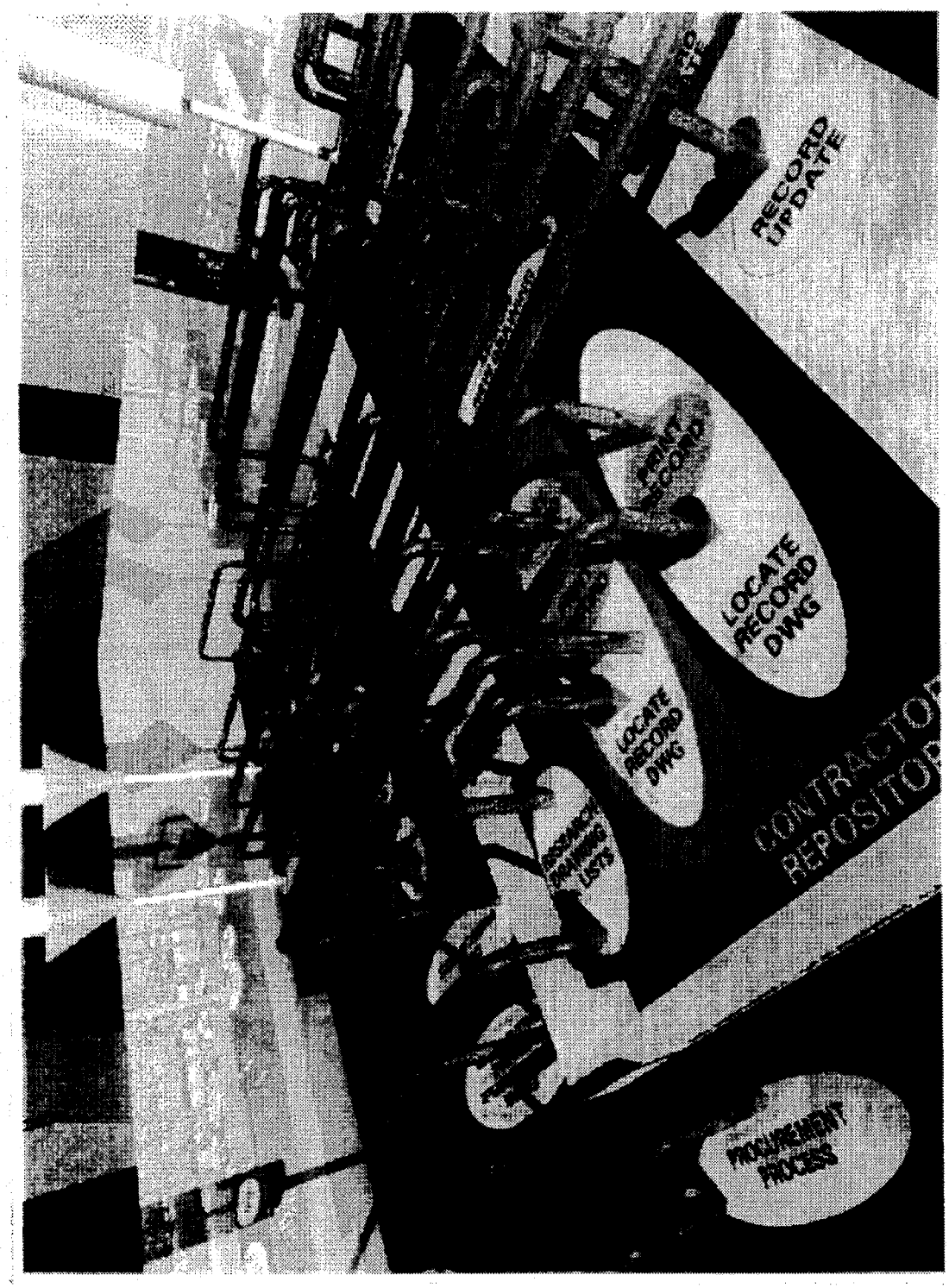
FIG. 62 is a blown up section taken from FIG. 61.

FIGS. 59 thru 62 show an integrated model placed in a virtual reality environment where the user can move within the surrounding environment of the model. FIG. 60 is a blown-up view of the virtual reality model appearing in FIG. 59. FIG. 61 is a blown-up section of the virtuarial reality environment shown in FIG. 60. FIG. 62 another blown-up view taken from the virtual reality environment shown in FIG. 61.

What is claimed is:

1. A process for converting information into a multidimensional flow model generated as a graphic display, comprising the following steps:
    modeling a plurality of entities in three spacial dimensions such that the entities will have a plurality of surfaces;
    placing the entities relative to a time dimension, wherein the time dimension coincides with one of the spatial dimensions, such that the entities are staggered;
    labeling the entities with identifying information on any of the plurality of surfaces;
    placing information relating to the entities on any of the plurality of surfaces of the entities relative to the time dimension; and
    logically connecting the information placed on the surfaces of the entities with a plurality of arrows.

2. The process for generating a multidimensional flow model according to claim 1 further including the steps of:
    modeling sub entities in three spacial dimensions;
    stacking the sub entities onto corresponding entities;
    placing the sub entities relative to the time dimension such that the entities and sub entities are staggered;
    labeling the sub entities with identifying information on any of the plurality of surfaces;
    placing information relating to the sub entities on any of the plurality of surfaces of the sub entity relative to the time dimension; and
    logically connecting the information placed on the plurality of surfaces of the sub entities.

3. The process for generating a multidimensional flow model according to claim 1 further including the step of creating a related multidimensional flow model by accessing one of the entities or sub entities and defining a type of model desired.

4. The process for generating a multidimensional flow model according to claim 1 further including the step of applying at least three different colors to the multidimensional flow model to segregate information.

5. The process for generating a multidimensional flow model according to claim 1 further including the step of incorporating the multidimensional flow model into a virtual reality environment.

6. The process for generating a multidimensional flow model according to claim 1 wherein the entities are polygons.

7. The process for generating a multidimensional flow model according to the claim 1 wherein the entities are stepped polygons.

8. The process for generating a multidimensional flow model according to claim 1 wherein the information placed on the plurality of surfaces of the entities is placed in an ellipse.

9. The process for generating a multidimensional flow model according to claim 8 further including the step of placing the ellipsis according to time and by activity.

10. The process for generating a multidimensional flow model according to claim 1 further including the step of labeling the arrows used to make the logical connections.

11. The process for generating a multidimensional flow model according to claim 1 wherein said steps of modeling the entities, placing the entities, labeling the entities, placing information on the entities and logically connecting information comprises establishing an entity code and converting an existing data record and relationship data by integrating the entity code.

12. The process for generating a multidimensional flow model according to claim 11 wherein said step of selecting a document includes reducing the size of the document.

13. The process for generating a multidimensional flow model according to claim 11, wherein said steps of organizing the segregated functions by entity and placing the organized functions in order of sequence includes creating a geometrical shape to represent each entity and displaying the organized functions on the geometrical shapes.

14. The process for generating a multidimensional flow model according to claim 1 wherein said step of modeling the plurality of entities in three spacial dimensions such that the entities will have a plurality of surfaces includes modeling the entities such that a plurality of internal and external surfaces are represented.

15. The process for generating a multidimensional flow model according to claim 1 wherein said step of modeling the plurality of entities in three spacial dimensions comprises displaying an entity having a shorter dimension oriented vertically and displaying an entity having a shorter dimension oriented horizontally.

16. The process for generating a multidimensional flow model according to claim 1 further including the step of directly accessing embedded information by selecting a related position of the graphic display.

17. The process for generating a multidimensional flow model according to claim 16 wherein said step of directly accessing embedded information comprises generating a unique multidimensional flow model.

18. A process for converting information into a multidimensional flow model generated as a graphic display, comprising the steps of:

selecting a document to be modeled;

categorizing information in the document according to entities and according to functions;

segregating the categorized functions from the document;

noting the entities relating to the segregated functions;

organizing the segregated functions by entity;

placing the organized functions in order of sequence; and logically connecting each of the organized functions with an arrow to another of the organized functions.

* * * * *